(12) United States Patent
Parulski et al.

(10) Patent No.: US 10,817,563 B2
(45) Date of Patent: *Oct. 27, 2020

(54) PROVIDING LOCATION BASED CONTENT TO MOBILE DEVICES

(71) Applicant: Tourblend Innovations, LLC, Rochester, NY (US)

(72) Inventors: Kenneth A. Parulski, Rochester, NY (US); William James Colosky, Honeoye Falls, NY (US); Brian J. O'Keefe, West Sayville, NY (US); Leslie G. Moore, Rochester, NY (US)

(73) Assignee: TOURBLEND INNOVATIONS, LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,693

(22) Filed: Oct. 14, 2018

(65) Prior Publication Data

US 2020/0117687 A1    Apr. 16, 2020

Related U.S. Application Data

(63) Continuation of application No. 15/013,255, filed on Feb. 2, 2016, now Pat. No. 10,142,795.

(60) Provisional application No. 62/116,879, filed on Feb. 16, 2015.

(51) Int. Cl.
*H04W 4/021* (2018.01)
*G06F 16/687* (2019.01)
*G06F 16/955* (2019.01)

(52) U.S. Cl.
CPC ........ *G06F 16/687* (2019.01); *G06F 16/9554* (2019.01); *H04W 4/021* (2013.01)

(58) Field of Classification Search
CPC ... G06F 16/687; G06F 16/9554; H04W 4/021
See application file for complete search history.

(56) References Cited

U.S. PATENT DOCUMENTS

| | | | |
|---|---|---|---|
| 5,850,610 | A | 12/1998 | Testani et al. |
| 6,157,841 | A | 12/2000 | Bolduc et al. |
| 7,146,179 | B2 | 12/2006 | Parulski et al. |
| 7,463,977 | B2 | 12/2008 | Price et al. |
| 8,358,358 | B2 | 1/2013 | Gallagher et al. |
| 8,405,740 | B2 | 3/2013 | Nichols et al. |

(Continued)

OTHER PUBLICATIONS

Mokbel, et al,Toward context and preference-aware location-based services, published in MobiDE'09, Jun. 29, 2009, Providence, RI, USA.

(Continued)

*Primary Examiner* — Julio R Perez

(57) ABSTRACT

Disclosed herein are, among other things, systems and methods for providing digital content for multiple venues to mobile devices. In some embodiments, venue location data defining a geographic boundary of each of a plurality of venues and venue content data for a plurality of different attractions associated with the venue is stored. A processing device system may be configured to determine a current location of the mobile device, and provide at least some of the venue content data based at least on an analysis of the venue location data, or attraction location data, and the current location.

20 Claims, 33 Drawing Sheets

(56) References Cited

U.S. PATENT DOCUMENTS

| | | | |
|---|---|---|---|
| 8,565,735 B2 * | 10/2013 | Wohlwend | G11B 5/65 |
| | | | 455/414.1 |
| 8,618,935 B2 | 12/2013 | Felt et al. | |
| 9,280,852 B2 | 3/2016 | Adhikari et al. | |
| 9,288,631 B2 * | 3/2016 | Felt | H04M 3/42348 |
| 9,341,481 B2 | 5/2016 | Sinha et al. | |
| 2002/0011951 A1 | 1/2002 | Pepin et al. | |
| 2002/0183072 A1 | 12/2002 | Steinbach et al. | |
| 2005/0192025 A1 | 9/2005 | Kaplan | |
| 2008/0129528 A1 | 6/2008 | Guthrie et al. | |
| 2008/0174676 A1 | 7/2008 | Squilla et al. | |
| 2009/0267728 A1 | 10/2009 | Mayrand et al. | |
| 2010/0063726 A1 | 3/2010 | Marjenberg et al. | |
| 2010/0257234 A1 | 10/2010 | Caughey et al. | |
| 2012/0113144 A1 | 5/2012 | Adhikari et al. | |
| 2012/0115512 A1 | 5/2012 | Grainger et al. | |
| 2013/0173531 A1 | 7/2013 | Rinearson et al. | |
| 2013/0191211 A1 | 7/2013 | Nichols et al. | |
| 2013/0307997 A1 | 11/2013 | O'Keefe et al. | |
| 2014/0279196 A1 | 9/2014 | Wilson et al. | |
| 2015/0193543 A1 | 7/2015 | Poliakov et al. | |

OTHER PUBLICATIONS

DAW, Futuristic super 8 ads remind us of minority report, PC World, Jun. 10, 2011.

* cited by examiner

| Venue Affiliate Name | Affiliate Users |
|---|---|
| TourBlend Master Account | Ken |
| TourBlend Master Account | Les |
| Finger Lakes Visitor Connection | Val |
| Finger Lakes Visitor Connection | David |
| Seneca Park Zoo | Tom |
| Soap Box Derby | Jim |

FIG. 7

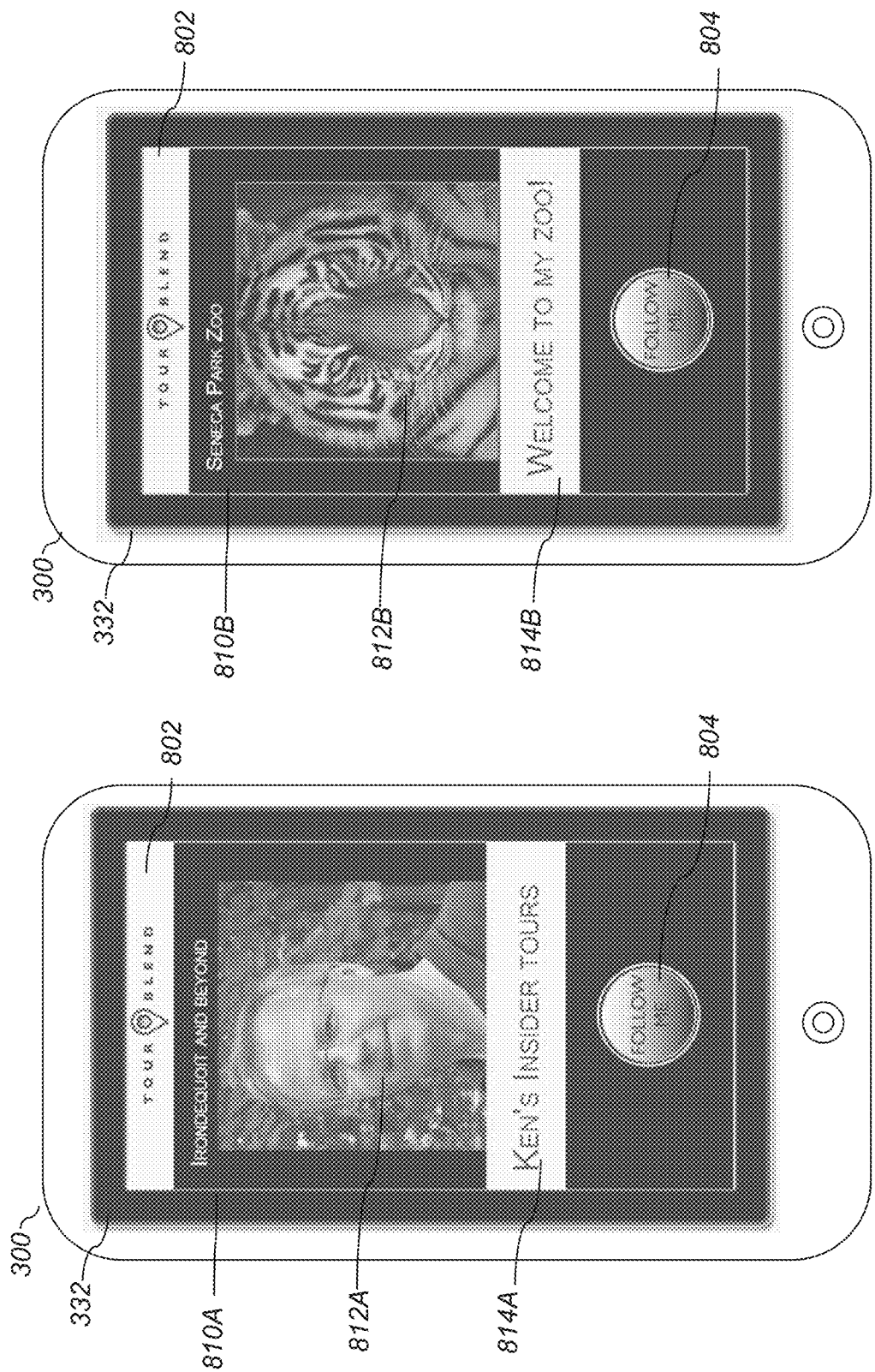

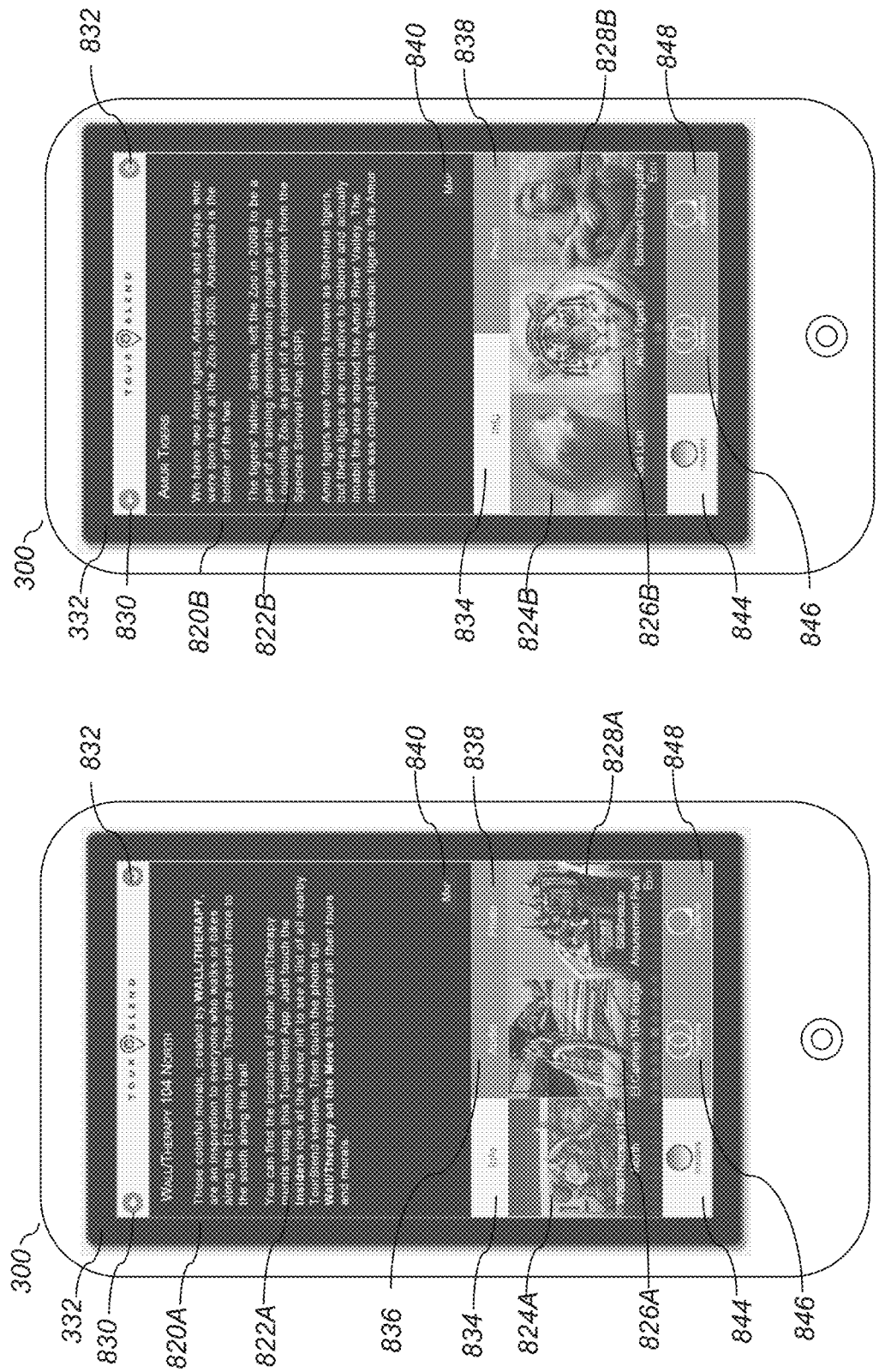

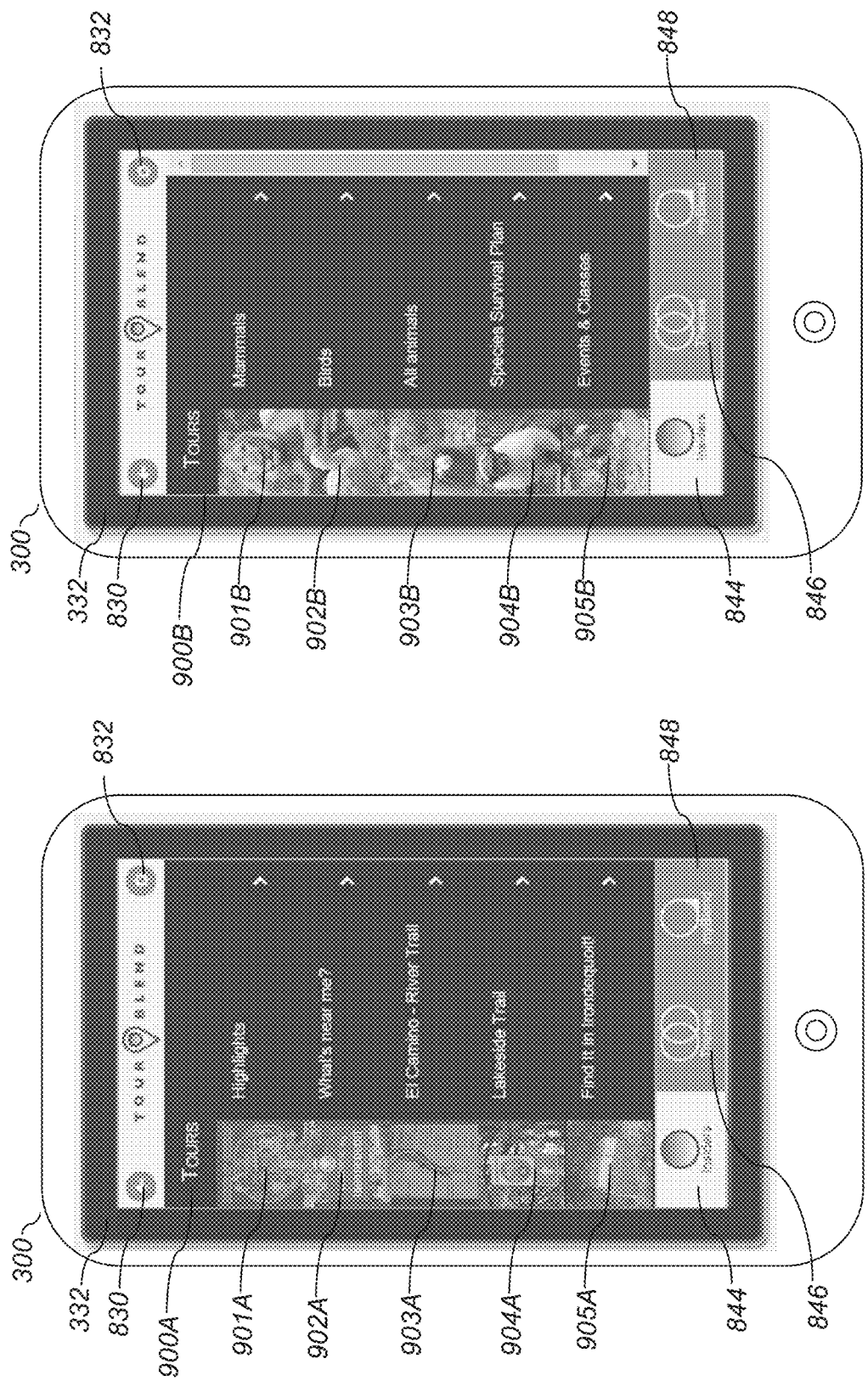

| Venue Name | Venue Type | Code |
|---|---|---|
| Irondequoit | Tourism Region | TR |
| Seneca Park Zoo | Nature | NA |
| Rochester | Tourism Region | TR |
| Finger Lakes | Tourism Region | TR |
| St John Fisher | Campus | CS |
| RIT | Campus | CS |
| Helmer Nature Center | Nature | NA |
| Erie Canal | History, Nature | HI, NA |

FIG. 26A

| Visitor Name | Visitor ID | Venue Type Codes | Primary Venue |
|---|---|---|---|
| Tom | 101 | NA | Erie Canal |
| Pamela | 102 | TR | |
| Paula | 103 | | |
| Susan | 104 | NA, TR | |
| Andrea | 105 | TR | Rochester |
| Matt | 106 | CS | RIT |

*FIG. 26B*

PROVIDING LOCATION BASED CONTENT TO MOBILE DEVICES

CROSS-REFERENCE TO RELATED APPLICATION

This application is a continuation of U.S. Ser. No. 15/013,255 entitled PROVIDING DIGITAL CONTENT FOR MULTIPLE VENUES filed on Feb. 2, 2016 in the names of Parulski et al. which claimed the benefit of U.S. Provisional Patent Application No. 62/116,879, filed Feb. 16, 2015, the entire disclosures of both are hereby incorporated herein by reference.

TECHNICAL FIELD

Some embodiments of the present invention relate to providing tourism content using digital systems. For example, some embodiments of the present invention relate to mobile devices and systems, as well as related methods, for providing digital content for multiple venues at different geographic locations.

BACKGROUND

Smart phones, tablet computers, and other portable devices incorporating wireless connections to the Internet have opened up opportunities for new, entertaining tourism experiences. These devices are currently used to provide location-aware travel guides to various cities and historical sites. For example, various smart phone apps provide a guide to restaurants, bars, and nightlife in cities such as Boston and New York. Some of these apps use the smart phone's built-in GPS to provide various maps and lists of attractions (such as restaurants, hotels, landmarks, and parks) in order of distance from the user's current location.

As another example, Fodor's™ City Apps provides iPhone™ and Android™ apps for a number of major cities, including New York City. The Fodor's apps provide recommendations for sightseeing, restaurants and hotels. Each Fodor's app permits the user to book hotels, restaurants, and entertainment in the particular city, using Expedia™, OpenTable™, and TicketsNow™. It also permits the user to bookmark and create comments about their favorite attractions. The user can download an interactive offline map and reviews, so that the user can browse the map, read reviews, and make notes when in the subway or other areas with poor wireless reception.

It is known to provide preference-aware location-based services, as described in the paper titled "Toward context and preference-aware location-based services" authored by Mokbel, et al published in MobiDE'09, Jun. 29, 2009, Providence, R.I., USA. Such systems tailor their services based on the preference and context of each customer. For example, in a restaurant finder application, the system can use the dietary restrictions, price range, other user ratings, current traffic, and current waiting time to recommend nearby restaurants to the customer, rather than recommending all of the closest restaurants.

Photography is often used to record and share experiences, such as vacation trips, family outings, or seasonal events. Still and video images of such experiences can be captured using mobile image capture devices including camera phones (such as smart phones), digital still cameras, and camcorders. The digital images captured by these image capture devices can be shared by e-mail and uploaded to web sites such as Facebook™ and Flickr™, where they can be viewed by friends. The uploaded images can be printed using on-line photo service providers, such as Shutterfly™. Users can order photo products, such as photo books and collages, which utilize uploaded digital images.

It is known to produce enhanced photo products by combining images captured with connected image capture devices, such as smart phones, and professionally produced digital content related to the area where the photographs were captured, as described in U.S. Pat. No. 8,405,740 titled "Guidance for image capture at different locations", issued to Nichols, et al. It is known to use a "geofence" to create a virtual perimeter for a real-world geographic area, such as a boundary around a store, school, or other area of interest. When the location-aware device (such as a smart phone) of a location-based service (LBS) user enters or exits a geofence, the device can generate a notification. The notification can be sent to an email account or another smart phone. For example, a parent can be notified when a child leaves an area defined by a geofence.

It is known to utilize augmented reality in apps running on smart phones. For example, the Aurasma™ augmented reality platform developed by Hewlett Packard ("HP")™, Palo Alto, Calif. can enable a smart phone to recognize real world images. The real world images can be overlaid with animations, videos, and 3D models to provide augmented reality experiences.

Another known prior art system is "Locast", developed by the MIT media Lab. According to their website, Locast can be used to create interactive narratives that are crafted by linking together videos and photos thematically, geographically, and chronologically. These stories can be explored by viewers in a non-linear fashion. This MIT group has developed the Open Locast Web Application, which includes a map-based front-end built upon OpenLayers and the Google™ Maps API, that provides an interface for browsing, searching, and interacting with media content. This group has also developed the Open Locast Android Application, which provides interactive content recording/creation, browsing and searching. It supports content synchronization for offline content capturing, viewing and browsing, allowing for use in locations with limited or no connectivity.

However, there is a need in the art for improvements in the above-discussed technologies. In particular, there is a need to efficiently provide digital content for multiple tourism venues at different geographic locations.

SUMMARY

At least the above-discussed need is addressed and technical solutions are achieved by various embodiments of the present invention. In some embodiments, a method executed by a data processing device system includes the steps of: storing, in a processor-accessible memory device system communicatively connected to the data processing device system, venue location data defining a geographic boundary of each of a plurality of venues; storing, in the processor-accessible memory device system, venue content data for each of the plurality of venues, the venue content data for each of the plurality of venues including digital content for a plurality of different attractions associated with the venue; determining a current location of a mobile device; analyzing at least the venue location data to determine whether or not the current location of the mobile device is inside the geographic boundary of one or more of the plurality of venues; and if it is determined that the current location of the mobile device is inside the geographic boundary of one or more of the plurality of venues, providing at least some of the venue content data for one of the one or more of the plurality of venues to the mobile device.

In some embodiments, attraction location data defining a geographic location for at least some of the plurality of different attractions associated with at least some of the plurality of venues may be stored in the processor-accessible memory device system communicatively connected to the data processing device system.

In some embodiments, attraction location data may define a geographic boundary for at least some of the plurality of different attractions associated with at least some of the plurality of venues, and the method may include analyzing at least the attraction location data to determine whether or not the current location of the mobile device is inside the geographic boundary of one of the plurality of different attractions; and if it is determined that the current location of the mobile device is inside the geographic boundary of one of the plurality of different attractions, automatically presenting, via the mobile device, at least some of the digital content associated with the one of the plurality of different attractions.

In some embodiments, the digital content may include audio content, video content, or both audio content and video content, and the method may include storing, in the processor-accessible memory device system, at least one user preference associated with a user of the mobile device; and analyzing at least the at least one user preference to determine whether to automatically present the audio content, the video content, or both the audio content and the video content.

In some embodiments, the method may include providing a plurality of venue accounts associated with the plurality of venues which enable a plurality of different individuals or organizations to manage the venue content data for each of the plurality of venues.

In some embodiments, the digital content for at least some of the plurality of different attractions may include a venue link data which identifies a different one of the plurality of venues, and the method may include providing the venue content data for the different one of the plurality of venues to the mobile device responsive to an action by a user of the mobile device.

In some embodiments, the method may include analyzing at least the venue location data to determine whether or not the current location of the mobile device is inside the geographic boundaries of at least two of the plurality of venues; and if it is determined that the current location of the mobile device is inside the geographic boundaries of at least two of the plurality of venues, determining which of the at least two of the plurality of venues is a highest priority venue and providing the venue content data for the highest priority venue to the mobile device.

In some embodiments, the method may include storing, in the processor-accessible memory device system, venue priority data for each of the plurality of venues and analyzing at least the venue priority data to determine the highest priority venue.

In some embodiments, the method may include analyzing at least a size of the geographic boundary of each of the at least two of the plurality of venues to determine the highest priority venue.

In some embodiments, a method executed by a data processing device system includes the steps of: storing, in a processor-accessible memory device system communicatively connected to the data processing device system, respective venue content data for each respective venue of a plurality of venues, each respective venue associated with a respective set of attractions of a plurality of different attractions, each respective venue content data including respective digital content for the respective set of attractions associated with the respective venue, and each respective venue content data including respective attraction location data specifying a respective location of each attraction of the respective set of attractions; determining a current location of a mobile device; determining, based at least on an analysis of each respective attraction location data, a particular venue of the plurality of venues, the particular venue associated with a closest attraction of the plurality of different attractions that is closest to the current location of the mobile device; and providing, to the mobile device, at least some of the respective venue content data for the particular venue.

In some embodiments, each respective attraction location data may define a respective geographic boundary for each of at least some of the respective set of attractions, and the method may include analyzing at least each respective attraction location data to determine whether or not the current location of the mobile device is inside the respective geographic boundary of one of the plurality of different attractions; and if it is determined that the current location of the mobile device is inside the geographic boundary of one of the plurality of different attractions, automatically presenting, via the mobile device, at least some of the digital content associated with the one of the plurality of different attractions.

In some embodiments, at least some of the digital content associated with the one of the plurality of different attractions may include audio content, video content, or both audio content and video content, and the method may include storing, in the processor-accessible memory device system, at least one user preference associated with a user of the mobile device, and analyzing at least the at least one user preference to determine whether to automatically present the audio content, the video content, or both the audio content and the video content.

In some embodiments, a plurality of venue accounts associated with each of the plurality of venues may be provided, to enable a plurality of different individuals or organizations to manage the venue content data for each of the plurality of venues.

In some embodiments, the digital content for at least some of the plurality of different attractions may include venue link data which identifies a different one of the plurality of venues, and the method may include providing at least some of the venue content data for the different one of the plurality of venues to the mobile device responsive to an action by a user of the mobile device.

In some embodiments, the mobile device may be a particular mobile device, and the method may include storing, in the processor-accessible memory device system, a plurality of visitor profiles associated with a plurality of mobile devices including the particular mobile device, wherein each of at least some of the visitor profiles include respective primary venue data identifying a respective primary venue of the plurality of venues; determining if the visitor profile associated with the particular mobile device includes respective primary venue data; and if it is determined that the visitor profile associated with the particular mobile device includes respective primary venue data, providing at least some of the venue content data for the respective primary venue to the particular mobile device.

According to some embodiments, a system may include a network-accessible storage device system storing respective venue content data for each respective venue of a plurality of venues, each respective venue associated with a respective set of attractions of a plurality of different attractions, each respective venue content data including digital content for the respective set of attractions associated with the respective venue, and each respective venue content data including respective attraction location data specifying a respective location of each attraction of the respective set of attractions; a location determination unit configured to determine a current geographic location of a mobile device; and a data processing device system which is configured to at least: determine, based at least on an analysis of each respective attraction location data, a particular venue of the plurality of venues, the particular venue associated with a closest attraction that is closest to the current geographic location of the mobile device; and provide, to the mobile device, at least some of the respective venue content data for the particular venue.

In some embodiments, the respective attraction location data may define a respective geographic boundary for each of at least some of the respective set of attractions, and the data processing device system may be configured to at least: analyze at least each respective attraction location data to determine whether or not the current geographic location of the mobile device is inside the respective geographic boundary of one of the plurality of different attractions; and if it is determined that the current location of the mobile device is inside the geographic boundary of one of the plurality of different attractions, automatically present, via the mobile device, at least some of the digital content associated with the one of the plurality of different attractions.

In some embodiments, at least some of the digital content associated with the one of the plurality of different attractions may include audio content, video content, or both audio content and video content, and the data processing device system may be configured to at least: store, in the network-accessible storage device system, at least one user preference associated with a user of the mobile device; and analyze at least the at least one user preference to determine whether to automatically present the audio content, the video content, or both the audio content and the video content.

In some embodiments, the data processing device system may be configured to at least store, in the network-accessible storage device system, a plurality of venue accounts associated with each of the plurality of venues to enable a plurality of different individuals or organizations to manage the venue content data for each of the plurality of venues.

In some embodiments, the digital content for at least some of the plurality of different attractions may include venue link data which identifies a different one of the plurality of venues, and the data processing device system may be configured to at least: provide at least some of the venue content data for the different one of the plurality of venues to the mobile device responsive to an action by a user of the mobile device.

Various embodiments of the present invention may include systems, devices, or machines that are or include combinations or subsets of any or all of the systems, devices, or machines and associated features thereof described herein.

Further, all or part of any or all of the systems, devices, or machines discussed herein or combinations or subcombinations thereof may implement or execute all or part of any or all of the methods discussed herein or combinations or subcombinations thereof.

Any of the features of all or part of any or all of the methods discussed herein may be combined with any of the other features of all or part of any or all of the methods discussed herein. In addition, a computer program product may be provided that comprises program code portions for performing some or all of any of the methods and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any or all of the computer-readable data storage medium systems (also referred to as processor-accessible memory device systems) described herein is a non-transitory computer-readable (or processor-accessible) data storage medium system (or memory device system) including one or more non-transitory computer-readable (or processor-accessible) storage mediums (or memory devices) storing the respective program(s) which may configure a data processing device system to execute some or all of one or more of the methods described herein.

Further, any or all of the methods and associated features thereof discussed herein may be implemented or executed by all or part of a device system, apparatus, or machine, such as all or a part of any of the systems, apparatuses, or machines described herein or a combination or subcombination thereof.

BRIEF DESCRIPTION OF THE DRAWINGS

It is to be understood that the attached drawings are for purposes of illustrating aspects of various embodiments and may include elements that are not to scale.

FIG. 7 depicts stored data in a processor-accessible memory device system, the data indicating venue affiliate names and affiliate users, for enabling a plurality of different individuals to manage venue account data for different venues, according to some embodiments of the present invention;

FIG. 15A depicts an example of a mobile device user interface screen for introducing a first venue, according to some embodiments of the present invention;

FIG. 15B depicts an example of a mobile device user interface screen for introducing a second venue, according to some embodiments of the present invention;

FIG. 16A depicts a mobile device user interface screen for introducing a plurality of different attractions located within the first venue, according to some embodiments of the present invention;

FIG. 16B depicts a mobile device user interface screen for introducing a plurality of different attractions located within the second venue, according to some embodiments of the present invention

FIG. 21A depicts a mobile device user interface screen for enabling the user of the mobile device to select one of a plurality of tours of attractions within the first venue, according to some embodiments of the present invention;

FIG. 21B depicts a mobile device user interface screen for enabling the user of the mobile device to select one of a plurality of tours of attractions within the second venue, according to some embodiments of the present invention;

FIG. 26A depicts stored data in a processor-accessible memory device system, the data indicating venue affiliate names and venue types for enabling the content of different venues to be associated with one or more venue types, according to some embodiments of the present invention;

FIG. 26B depicts stored data in a processor-accessible memory device system, the data indicating visitor profiles, including visitor names, visitor identifiers, venue types, and primary venues, for enabling a specific venue or a specific venue type to be given a high priority for specific visitors, according to some embodiments of the present invention;

DETAILED DESCRIPTION

Figure 1:
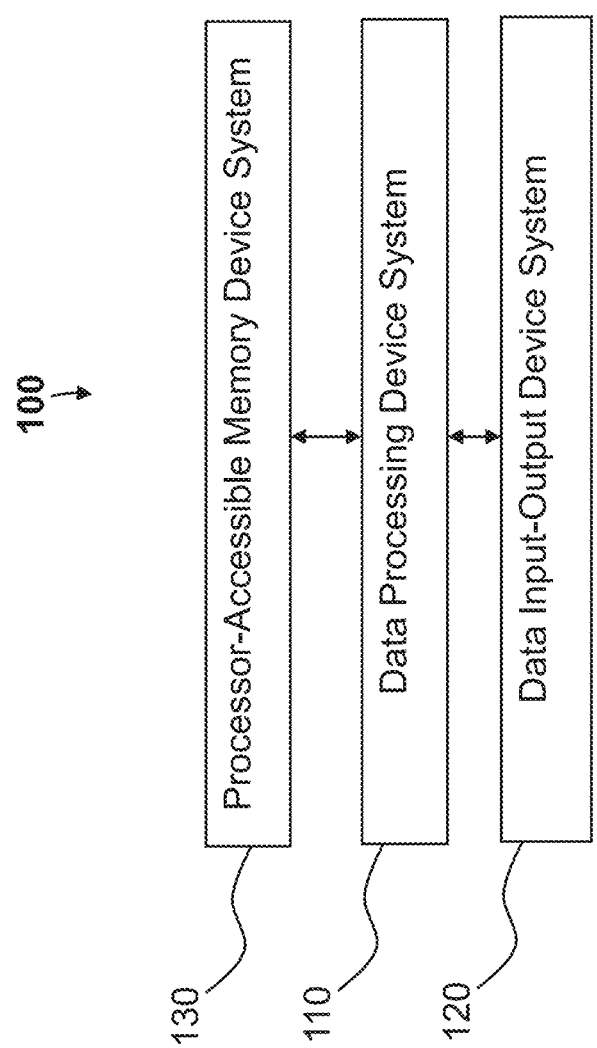
FIG. 1 illustrates a system configured to provide digital content for multiple venues at different geographic locations, according to some embodiments of the present invention.

In the following description, some embodiments of the present invention are described in terms that may be implemented at least in part as one or more software programs configured to be executed by a data processing device system. Some or all of such software programs may be equivalently constructed in hardware. Software and hardware not specifically shown, suggested, or described herein that is useful for implementation of any of various embodiments of the present invention are conventional and within the ordinary skill of the art.

In the descriptions herein, certain specific details are set forth in order to provide a thorough understanding of various embodiments of the invention. However, one skilled in the art will understand that the invention may be practiced at a more general level without these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects. In addition, unless otherwise explicitly noted or required by context, the word "subset" is intended to mean a set having the same or fewer elements of those present in the subset's parent or superset.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, or device system resides across different housings. The word "device" may equivalently be referred to as a "device system" in some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to at least FIGS. 1, 2, and 3, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms. For another example, "image information Y" may undergo a noise filtering process, and a reference to "image information Y" is intended to include both the pre-processed form and the noise-filtered form. In other words, both the pre-processed form and the noise-filtered form are considered to be "image information Y". In order to stress this point, the phrase "or a derivative thereof" or the like may be used herein. Continuing the preceding example, the phrase "image information Y or a derivative thereof" refers to both the pre-processed form and the noise-filtered form of "image information Y", with the noise-filtered form potentially being considered a derivative of "image information Y". However, non-usage of the phrase "or a derivative thereof" or the like nonetheless includes derivatives or modifications of information or data just as usage of such a phrase does, as such a phrase, when used, is merely used for emphasis.

FIG. 1 schematically illustrates a system 100 configured to provide digital content, for example, digital tourism content, for multiple venue, such as multiple tourism venues at different geographic locations, according to some embodiments of the present invention. The system 100 may include a data processing device system 110, a data input-output device system 120, and a processor-accessible memory device system 130. The processor-accessible memory device system 130 and the data input-output device system 120 are communicatively connected to the data processing device system 110.

The data processing device system 110 includes one or more data processing devices that implement or execute, in conjunction with other devices, such as those in the system 100, methods of various embodiments of the present invention, including the example methods of FIG. 4, FIG. 5, FIG. 24 and FIG. 25 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad™, a personal digital assistant, a cellular phone, a mobile device, a smart phone, or any other device for processing data, managing data, or handling data, whether implemented with electrical, magnetic, optical, biological components, or otherwise. In this regard, while some embodiments of the present invention are described herein in the context of one or more mobile devices, such as a smart phone, the invention is not so limited, and any other data processing device system may be used instead of or in addition to a mobile device.

The processor-accessible memory device system 130 includes one or more processor-accessible memory devices configured to store program instructions and other information, including the information and program instructions needed by a data processing device system to execute the methods of various embodiments, including the example methods of FIG. 4, FIG. 5, FIG. 24 and FIG. 25 described herein. In this regard, each of the steps illustrated in the example methods of FIG. 4, FIG. 5, FIG. 24 and FIG. 25 may represent program instructions stored in the processor-accessible memory device system 130 and configured to cause a data processing device system to execute the respective step. The processor-accessible memory device system 130 may be a distributed processor-accessible memory device system including multiple processor-accessible memory devices communicatively connected to the data processing device system 110 via a plurality of computers and/or devices. On the other hand, the processor-accessible memory device system 130 need not be a distributed processor-accessible memory system and, consequently, may include one or more processor-accessible memory devices located within a single data processing device.

Each of the phrases "processor-accessible memory", "processor-accessible memory device", and the like is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, EEPROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory device system 130 is shown separately from the data processing device system 110 and the data input-output device system 120, one skilled in the art will appreciate that the processor-accessible memory device system 130 may be located completely or partially within the data processing device system 110 or the data input-output device system 120. Further in this regard, although the data input-output device system 120 is shown separately from the data processing device system 110 and the processor-accessible memory device system 130, one skilled in the art will appreciate that such system may be located completely or partially within the data processing device system 110 or the processor-accessible memory device system 130, depending upon the contents of the input-output device system 120. Further still, the data processing device system 110, the data input-output device system 120, and the processor-accessible memory device system 130 may be located entirely within the same device or housing or may be separately located, but communicatively connected, among different devices or housings. In the case where the data processing device system 110, the data input-output device system 120, and the processor-accessible memory device system 130 are located within the same device, the system 100 of FIG. 1 may be implemented by a single application-specific integrated circuit (ASIC) in some embodiments.

The data input-output device system 120 may include a mouse, a keyboard, a touch screen, a voice recognition unit, a computer, a processor-accessible memory device, a network-interface-card or network-interface circuitry, or any device or combination of devices from which a desired selection, desired information, instructions, or any other data is input to the data processing device system 110. The data input-output device system 120 may include a user-activatable control system that is responsive to a user action. The data input-output device system 120 may include any suitable interface for receiving a selection, information, instructions, or any other data from other devices or systems described in various ones of the embodiments.

The data input-output device system 120 also may include an image generating device system, a display device system, an audio generating device system, an audio transducer, a computer, a processor-accessible memory device, a network-interface-card or network-interface circuitry, or any device or combination of devices to which information, instructions, or any other data is output by the data processing device system 110. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

The user interfaces of at least FIG. 8, FIG. 9A, FIG. 9B, FIG. 10A, FIG. 10B, FIG. 11, FIG. 12, FIG. 13A, FIG. 13B, FIG. 14A, FIG. 14B, FIG. 15A, FIG. 15B, FIG. 16A, FIG. 16B, FIG. 17, FIG. 18A, FIG. 18B, FIG. 19, FIG. 20, FIG. 21A, FIG. 21B, FIG. 22A, FIG. 22B, FIG. 27A and FIG. 27B or a combination thereof may be implemented as part of the data input-output device system 120, according to various ones of some embodiments of the present invention.

Figure 2:
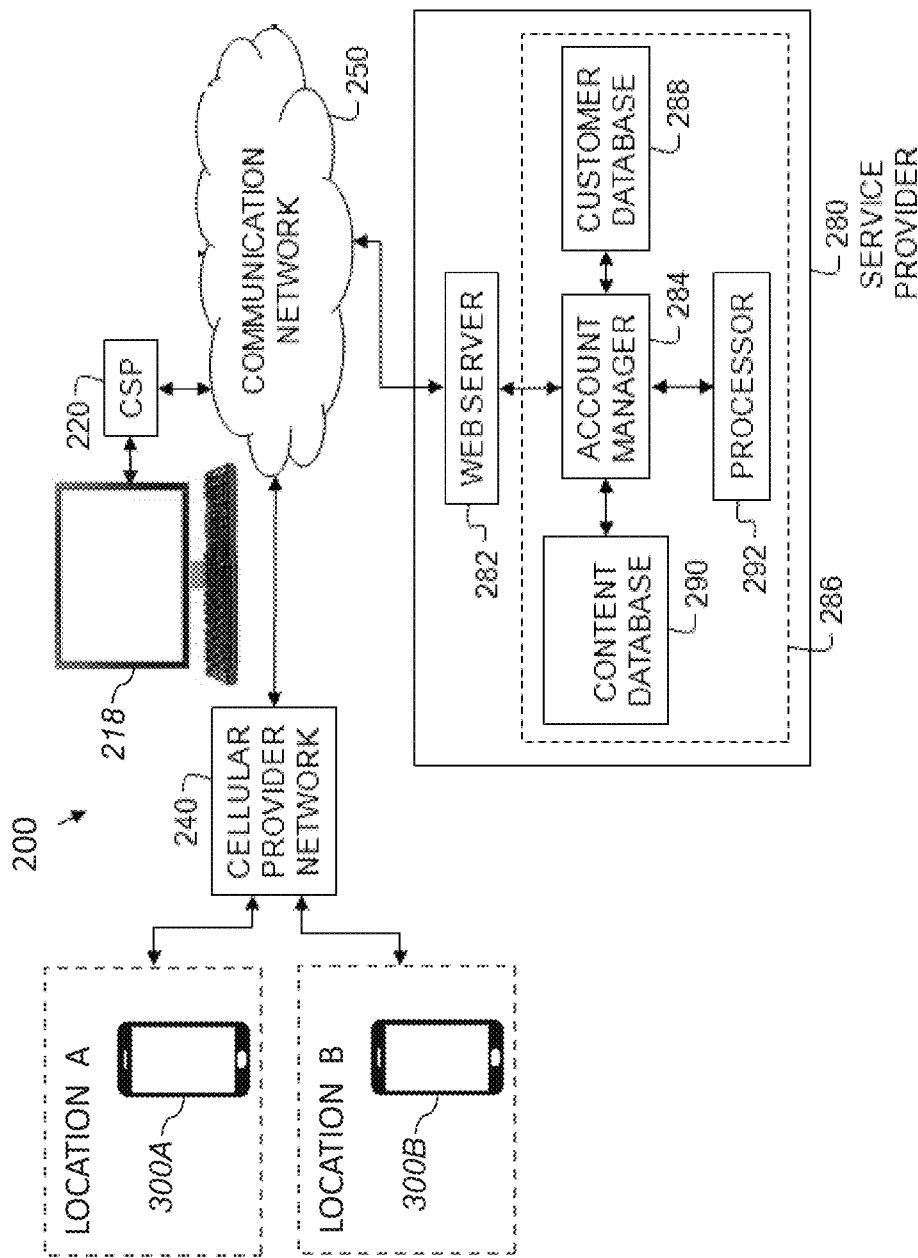
FIG. 2 is a block diagram of a particular implementation of the system of FIG. 1 in accordance with some embodiments of the present invention.

FIG. 2 is a block diagram of a particular implementation of the system of FIG. 1 in accordance with some embodiments of the present invention. For example, according to various respective embodiments, any part of system 200 that includes a data processing device may be included as all or part of the data processing device system 110; any part of system 200 that includes a memory device may be included as all or part of the processor-accessible memory device system 130; and any part of system 200 that provides information to or outputs information from a data processing device may be included as all or part of the data input-output device system 120.

In FIG. 2, there is illustrated a system 200 for providing digital content for multiple venues which are located at different geographic locations. As used herein the phrase digital content relates to a variety of digital information, including digital audio, digital graphics images, digital still photographs, digital video images and animations, and text, including plain text, web links, venue links, email links, and phone numbers. It will be understood that digital venues can include digital tourism venues such as, for example, cities (e.g. Rochester, N.Y.), counties (e.g. Door County in Wisc.), regions (e.g. Napa Valley in Calif.), animal parks and zoos (e.g. Seneca Park Zoo in Rochester, N.Y.), amusement and theme parks (e.g. Seabreeze Park in Rochester, N.Y.), art installations (e.g. Wall/Therapy murals located around Rochester, N.Y.), and scenic or historic routes or waterways (e.g. Route 66 or the Erie Canal). It will be understood that each of these venues covers a geographic area, and that the geographic area can be described using either a precise geographic boundary (e.g. the precise border of a city or county) or an approximate geographic boundary (e.g. a circle centered at a particular location which has a radius sized to include most of the area of the city or county)

As described herein, providing digital content for a tourism venue relates to, among other things, providing digital content related to the venue (e.g. content related to exhibits or the hours of operation of the Seneca Park Zoo), or related to an attraction within the venue (e.g. text, digital audio, digital still images, or digital video images related to the African Elephant Exhibit at the Seneca Park Zoo) to a mobile device, such as a smart phone or tablet computer, used by a visitor to the venue.

In FIG. 2, a first mobile device, such as smart phone 300A located at a first location A, and a second mobile device, such as smart phone 300B, located at a second location B, are communicatively connected with a service provider 280 using a cellular provider network 240. The cellular provider network 240 provides both voice and data communications using transmission devices located at cell towers throughout a region. The cellular provider network 240 is communicatively connected to a communication network 250, such as the Internet. It will be understood that location A can be within the geographical boundary of a first venue (e.g. Irondequoit, N.Y.) and that location B can be within the geographical boundary of a second venue (e.g. Door County, Wis.).

It will be understood that each mobile device, such as smart phone 300A, is typically owned or leased by a particular user (e.g. a particular visitor) who is visiting one or more venues. The smart phone 300A can be used to present digital content to a single user or to a group of users who are viewing a display of the smart phone 300A, or listening to audio provided by the smart phone 300A. The user or group of users (e.g. group of visitors) may be situated in a vehicle such as a car, for example, and the digital content can be provided by the vehicle's audio system using, for example, a Bluetooth™ connection to transmit the digital audio from the smart phone 300A to the vehicle's audio system as is well-known in the art.

It will be understood that system 200 typically includes many other mobile devices, in addition to smart phone 300A and smart phone 300B. It will be understood that the system 200 can include multiple cellular provider networks 240, for example, networks provided by companies such as Verizon, AT&T, T-mobile and Sprint, which can be communicatively connected to the communication network 250.

System 200 also includes one or more computers 218 which communicate with the communication network 250 and service provider 280 via a communication service provider (CSP) 220. It will be understood that computers 218 can include desktop, laptop, tablet, and mobile computers (e.g. smart phones) using various operating systems. In some embodiments, each of a plurality of different individuals or organizations which manage venue content for each of a plurality of venues can use a different one of computers 218 to manage the venue content for their venue. For example, in some embodiments, the graphical user interface screens which will be described later in reference to FIG. 8, FIG. 9A, FIG. 9B, FIG. 10A, FIG. 10B, FIG. 11, FIG. 12, FIG. 13A, FIG. 13B, FIG. 14A and FIG. 14B can be displayed using one of more of the computers 218.

In some embodiments, computer 218 enables a remote user, who might not be able to travel to the tourism venue, to obtain a virtual experience from his or her home. For example, the user of one of the computers 218 can use a computer mouse to change their virtual location on a digital map displayed in a window on the display of the computer 218, as will be described later with respect to FIG. 27A and FIG. 27B. The computer 218 can then be used, rather than one of the smart phones 300A, 330B, to present the digital content for attractions within one of the venues to a remote user, who may be testing the venue content to check that the proper content has been associated with the proper attractions, or who may be located in another country, for example, and unable to travel to the tourism venue.

The communications network 250 enables communication with a service provider 280. Service provider 280 includes a web server 282 for interfacing with communications network 250. It will be understood that the system 200 can include a plurality of service providers 280, which provide different services and can support different regions of the world. In addition to interfacing with communications network 250, web server 282 transfers data to a computer system 286 which manages data associated with the various venues (e.g. venue content data as well as venue management account data). The venue management account data is used to permit the individuals responsible for managing the venue content data for particular venues to upload, modify, and otherwise manage the venue content data for a plurality of different attractions within their venue.

The computer system 286 includes an account manager 284, which may be the processor 292 executing software that permits the creation and management of individual customer (e.g. venue management) accounts, which are stored in customer database 288. Thus, customer database 288 may be stored in a network-accessible storage device system (which may be all or part of processor-accessible memory device system 130), and may provide a plurality of venue accounts associated with different venues. These venue accounts enable a plurality of different individuals or organizations to manage the venue content data for a plurality of venues. The venue content data for these venues in stored in content database 290.

The account manager 284 permits the uploading and management of venue location data and venue content data by one or more users who are authorized to manage a particular venue. For example, digital content such as text, digital audio recordings, digital still images, and digital video images associated with various attractions located within the venue can be stored in content database 290. Thus, content database 290 provides an example of a processor-accessible memory device system (e.g., a storage device system) which stores venue content data for each of a plurality of venues, such as for a plurality of different attractions located within the geographic boundary of a respective venue. In some embodiments, computers 218 are used by a plurality of content curators or organizations associated with each of a plurality of venues, to provide, manage, and update the venue content data stored in a content database 290.

In some embodiments, the customer database 288 can also be used to store visitor profiles for at least some of the visitors to the various venues, who are the users of smart phones 300A and 300B. The visitor profiles can be stored in visitor accounts which can include, for example, personal information such as the visitor's nickname, full name and address, demographic information, and interests. In some embodiments, the demographic information in the visitor profile can include the approximate age of the user, whether the user is male or female, or a language preference of the user, since the visitor may be visiting from another country. In some embodiments, the visitor profiles stored in customer database 288 can also include billing information such as credit card information. In some embodiments, the visitor profiles can information which identifies one or more venue types, or a primary venue, as will be described later in reference to FIG. 26B.

In some embodiments, content database 290 stores venue location data defining the geographic center, the boundary/ies, or both the geographic center and the boundary/ies of each of a plurality of venues. In some embodiments, content database 290 stores venue priority data for at least some of the venues. In some embodiments, content database 290 stores venue type data for at least some of the venues. It will be understood that in some embodiments, the customer database 288 or the content database 290 can be distributed over several computers at the same physical site, or at different sites.

With respect to FIG. 1, any of various combinations of the components of FIG. 2 may form all or part of the various components of FIG. 1, according to respective various embodiments of the present invention. For example, in some embodiments, the system 100 corresponds only to the smart phone 300A or the smart phone 300B. In other embodiments, the system 100 corresponds to the service provider 280, where the processor 292 may correspond to the data processing device system 110, the databases 288 and 290 may be stored in the memory device system 130, the account manager and web server may be applications stored in the memory device system 130, and the communication network 250 may interface with the input-output device system 120. In some embodiments, the system 100 corresponds to the smart phone 300A and the service provider 280, such that, for example, the CPU of the smart phone 300A and the processor 292 both form part of the data processing device system 110. In some embodiments, the system 100 corresponds to the entirety of the system 200. Accordingly, it can be seen that the present invention is not limited to any particular correspondence configuration between the system of FIG. 1 and the system of FIG. 2. The same is true with respect to any particular correspondence configuration between the system of FIG. 1 and the system of FIG. 3, which will now be discussed, or any other system described herein.

Figure 3:
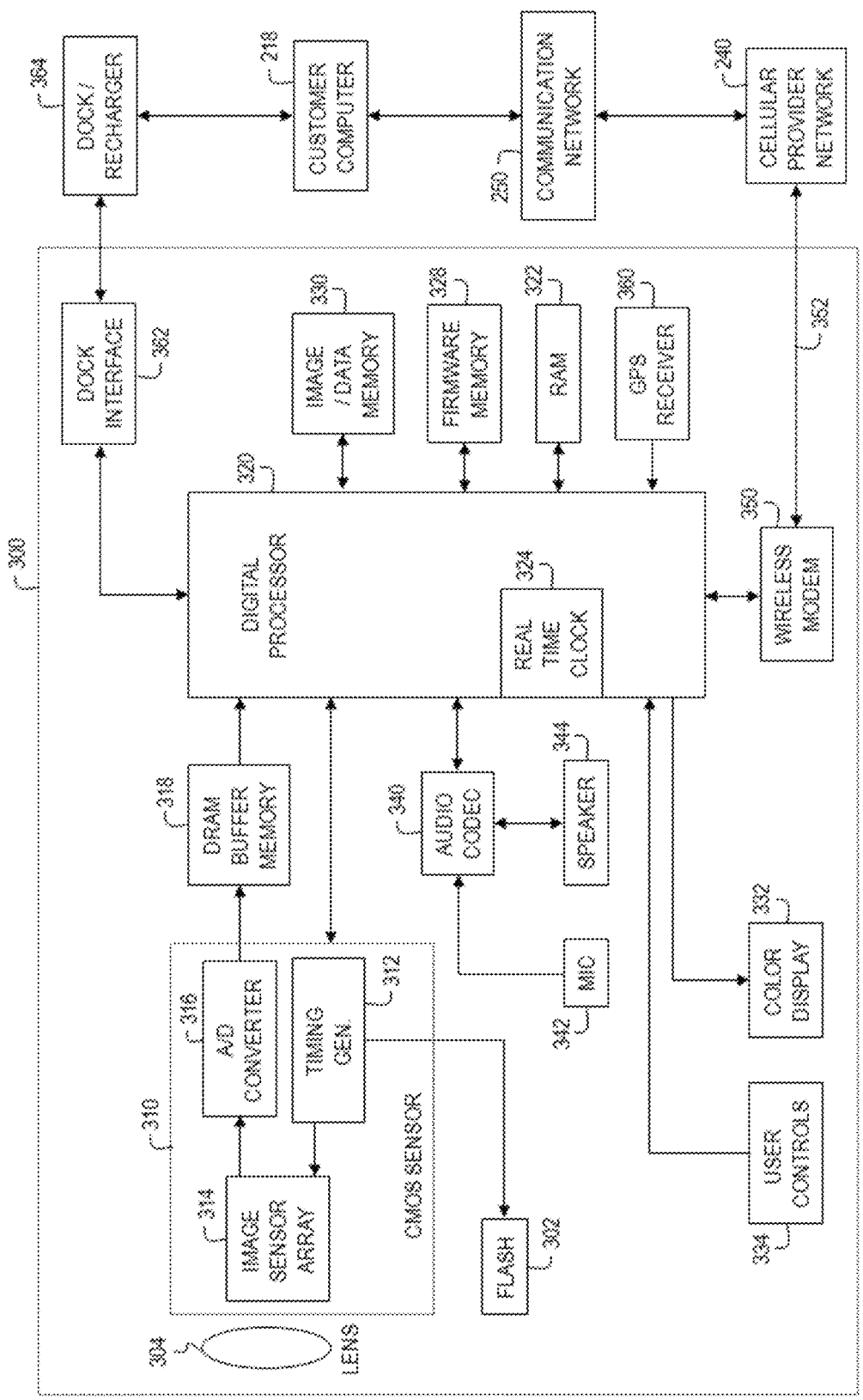
FIG. 3 is a block diagram of a smart phone, which may be all or part of the system of FIG. 1, according to some embodiments of the present invention.

FIG. 3 depicts a block diagram of a smart phone 300 used in the system of FIG. 2, according to some embodiments of the present invention. It will be understood that other types of mobile devices, such as tablet computers, smart glasses, and wireless digital cameras, can be used in the system described in reference to FIG. 2.

In some embodiments, the smart phone 300 is a portable, battery operated device, small enough to be easily handheld by a visitor. The smart phone 300 can utilize an operating system such as the iOS operating system developed by Apple Inc, Sunnyvale, Calif. or the Android mobile platform, developed by Google, Mountain View, Calif. The operating system can be stored in firmware memory 328 and utilized by digital processor 320 (which may, e.g., form at least part of the data processing device system 110 in FIG. 1). The smart phone 300 can run applications (i.e., "apps") which are pre-installed when the smart phone is purchased, or are downloaded from the service provider 280. The digital processor 320 may use, for example, the Android software stack, which includes a Linux-based operating system, middleware, and applications. This permits additional software applications ("apps") to be downloaded from the service provider 280, stored in the firmware memory 328, and used to provide various functions, including the processes to be described in reference to FIG. 4.

The smart phone 300 includes a camera module including a lens 304 which focuses light from a scene (not shown) onto an image sensor array 314 of a CMOS image sensor 310. The image sensor array 314 can provide color image information using the well-known Bayer color filter pattern. The image sensor array 314 is controlled by timing generator 312, which also controls a flash 302 in order to illuminate the scene when the ambient illumination is low. The image sensor array 314 can have, for example, 2560 columns×1920 rows of pixels.

The smart phone 300 can also capture video clips by summing multiple pixels of the image sensor array 314 together (e.g. summing pixels of the same color within each 4 column×4 row area of the image sensor array 314) to create a lower resolution video image frame. The video image frames are read from the image sensor array 314 at regular intervals, for example, using a 30 frame per second readout rate.

The analog output signals from the image sensor array 314 are amplified and converted to digital data by the analog-to-digital (A/D) converter circuit 316 in the CMOS image sensor 310. The digital data is stored in a DRAM buffer memory 318 and subsequently processed by a digital processor 320 controlled by the firmware stored in firmware memory 328, which can be flash EPROM memory. The digital processor 320 includes a real-time clock 324, which keeps the date and time even when the smart phone 300 and digital processor 320 are in their low power state. The digital processor 320 produces digital images that are stored as digital image files using image/data memory 330. The phrase "digital image" or "digital image file", as used herein, refers to any digital image or digital image file, such as a digital still image or a digital video file.

The processed digital image files are stored in the image/data memory 330, along with the date/time that the image was captured provided by the real-time clock 324 and the location information provided by a location determination unit, such as GPS receiver 360. In some embodiments, location information can be provided by interacting with a beacon attached to a nearby object, such as a beacon using the well-known Bluetooth Low Energy (BLE) technology. It will be understood that in some embodiments, either GPS receiver 360 or a BLE beacon can be used to determine a current location of the smart phone 300.

In some embodiments, the digital processor 320 performs color interpolation followed by color and tone correction, in order to produce rendered sRGB image data. In some embodiments, the digital processor 320 can also provide various image sizes selected by the user. In some embodiments, rendered sRGB image data is then JPEG compressed and stored as a JPEG image file in the image/data memory 330. In some embodiments, the JPEG file uses the so-called "Exif" image format. This format includes an Exif application segment that stores particular image metadata using various TIFF tags. Separate TIFF tags are used to store the date and time the picture was captured and the GPS co-ordinates, as well as other camera settings such as the lens f/number.

In some embodiments, the CMOS sensor 310 is used to capture QR codes or bar codes which are located at a visitor information center or at an attraction location. In some embodiments, the captured image of the QR code or the bar code can be used, for example, to determine the URL for an app which is downloaded to the smart phone 300 from the service provider 280 in order to implement some or all of the steps which will be described in relation to FIG. 4, FIG. 5, FIG. 24 and FIG. 25. In some embodiments, the QR code or bar code can be customized for a particular venue, and can be therefore used to determine that the smart phone 300 is currently located within the geographic boundary of a particular venue. In some embodiments, the venue in which the app was downloaded can be stored as the Primary Venue in the visitor profile.

In some embodiments, the digital processor 320 also creates a low-resolution "thumbnail" size image or "screennail" size image, which can be stored in RAM memory 322 and supplied to a color display 332, which can be, for example, an active matrix LCD or organic light emitting diode (OLED) touch screen display. After images are captured, they can be reviewed on the color display 332 by using the thumbnail or screennail image data.

The graphical user interface displayed on the color display 332 is controlled by user controls 334. The graphical user interface enables the visitor to control the functions of the smart phone 300, for example, to make phone calls, to launch and control apps, to capture images, and to send and view text messages, email messages and videos. User controls 334 can include a touch screen overlay on the color display 332, as well as buttons, keyboard switches, rocker switches, or joysticks. In some embodiments, the user controls 334 can include voice recognition or image based gesture recognition.

An audio codec 340 connected to the digital processor 320 receives an audio signal from a microphone 342 and provides an audio signal to a speaker 344 and a headphone jack (not shown). These components can be used both for telephone conversations and to record and playback digital audio. For example, a digital audio recording (or a digital video recording which includes an audio track) relating to a particular attraction (e.g. an Orangutan exhibit) located at a particular geographic location associated with a venue (such as the Seneca Park Zoo) can be automatically played back (e.g., presented) when it is determined that the smart phone 300 is within the geographic boundary of the particular attraction location, as will be described later in reference to FIG. 18A. In addition, a vibration device (not shown) can be used to provide a silent (e.g., non-audible) notification of an incoming phone call or message, or to inform a user that they have entered the geographic boundary, such as a geofence, for a particular attraction within the venue.

In some embodiments, a digital audio signal can be provided from the digital processor 320 to the wireless modem 350, which can transmit the digital audio signal over an RF channel 352 using, for example, the well-known Bluetooth protocol. The digital audio signal can be received by a wireless modem in a vehicle audio system (not shown), which can amplify and play the audio using speakers installed in the vehicle. This permits the driver and passengers in the vehicle to listen to the audio recording.

A dock interface 362 can be used to connect the smart phone 300 to a dock/charger 364, which is optionally connected to customer computer 218. The dock/recharger 364 can be used to recharge the batteries (not shown) in the smart phone 300. The dock interface 362 can conform to, for example, the well-know USB interface specification. Alternatively, the interface between the smart phone 300 and the customer computer 218 can be a wireless interface, such as the well-known Bluetooth wireless interface or the well-know 802.11 wireless interface. In some embodiments, the dock interface 362 can be used to transfer venue location data and venue content data for one or more venues to smart phone 300 prior to leaving on a vacation trip. This enables the smart phone 300 to present the venue content data in locations where a wireless connection is expensive, weak, or unavailable.

The digital processor 320 is communicatively connected to a wireless modem 350, which enables the smart phone 300 to transmit and receive information via an RF channel 352. The wireless modem 350 communicates over a radio frequency (e.g. wireless) link with the cellular provider network 240, described earlier in reference to FIG. 2, which can utilize, for example, a CDMA network, a 3GSM network, a 4 GSM network, or other wireless communication networks. In some embodiments, the wireless modem 350 also communicates using local area wireless interface standards, such as the well-know 802.11 interface standards or the well-known Bluetooth standard.

It will be understood that the functions of digital processor 320, because it may form at least part of the data processing device system 110, can be provided using a single programmable processor or by using multiple programmable processors, including one or more digital signal processor (DSP) devices. Alternatively, the digital processor 320 can be provided by custom circuitry (e.g., by one or more custom integrated circuits (ICs) designed specifically for use in smart phones), or by a combination of programmable processor(s) and custom circuits, just like the data processing device system 110. It will be understood that communicative connections between the digital processor 320 and some or all of the various components shown in FIG. 3 can be made using a common data bus. For example, in some embodiments the connection between the digital processor 320, the DRAM buffer memory 318, the image/data memory 330, and the firmware memory 328 can be made using a common data bus.

Figure 4:
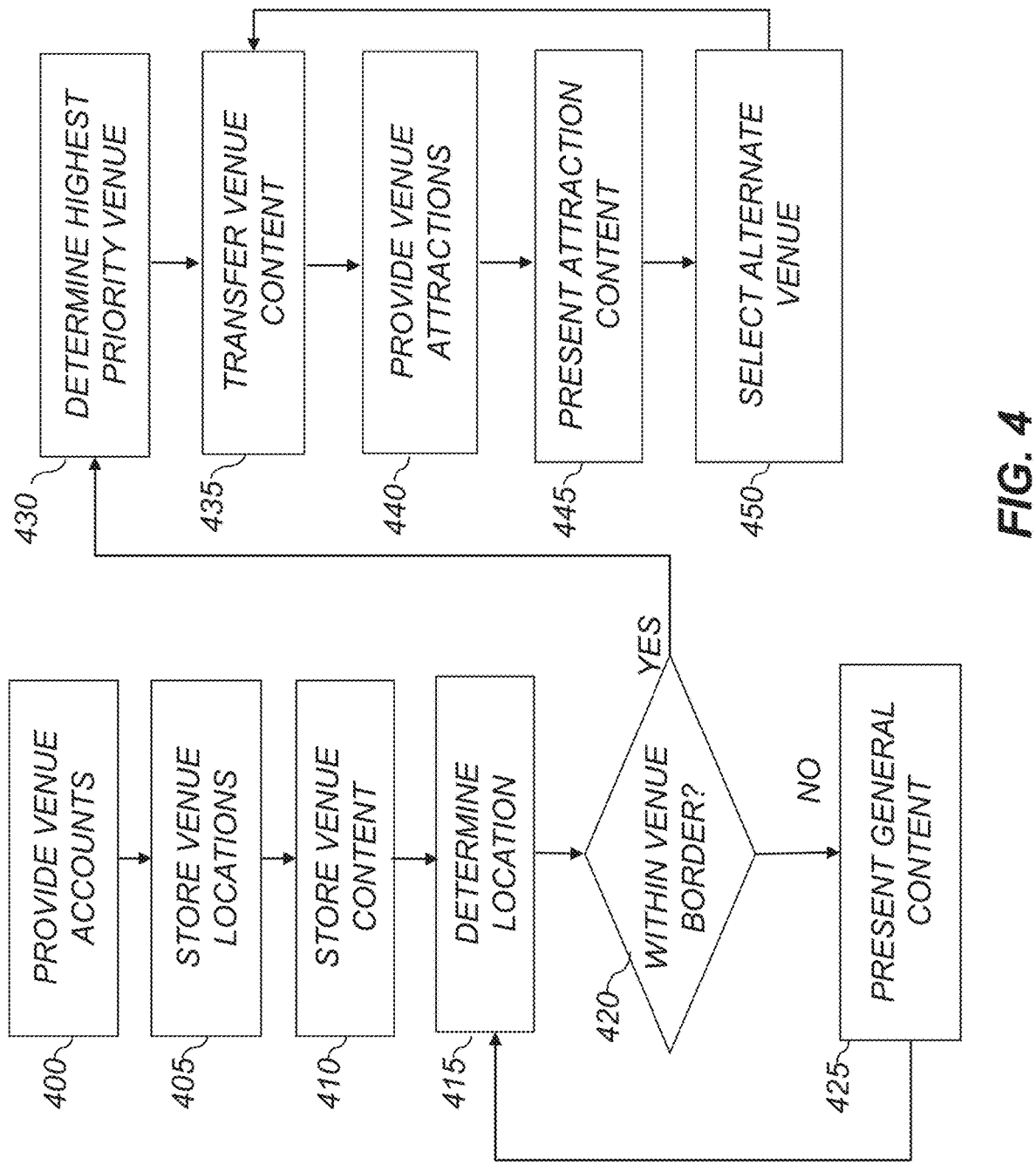
FIG. 4 illustrates a method depicting steps for providing digital content for multiple tourism venues at different geographic locations, according to some embodiments of the present invention.

FIG. 4 is a flow diagram depicting steps for providing digital content for multiple tourism venues at different geographic locations, according to some embodiments of the present invention. In some embodiments, the steps are performed by the service provider 280 (e.g., web server 282, computer system 286, or both, thereof) in FIG. 2. In other embodiments, some or all of the steps are performed by the smart phone 300 in FIG. 3. It will be understood, for example, that system 200 depicted in FIG. 2 can automatically provide different venue content data to different visitors who are using smart phones 300A and 300B, depending on their current geographic location, as will be described below. The venue content data for each particular venue can include digital content for a plurality of different attractions associated with the particular venue (e.g. located within the geographic boundary of the particular venue).

In some embodiments, a single mobile app can be downloaded from service provider 280 by many different users of smart phones 300A, 300B located across a wide geographic area, such as the United States, and used to automatically access digital content for any nearby tourism venue for which venue content data has been stored by the service provider 280. As a result, each venue does not need to develop and distribute a custom app for their venue. Instead, an individual associated with the venue can be authorized by service provider 280 to manage the venue content data for their venue. This enables a new venue to quickly and easily provide digital content for their venue to all of the visitors who have installed the single mobile app on their smart phone 300. When each visitor (e.g. each user of one of the smart phones 300A, 300B) launches the single mobile app, it will automatically access the digital content for the highest priority venue, as will be described later, for example, in reference to determine highest priority venue step 430 in FIG. 4. As a result, a visitor to the Wisconsin Dells can be automatically provided with venue content data for a first particular venue (e.g. Wisconsin Dells) without having to locate and download an app for the Wisconsin Dells area, while a visitor to the Grand Canyon can be automatically provided with venue content data for a different venue (e.g. Grand Canyon National Park) without having to locate and download an app for the Grand Canyon area.

In provide venue accounts step 400 of FIG. 4, accounts are established or provided for a plurality of different individuals or organizations and are associated with a plurality of different venues. These accounts enable different individuals or organizations to manage the venue content data for each of the plurality of different venues.

Figure 6:
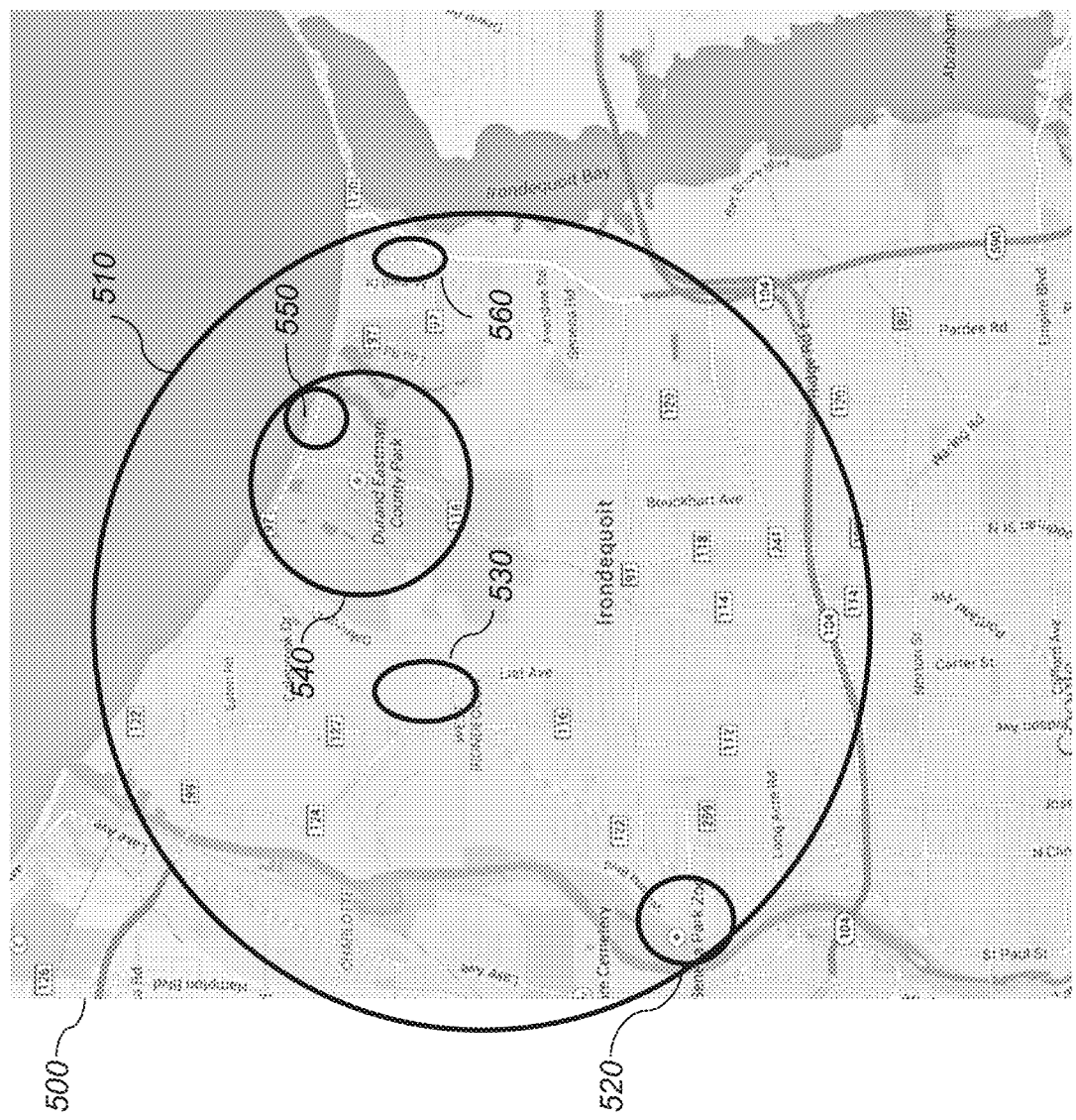
FIG. 6 is an example of a map depicting the geographic boundaries of a plurality of venues, according to some embodiments of the present invention.

FIG. 6 is an example of a map 500 depicting the geographic boundaries of a plurality of venues, according to some embodiments of the present invention, such geographic boundaries may be included in the stored venue location data. The geographic boundaries depicted in FIG. 6 include a circle for Irondequoit 510 which roughly approximates the boundary of the Town of Irondequoit, a circle for Zoo 520 which roughly approximates the border of the Seneca Park Zoo, an ellipse for Helmer Center 530 which roughly approximates the border of the Helmer Nature Center, circle for Durand 540 which roughly approximates the border of Durand Eastman Park, a circle for Derby 550, which circles the portion of Lake Shore Boulevard used for the annual Soap Box Derby, and an ellipse for Sea Breeze 560 which corresponds to the Sea Breeze Amusement Park. It will be understood that in some embodiments, some or all of the geographic boundaries could be described more precisely, for example, by using the GPS co-ordinates of the corners of an irregular polygon.

It will be understood from FIG. 6 that a visitor to the Seneca Park Zoo will be located within both the circle for Irondequoit 510 and the circle for Zoo 520, and is therefore within the geographic boundary of two different venues, but will most likely be interested in the content for the Seneca Park Zoo. Similarly, a visitor to Sea Breeze Amusement Park will be located within both the ellipse for Sea Breeze 560 and the circle for Irondequoit 510, but will most likely be interested in the content for the Sea Breeze Amusement Park venue.

In some embodiments, the venue content data for some of the plurality of venues can be provided by service provider 280 to mobile devices, such as smart phone 300, only during a defined time period corresponding to festivals and special events. For example, the Soap Box Derby is scheduled for only one weekend each year (such as Aug. 23-24, 2014), and the venue content is relevant to visitors only around this time period. It will be understood from FIG. 6 that a visitor who is located within the circle for Derby 550 is also located within the circle for Durand 540 and the circle for Irondequoit 510, and is therefore within the geographic boundary of three different venues. During the period of time that the Soap Box Derby is underway, a visitor located within the circle for Derby 550 is most likely interested in the content for the Soap Box Derby venue, but during other times the visitor is most likely interested in the content for the Durand Eastman Park venue.

As another example, both the Helmer Nature Center and Durand Eastman Park offer cross country skiing during the winter months, when there is sufficient snowfall. In some embodiments, the ellipse for Helmer Center 530 and the circle for Durand 540 can together define a cross country skiing venue for Irondequoit. In this example, the venue content data for this Irondequoit cross country skiing venue can be provided during the winter months (e.g. from December to March) when information from the national weather service (or information manually entered by an individual managing this venue) indicates good conditions (e.g. sufficient snowfall) for skiing.

FIG. 7 depicts a table of venue affiliate names and affiliate users, and indicates the plurality of different individuals or organizations who are permitted to manage the venue account data for different venues, according to some embodiments of the present invention. In some embodiments, the service provider 280 (e.g., web server 282, computer system 286, or both, thereof) in FIG. 2 establishes accounts for each affiliate organization and each affiliate user, such as the Finger Lakes Visitor Connection affiliate organization and its users (e.g. Val and David), the Seneca Park Zoo affiliate organization and its user (e.g. David), and the Soap Box Derby affiliate organization and its user (e.g. Jim). In some embodiments, the service provider 280 (e.g., web server 282, computer system 286, or both, thereof) also establishes a master account, such as the TourBlend Master Account, to permit individuals (e.g. Ken and Les) employed by the service provider organization to help oversee the management of all of the venue content data and venue location data.

In store venue locations step 405 of FIG. 4, venue location data defining the geographic boundaries of a plurality of venues are stored in a processor-accessible memory device system that is communicatively connected to a data processing device system, for example, the processor-accessible memory device system 130 in FIG. 1 or the Content Database 290 in FIG. 2. The geographic boundaries can include, for example, the boundaries described earlier relative to FIG. 6.

Figure 8:
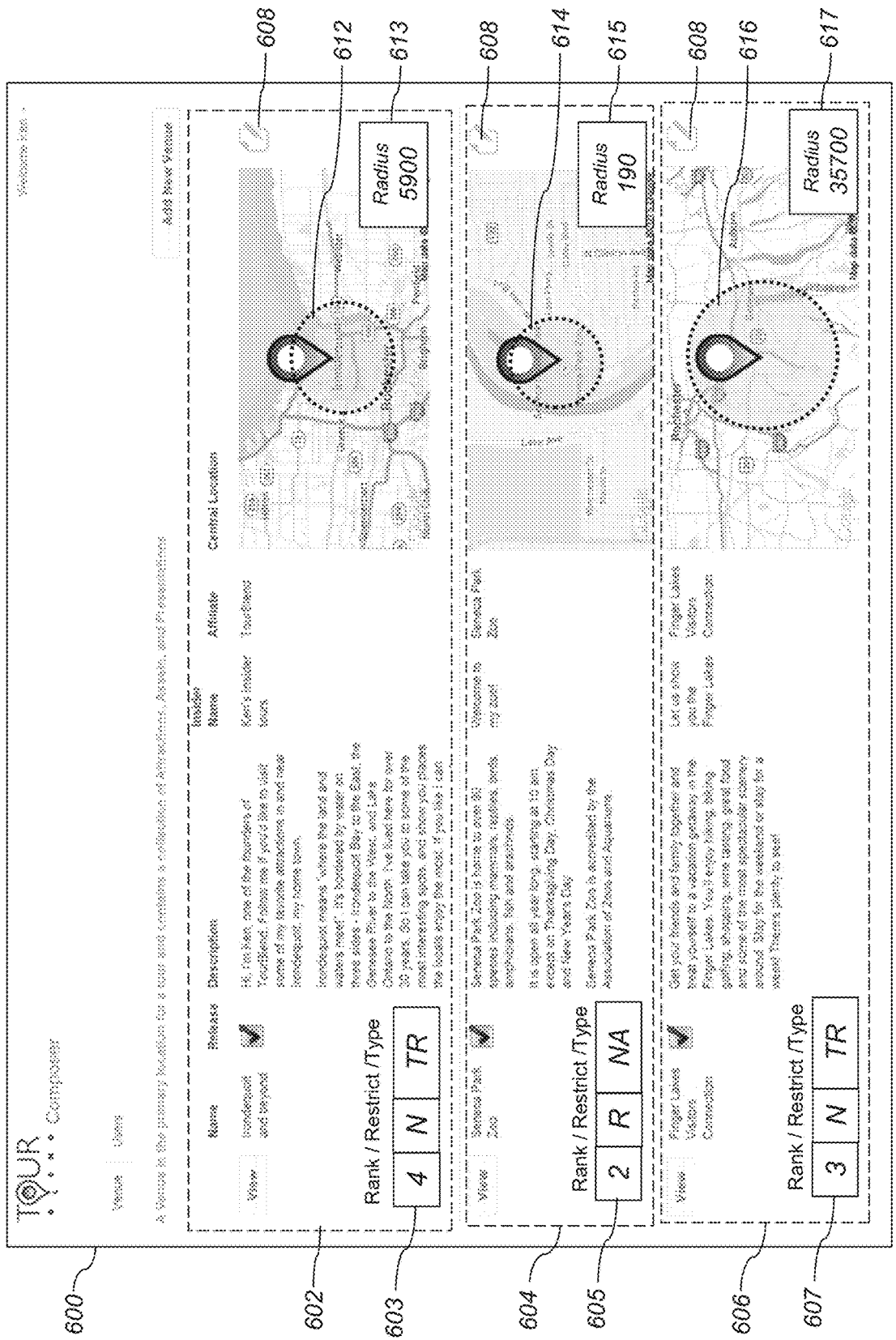
FIG. 8 depicts a graphical user interface screen which permits authorized users to manage content for a plurality of venues, according to some embodiments of the present invention.

FIG. 8 depicts a graphical user interface screen 600, which permits authorized users to manage the content for a plurality of venues, according to some embodiments of the present invention. In some embodiments, graphical user interface screen 600 is displayed on the display of one or more of the computers 218 shown in FIG. 2. FIG. 8 depicts three venues, Irondequoit venue 602 (named "Irondequoit and beyond") which is managed by the "TourBlend" Affiliate (i.e., the TourBlend Master Account provided by service provider 280 in FIG. 2), the Zoo venue 604 (named "Seneca Park Zoo") which is managed by the "Seneca Park Zoo" affiliate, and the Finger Lakes venue 606 (named "Finger Lakes Visitor Connection") which is managed by the "Finger Lakes Visitor Connection" affiliate.

In some embodiments of the present invention, the authorized users for each affiliate can edit the content, such as the venue location data and the venue content data, for their assigned venues. This can be done, for example, by using the edit icon 608 for the particular venue. It will be understood that the venue location data for the Irondequoit venue 602, which is shown as a circle 612 with radius 613 corresponds to the Irondequoit 510 circle described earlier in relation to FIG. 6, and that the venue location data for the Zoo venue 604, which is shown as circle 614 with radius 615, corresponds to the Zoo 520 circle described earlier in relation to FIG. 6, and that the venue location data for Finger Lakes venue 606 (not shown in FIG. 6) is shown as circle 616 with radius 617. In some embodiments, the authorized individuals (e.g., users) for each affiliate can modify the venue location data for each venue, for example, by changing the size and center location of the circle 614 for the Zoo venue 604 or by using other geometric shapes, or by inputting data which defines the boundaries of the venue.

In some embodiments, at least some of the venues are assigned a venue rank, for example, using a scale of 1 to 5, where a value of 1 indicates the highest ranked venues and a value of 5 indicates the lowest ranked venues. It will be understood that a venue rank is an example of venue priority data which indicates the relative priority of each of the plurality of venues. In some embodiments, at least some of the venues are assigned a value which indicates whether the venue content is available to all users of mobile devices (e.g. the value N for not restricted) or is restricted only to authorized users (e.g. the value R for restricted). In some embodiments, at least some of the venues are assigned a type which indicates a type of venue, for example, a tourism region (TR) venue, a nature (NA) venue, or a college campus (CS) venue. For example, Rank/Restrict/Type values 603 indicate that the Irondequoit venue 602 has a venue ranking of 4, that the content is not restricted to only specifically authorized users, and that the content is for a tourism region. According to some embodiments, Rank/Restrict values 605 indicate that the Zoo venue 604 has a venue ranking of 2, that the content is restricted only to authorized users, such as for example, users who have paid a special fee to access the venue content, and that the content is for a nature venue. Rank/Restrict values 607 indicate that the Finger Lakes venue 606 has a venue priority of 3, that the content is not restricted, and that the content is for a tourism region.

In store venue content step 410 in FIG. 4, venue content data for each of a plurality of venues is stored in a processor-accessible memory device system that is communicatively connected to a data processing device system, for example, the processor-accessible memory device system 130 in FIG. 1 or the Content Database 290 in FIG. 2. It will be understood that different content is stored for each venue. In some embodiments, the venue content data for each particular venue includes digital content and attraction location data for a plurality of different attractions associated with the particular venue as well as venue content data used to introduce the venue.

Figure 9A:
FIG. 9A depicts a graphical user interface screen for managing the digital content used to introduce a first venue, according to some embodiments of the present invention.

FIG. 9A depicts a graphical user interface screen 620A for managing the digital content data used to introduce a first venue, which is Irondequoit venue 602, according to some embodiments of the present invention. In some embodiments, graphical user interface screen 620A is displayed on the display of one or more of the computers 218 shown in FIG. 2. In the example shown in FIG. 9A, the digital content used to introduce the Irondequoit venue 602 includes Ken-square image content 622A, which includes a JPEG format digital still image that is used as the "Insider_FrontPage" display class image, Irondequoit lighthouse image content 624A which includes a JPEG format digital still image used as the "splash_image" display class image, and Ken-shaded image content 626A, which includes a JPEG format digital still image used as the "Insider_TourCard" display class image. In some embodiments, at least some of this digital content is displayed when it is determined that the Irondequoit venue 602 is the highest priority venue, as will be described later in reference to Steps 430-435 in FIG. 4 and FIG. 15A.

Figure 9B:
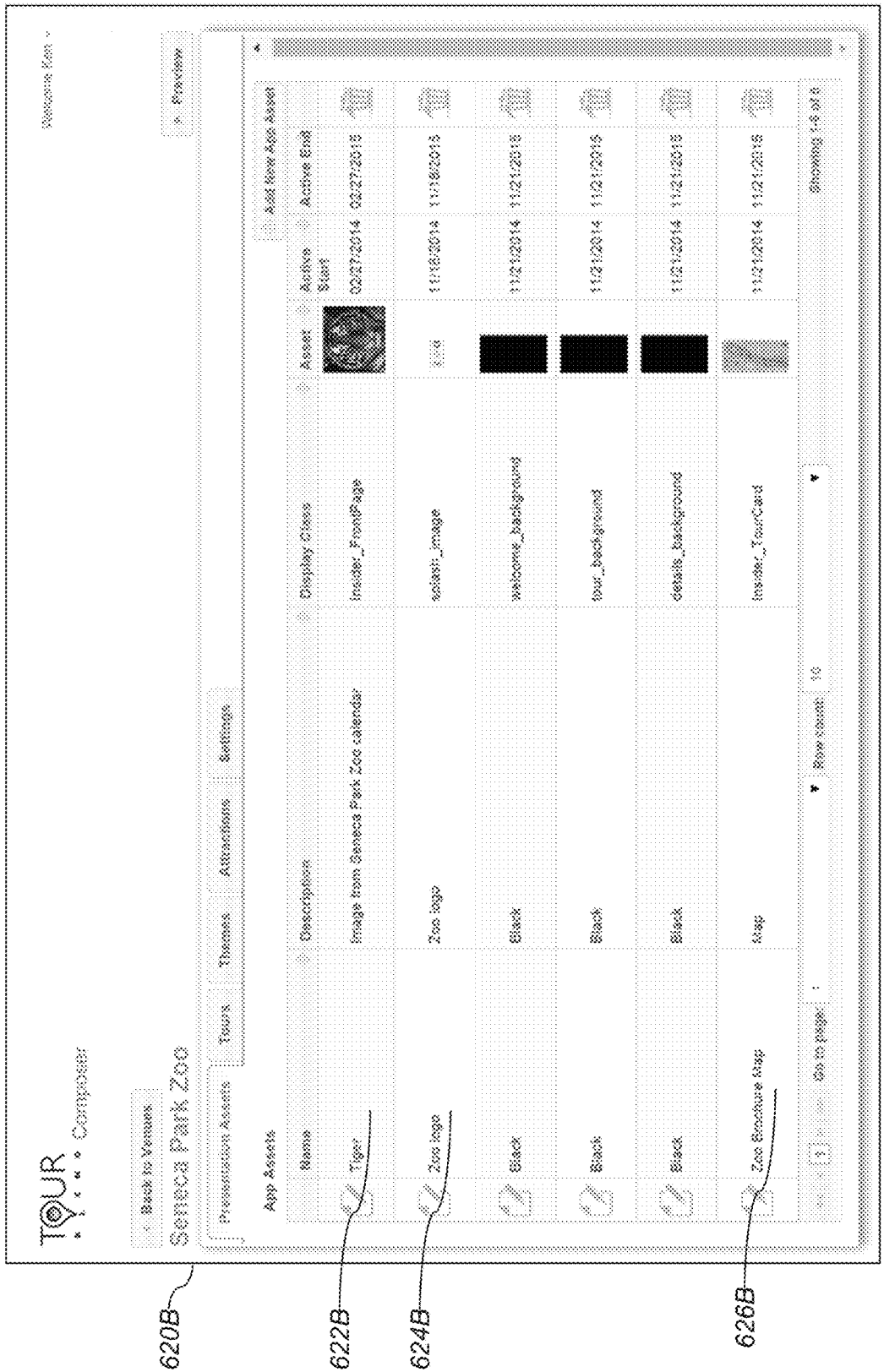
FIG. 9B depicts a graphical user interface screen for managing the digital content used to introduce a second venue, according to some embodiments of the present invention.

FIG. 9B depicts a graphical user interface screen 620B for managing the digital content data used to introduce a second venue, the Zoo venue 604, according to some embodiments of the present invention. In some embodiments, graphical user interface screen 620B is displayed on the display of one or more of the computers 218 shown in FIG. 2. In the example shown in FIG. 9B, the digital content for the Zoo venue 604 includes Tiger image content 622B, which includes a JPEG format digital still image that is used as the "Insider_FrontPage" display class image, Zoo logo image content 624B which includes a JPEG format digital still image used as the "splash_image" display class image, and Zoo Brochure map image content 626B, which includes a JPEG format digital still image used as the "Insider_TourCard" display class image. In some embodiments, at least some of this digital content is displayed when it is determined that the Seneca Park Zoo venue 604 is the highest priority venue, as will be described later in reference to Steps 430-435 in FIG. 4 and FIG. 15B.

Figure 10A:
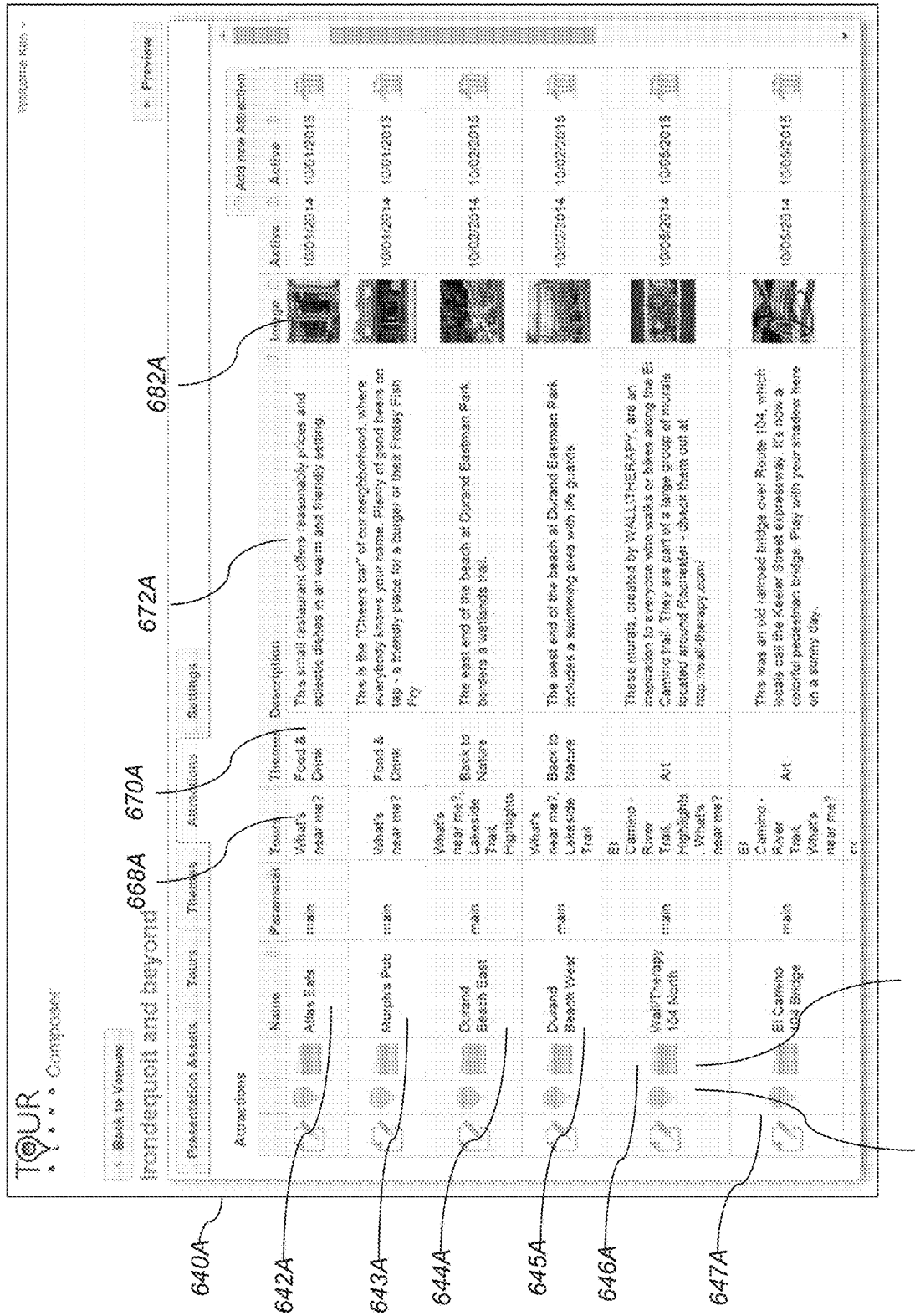
FIG. 10A depicts a graphical user interface screen for managing the digital content for some of the plurality of different attractions associated with the first venue, according to some embodiments of the present invention.

FIG. 10A depicts a graphical user interface screen 640A for managing the digital content for some of the plurality of different attractions associated with the first venue, according to some embodiments of the present invention. In some embodiments, graphical user interface screen 640A is displayed on the display of one or more of the computers 218 shown in FIG. 2. In the example shown in FIG. 10A, a graphical user interface screen 640A can be accessed by one or more individuals authorized to manage the venue content for the Irondequoit venue 602. FIG. 10A depicts some of the content for six different attractions, an Atlas Eats attraction 642A, a Murph's Pub attraction 643A, a Durand Beach East attraction 644A, a Durant Beach West attraction 645A, a Wall/Therapy 104 North attraction 646A, and an El Camino 104 Bridge attraction 647A. It will be understood that each of these six attractions is located at a different geographic location within the geographic boundary 510 of the Irondequoit venue 602. The digital content data for each attraction 642A, 643A, 644A, 645A, 646A and 647A includes text information, such as description 672A "This small restaurant offers reasonable prices and eclectic dishes in a warm and friendly setting" and an attraction image, such as Atlas Eats attraction image 682A for the Atlas Eats attraction 642A.

The digital content data for each attraction 642A, 643A, 644A, 645A, 646A and 447A can also include one or more themes and one or more tours. For example, the digital content data for the Atlas Eats attraction 642A includes the "What's near me?" tour 668A and the "Food & Drink" theme 670A, as will be described later in reference to FIG. 13A and FIG. 14A. It will be understood that the one or more individuals authorized to manage the venue content for the Irondequoit venue 602 can assign different themes and tours to each attraction 642A, 643A, 644A, 645A, 646A and 447A, as shown in FIG. 10A. It will be understood that themes and tours provide two different ways in which related attractions can be grouped into a subset of the plurality of attractions associated with a venue.

The geographic location of each attraction 642A, 643A, 644A, 645A, 646A and 447A can be entered or modified, by an individual authorized to manage the venue, using one of the modify attraction location icons, such as modify attraction location icon 656A for the Wall/Therapy 104 North attraction 646A.

Figure 11:
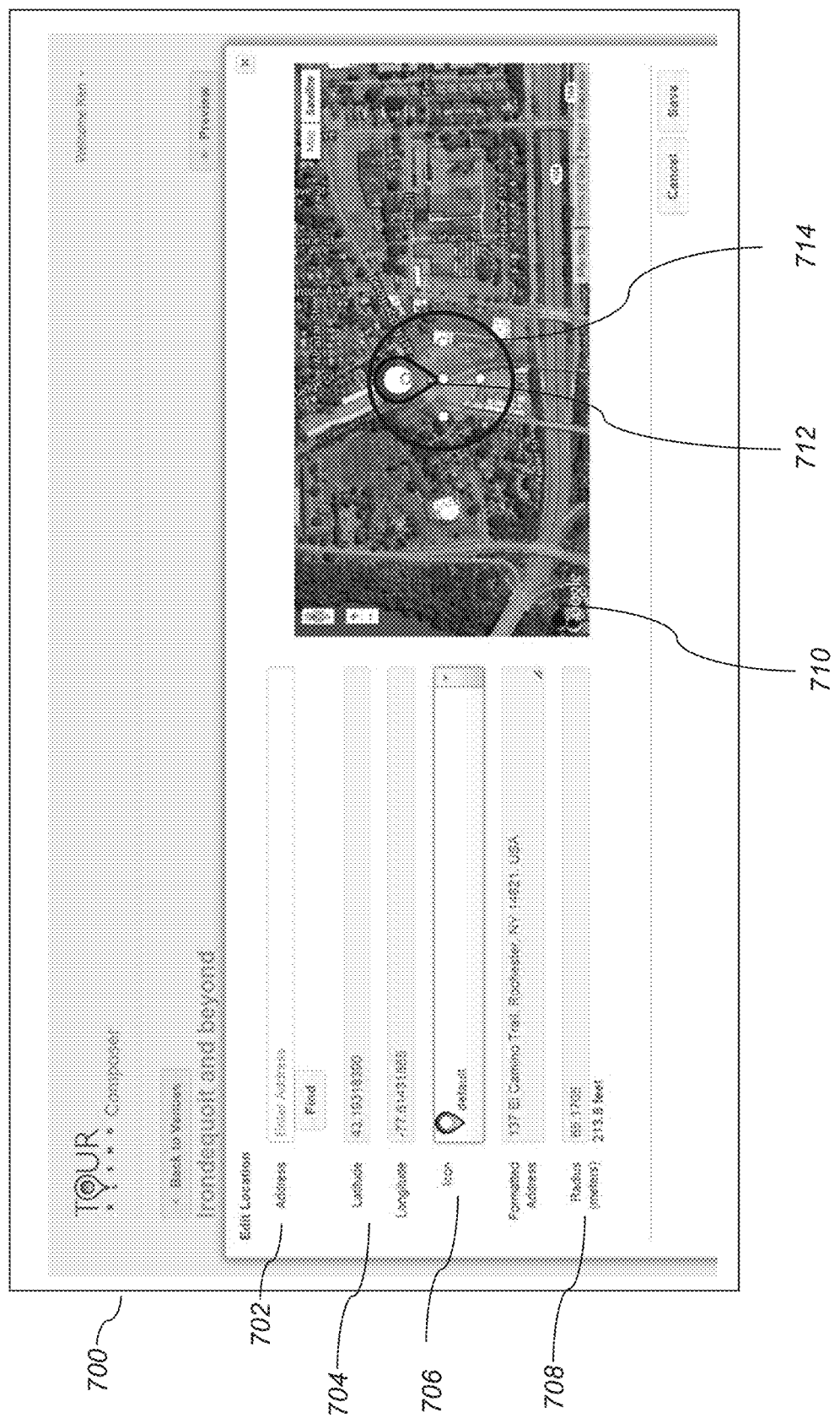
FIG. 11 depicts a graphical user interface screen for modifying the location and geographic boundary of an attraction, according to some embodiments of the present invention.

FIG. 11 depicts a graphical user interface screen 700 for modifying the location and geographic boundary of an attraction, according to some embodiments of the present invention. In some embodiments, graphical user interface screen 700 is displayed on the display of one or more of the computers 218 shown in FIG. 2. For example, when the modify location attraction icon 656A in FIG. 10A is selected, the geo-fence which defines the geographic location of the "Wall/Therapy 104 North" attraction 646A can be entered or modified using the graphical user interface screen 700. In the example depicted in FIG. 11, the location of the attraction can be entered or modified by entering an address in Address Box 702 or by entering values in Latitude and Longitude Boxes 704. The size of the geo-fence (e.g., a geographic boundary) for the attraction can be entered or modified using Radius Box 708.

The graphical user interface screen 700 also includes a map 710 which depicts the location of the attraction using an Attraction Center Icon 712 and an Attraction Circle 714. The location of the Attraction Center Icon 712 and the size of the Attraction Circle 714 are modified responsive to the address entered in the Address Box 702 or the values entered in Latitude and Longitude Boxes 704, and the value entered in the Radius Box 708. The type of map icon that will be used to depict the attraction on maps can be selected using icon selection box 706. In some embodiments, the location of the attraction can also be modified by "dragging" the Attraction Center Icon 712 to a different position on the map 710, and the size of the Attraction Circle 714 can be modified by "dragging" an edge of Attraction Circle 714 to increase or decrease the radius of Attraction Circle 714. In response, the information in the Address Box 702, the Latitude and Longitude Boxes 704 and the Radius Box 708 in updated to reflect the modified position of the Attraction Center Icon 712 and Attraction Circle 714. In some embodiments, multiple partially overlapping circles (or other geometric shapes) can be used to define the geographic boundary of the attraction. In some embodiments, the Attraction Circle 714 defines the boundary of a GPS geofence.

Figure 12:
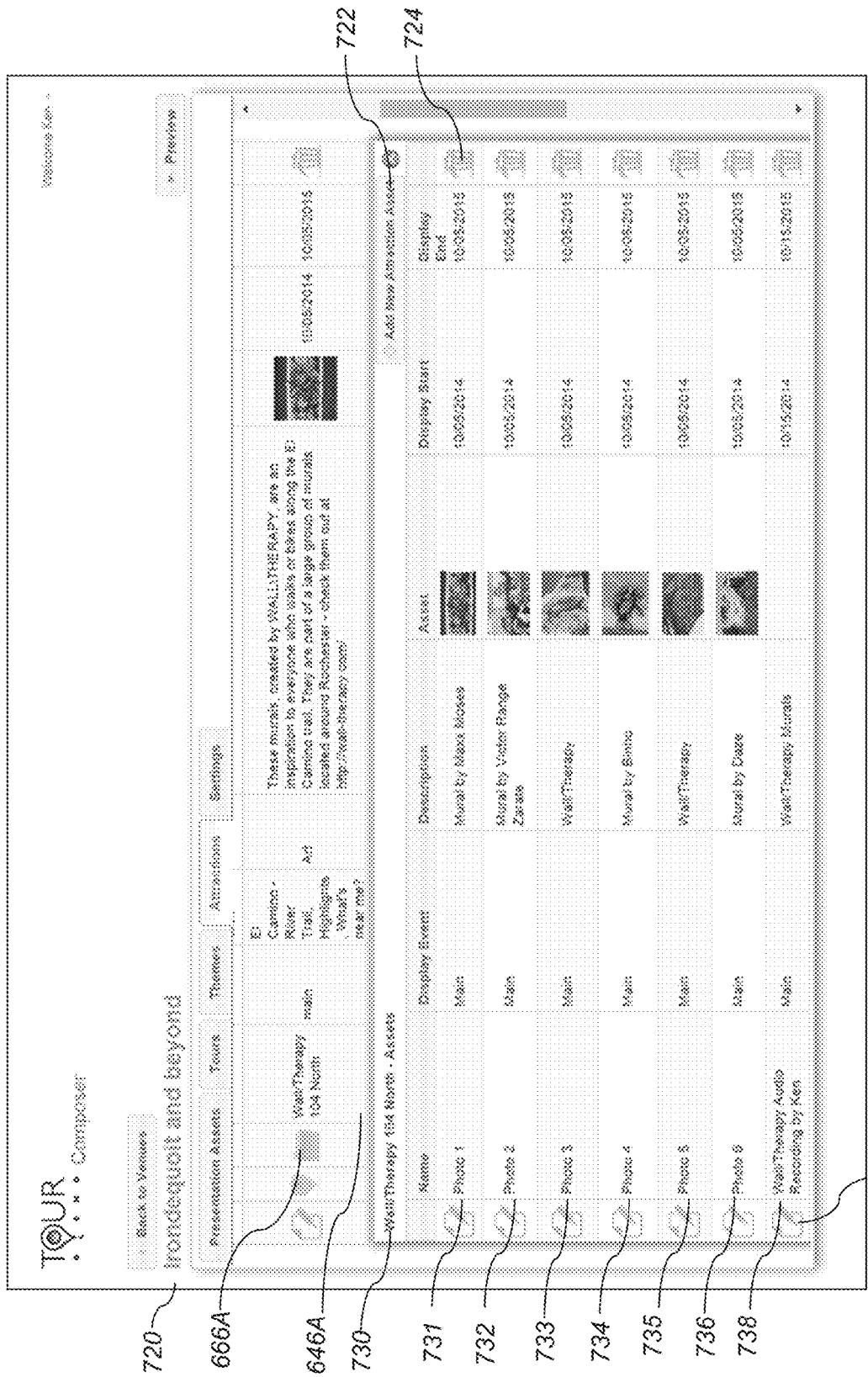
FIG. 12 depicts a graphical user interface screen for modifying the digital content assets associated with an attraction, according to some embodiments of the present invention.

FIG. 12 depicts a graphical user interface screen 720 for modifying the digital content assets associated with an attraction, according to some embodiments of the present invention. In some embodiments, graphical user interface screen 720 is displayed on the display of one or more of the computers 218 shown in FIG. 2. For example, when the modify attraction folder assets icon 666A in FIG. 10A (also shown in FIG. 12) is selected, digital content assets associated with the Wall/Therapy 104 North attraction 646A can be added, modified, or deleted using the graphical user interface screen 730. In the example depicted in FIG. 12, six still photos 731-736, including Photo 1 "Mural by Maxx Moses" photo content 731, Photo 2 "Mural by Victor Range Zarate" photo content 732, Photo 3 "Wall/Therapy" photo content 733, Photo 4 "Mural by Binho" photo content 734, Photo 5 "Wall/Therapy" photo content 735 and Photo 6 "Mural by Daze" photo content 736 are associated with the Wall/Therapy 104 North attraction 646A. In addition, "Wall/Therapy Audio Recording by Ken" digital audio content 738 is also associated with the Wall/Therapy 104 North attraction 646A.

While not depicted in FIG. 12, it will be understood that digital video content could also be associated with an attraction, such as Wall/Therapy 104 North attraction 646A. Additional digital content assets can be added using an Add New Attraction Asset Icon 722. One or more of the digital content assets associated with the attraction can be deleted using a Delete Asset Icon 724, or can be modified, such as by changing the name, description, asset (e.g. photo), display start date, or display end date, by selecting an Edit Asset Icon, such as Edit Asset Icon 726.

Figure 10B:
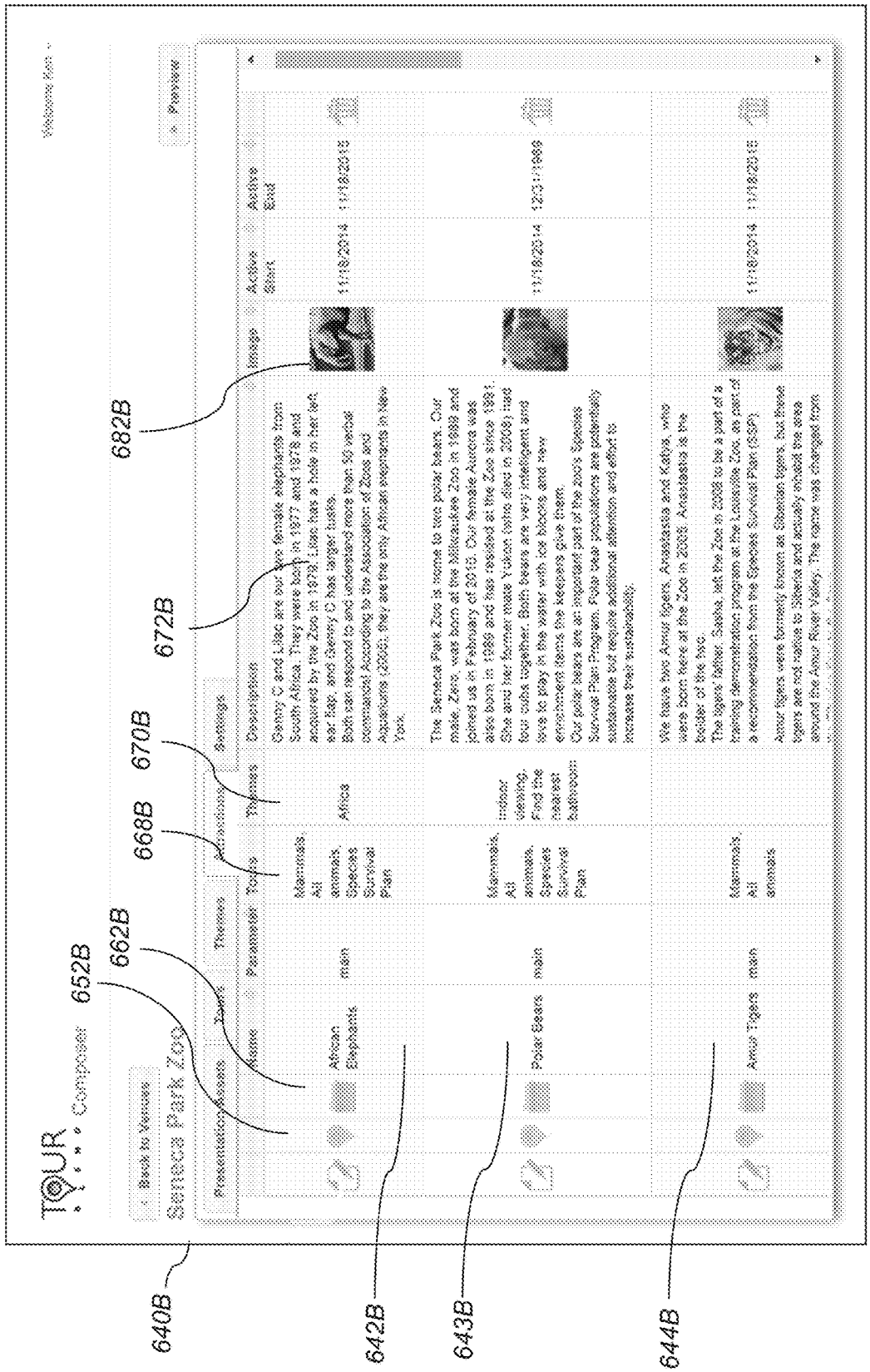
FIG. 10B depicts a graphical user interface screen for managing the digital content for some of the plurality of different attractions associated with the second venue, according to some embodiments of the present invention.

FIG. 10B depicts a graphical user interface screen 640B for managing the digital content for some of the plurality of different attractions associated with the second venue, according to some embodiments of the present invention. In some embodiments, graphical user interface screen 640B is displayed on the display of one or more of the computers 218 shown in FIG. 2. In the example shown in FIG. 10B, a graphical user interface screen 640B can be accessed by one or more individuals authorized to manage the venue content for the Zoo venue 604 in FIG. 8. FIG. 10B depicts some of the content for three different attractions, an "African Elephants" attraction 642B, a "Polar Bears" attraction 643B, and an "Amur Tigers" attraction 644B. It will be understood that each of these three attractions is located at a different geographic location within the geographic boundary 520 of the Zoo venue 604. The digital content data for each attraction 642B, 643B, and 644B includes text information, such as description 672B which begins "Genny C and Lilac are our two female elephants from South Africa. They were born in 1977 and 1978 and acquired by the Zoo in 1979 . . . " and an attraction image, such as African Elephant attraction image 682B for the African Elephants attraction 642B.

The digital content data for each attraction 642B, 643B, and 644B can also include one or more themes and one or more tours. For example, the digital content data for the African Elephants attraction 642B includes the "Mammals", "All animals" and "Species Survival Plan" tours (in column 668B) and the "Africa" theme (in column 670B), as will be described later in reference to FIG. 13B and FIG. 14B. It will be understood that the one or more individuals authorized to manage the venue content for the zoo venue 604 can assign different themes and tours to each attraction 642B, 643B and 644B, as shown in FIG. 10B.

The geographic location of each attraction 642B, 643B, and 644B can be entered or modified, by an individual authorized to manage the venue, using one of the modify attraction location icons, such as modify attraction location icon 652B for the African Elephants attraction 642B. The attraction assets associated with each attraction 642B, 643B, and 644B can be entered or modified, by an individual authorized to manage the venue, using one of the modify attraction assets icons, such as the modify attraction folder assets icon 662B for the African Elephants attraction 642B.

Figure 13A:
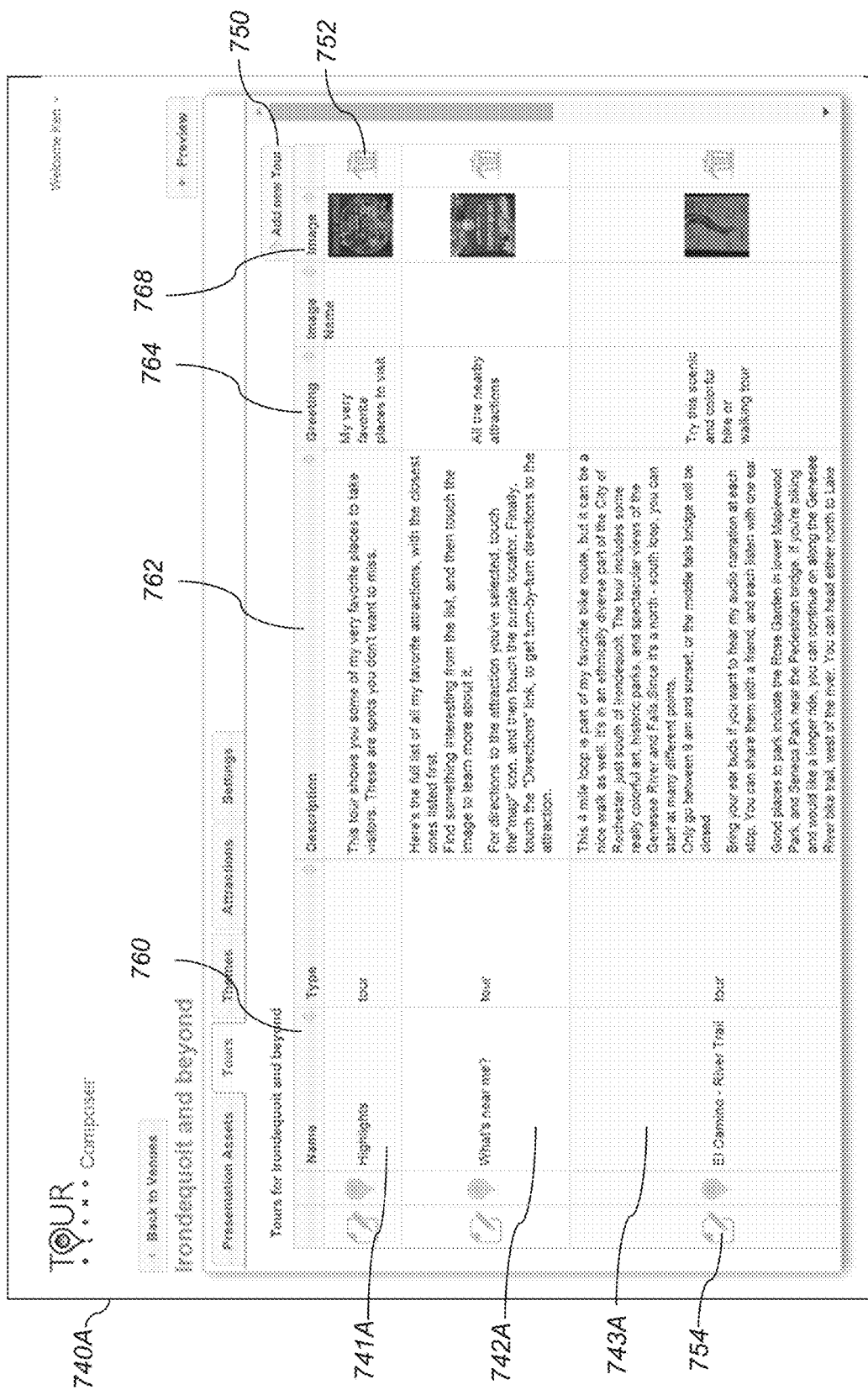
FIG. 13A depicts a graphical user interface screen for managing the tours provided at the first venue, according to some embodiments of the present invention.

FIG. 13A depicts a graphical user interface screen 740A for managing the tours provided at the first venue, according to some embodiments of the present invention. In some embodiments, graphical user interface screen 740A is displayed on the display of one or more of the computers 218 shown in FIG. 2. In the example shown in FIG. 13A, the graphical user interface screen 740A can be accessed by one or more individuals authorized to manage the venue content for the Irondequoit venue 602. FIG. 13A depicts three different tours, including a "Highlights" tour 741A, a "What's near me" tour 742A, and an "El Camino River Trail" tour 743A. Each of these tours includes a Tour Name (column 760), a Tour Description (column 762), a Tour Greeting (column 764), and a Tour Image (column 768). Additional tours for the venue can be added using the Add New Tour Icon 750. The current tours for the venue can be modified using one of the Modify Tour icons, such as Modify Tour icon 754, or deleted using one of the Delete Tour icons, such as Delete Tour icon 752.

Figure 13B:
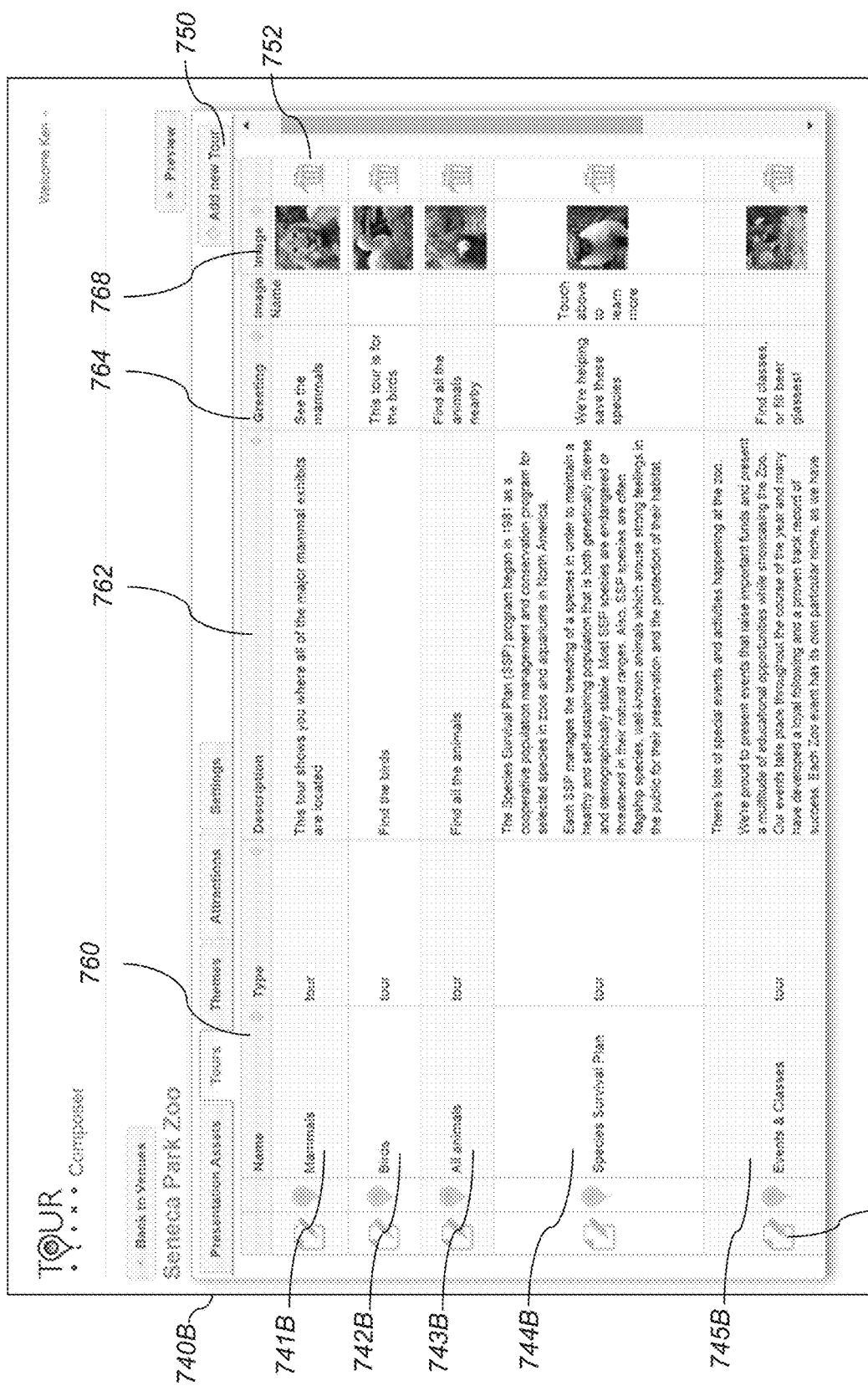
FIG. 13B depicts a graphical user interface screen for managing the tours provided at the second venue, according to some embodiments of the present invention.

FIG. 13B depicts a graphical user interface screen 740B for managing the tours provided at the second venue, according to some embodiments of the present invention. In some embodiments, graphical user interface screen 600 is displayed on the display of one or more of the computers 740B shown in FIG. 2. In the example shown in FIG. 13B, the graphical user interface screen 740B can be accessed by one or more individuals authorized to manage the venue content for the Zoo venue 604. FIG. 13B depicts five different tours, including a "Mammals" tour 741B, a "Birds" tour 742B, an "All animals" tour 743B, a "Species Survival Plan" tour 744B, and an "Events & Classes" tour 745B. Each of these tours includes a Tour Name (in column 760), a Tour Description (in column 762), a Tour Greeting (in column 764), and a Tour Image (in column 768). Additional tours for the venue can be added using the Add New Tour Icon 750. The current tours for the venue can be modified using one of the Modify Tour icons, such as Modify Tour icon 754, or deleted using one of the Delete Tour icons, such as Delete Tour icon 752.

Figure 14A:
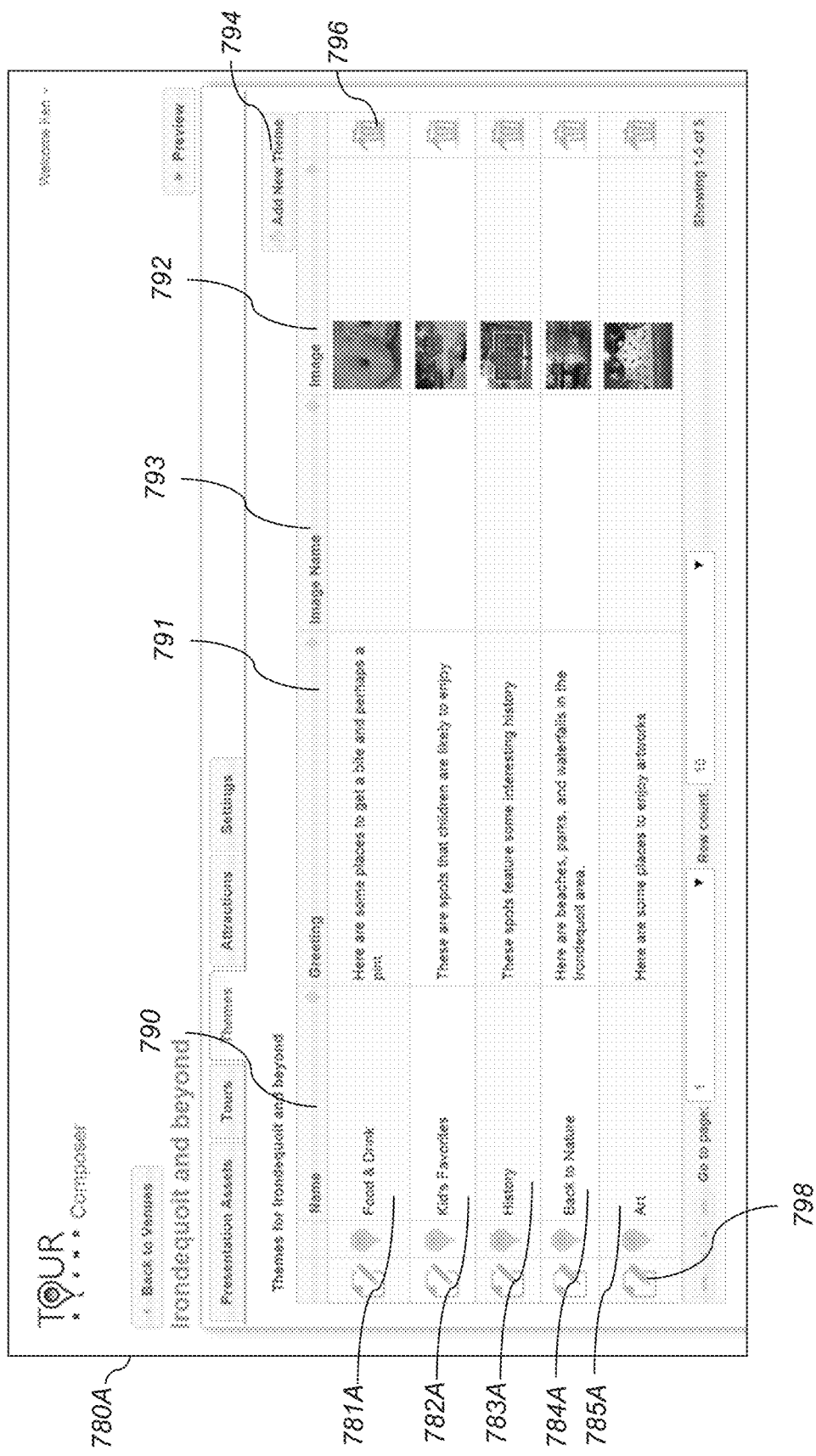
FIG. 14A depicts a graphical user interface screen for managing the themes provided at the first venue, according to some embodiments of the present invention.

FIG. 14A depicts a graphical user interface screen 780A for managing the themes provided at the first venue, according to some embodiments of the present invention. In some embodiments, graphical user interface screen 780A is displayed on the display of one or more of the computers 218 shown in FIG. 2. In the example shown in FIG. 14A, the graphical user interface screen 780A can be accessed by one or more individuals authorized to manage the venue content for the Irondequoit venue 602. FIG. 14A depicts five different themes, including a "Food & Drink" theme 781A, a "Kid's Favorites" theme 782A, a "History" theme 783A, a "Back to Nature" theme 784A, and an "Art" theme 785A. Each of these themes includes a Theme Name (in column 790) and a Theme Image (in column 792), and may include an optional Theme Greeting (in column 791) and theme image name (in column 793). Additional themes for the venue can be added using the Add New Theme Icon 794. The current themes for the venue can be modified using one of the Modify Theme icons, such as Modify Theme icon 798, or deleted using one of the Delete Theme icons, such as Delete Theme icon 796.

Figure 14B:
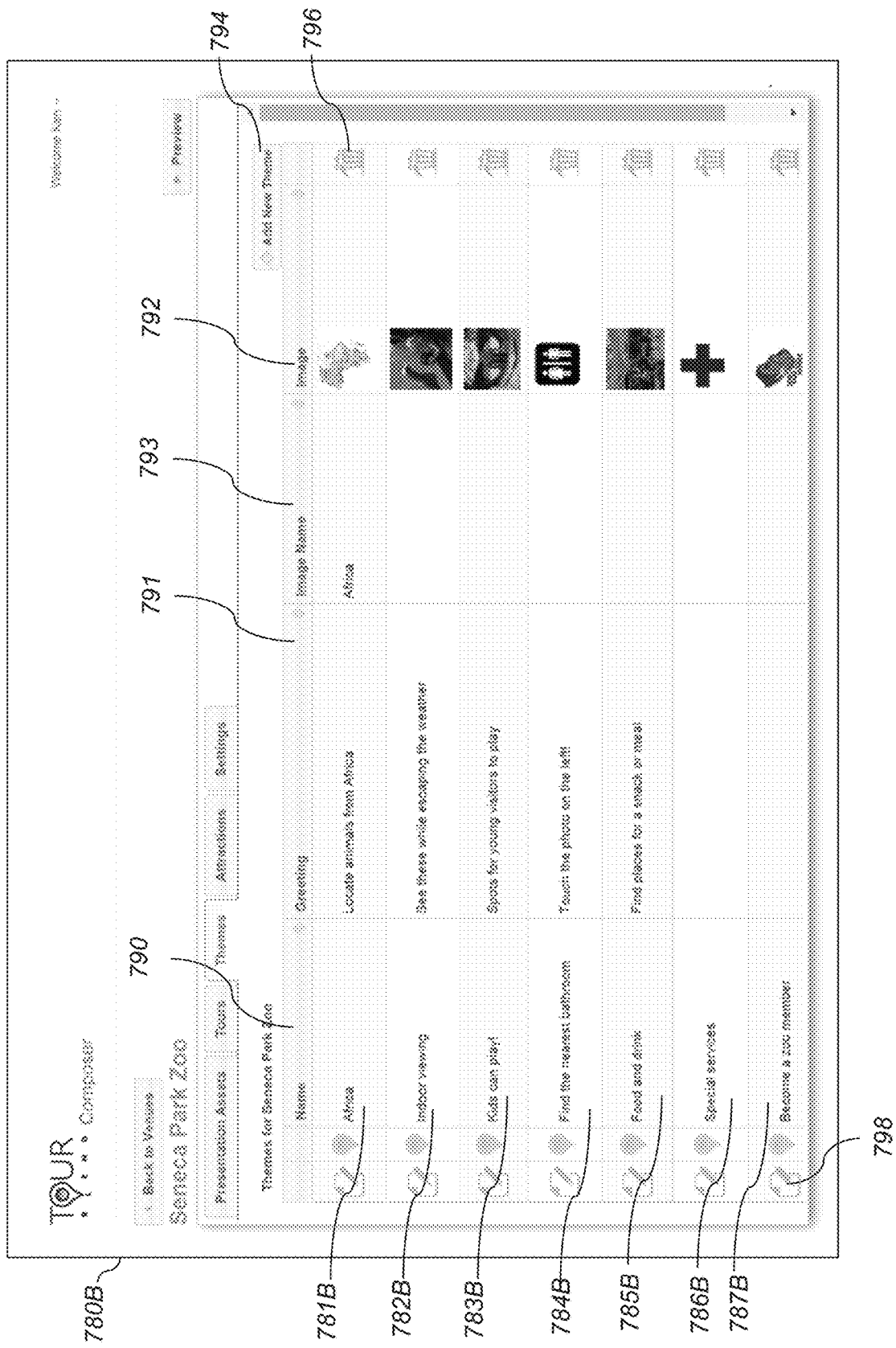
FIG. 14B depicts a graphical user interface screen for managing the themes provided at the second venue, according to some embodiments of the present invention.

FIG. 14B depicts a graphical user interface screen 780B for managing the themes provided at the second venue, according to some embodiments of the present invention. In some embodiments, graphical user interface screen 780B is displayed on the display of one or more of the computers 218 shown in FIG. 2. In the example shown in FIG. 14B, the graphical user interface screen 780B can be accessed by one or more individuals authorized to manage the venue content for the Zoo venue 604. FIG. 14B depicts seven different themes, including an "Africa" theme 781B, an "Indoor viewing" theme 782B, a "Kid's can play"" theme 783B, a "Find the nearest bathroom" theme 784B, a "Food and drink" theme 785B, a "Special services" theme 786B, and a "Become a zoo member" theme 787B. Each of these themes includes a Theme Name (in column 790) and a Theme Image (in column 792), and may include an optional Theme Greeting (in column 791) and theme image name (in column 793). Additional themes for the venue can be added using the Add New Theme Icon 794. The current themes for the venue can be modified using one of the Modify Theme icons, such as Modify Theme icon 798, or deleted using one of the Delete Theme icons, such as Delete Theme icon 796.

Returning to FIG. 4, in determine location step 415, the current location of the mobile device for a particular user is determined. In some embodiments, this is accomplished by using the GPS receiver 360 in the smart phone 300 (see FIG. 3) to determine the GPS coordinates of the smart phone 300, and by using the digital processor 320 in the smart phone 300 to communicate the GPS coordinates to the service provider 280 using the wireless modem 350. In some embodiments, location information can be provided by interacting with a beacon attached to a nearby object, such as a beacon using the well-known Bluetooth Low Energy (BLE) technology. It will be understood that in some embodiments, the geographic borders of venues, and of the attractions associated with the venues, can be provided by the service provider 280 (e.g., web server 282, computer system 286, or both, thereof) and stored in a memory of the smart phone 300 (such as image/data memory 330 or firmware memory 328) so that the digital processor 320 in the smart phone 300 can determine if the mobile phone 300 is within one or more venue borders, or inside the geographic boundary of one of the attractions.

In within venue border test 420, a determination is made as to whether the current location of the mobile device, such as smart phone 300, is inside the geographic boundary of at least one of the plurality of venues (yes to test 420) or is outside the geographic boundaries of all of the plurality of venues (no to test 420). This determination analyzes the stored venue location data described earlier in relation to store venue locations step 405. This can be tested by determining, for example, if the user's smart phone 300 is inside any of the geo-fences associated with any of the plurality of venues. In some embodiments, this determination is made by service provider 280 (e.g., web server 282, computer system 286, or both, thereof). In some embodiments, this determination is made by smart phone 300 using digital processor 320. In some embodiments, the venues can be grouped into regions (e.g. different states in the United States) so that only the geo-fences for the region (e.g. state) where the mobile device is currently located need to be considered in within venue border test 420.

If the user's current location is not within one of the venue borders (no to test 420), the process proceeds to present general content step 425. In present general content step 425, various types of content can be provided for the enjoyment of the user. In some embodiments, the content is music (e.g. mp3 files) previously stored by the user on their smart phone 300, or provided by a music streaming service such as Pandora™ Internet Radio. In some embodiments, the general content can include a digital map showing the vehicle's current location. In some embodiments, standard mapping programs, such as Google Maps, already installed on the smart phone 300 can be used to provide general map content.

In some embodiments, a list of venues ordered by their distance from the current location of the mobile device, such as smart phone 300, can be provided as will be described later in reference to FIG. 20. In some embodiments, when the user selects a specific venue from the list of venues, directions are provided in order to direct the user to the closest attractions within the selected venue. For example, as the user drives their vehicle, the smart phone 300 can direct the user to the selected venue (such as the Zoo venue 604) by displaying a map and providing audio guidance for which roads to take and where to turn.

In some embodiments, even though the user's current location is not within one of the venue borders (no to test 420), the closest venue is determined to be the highest priority venue and the venue content for this closest venue is provided.

Figure 5:
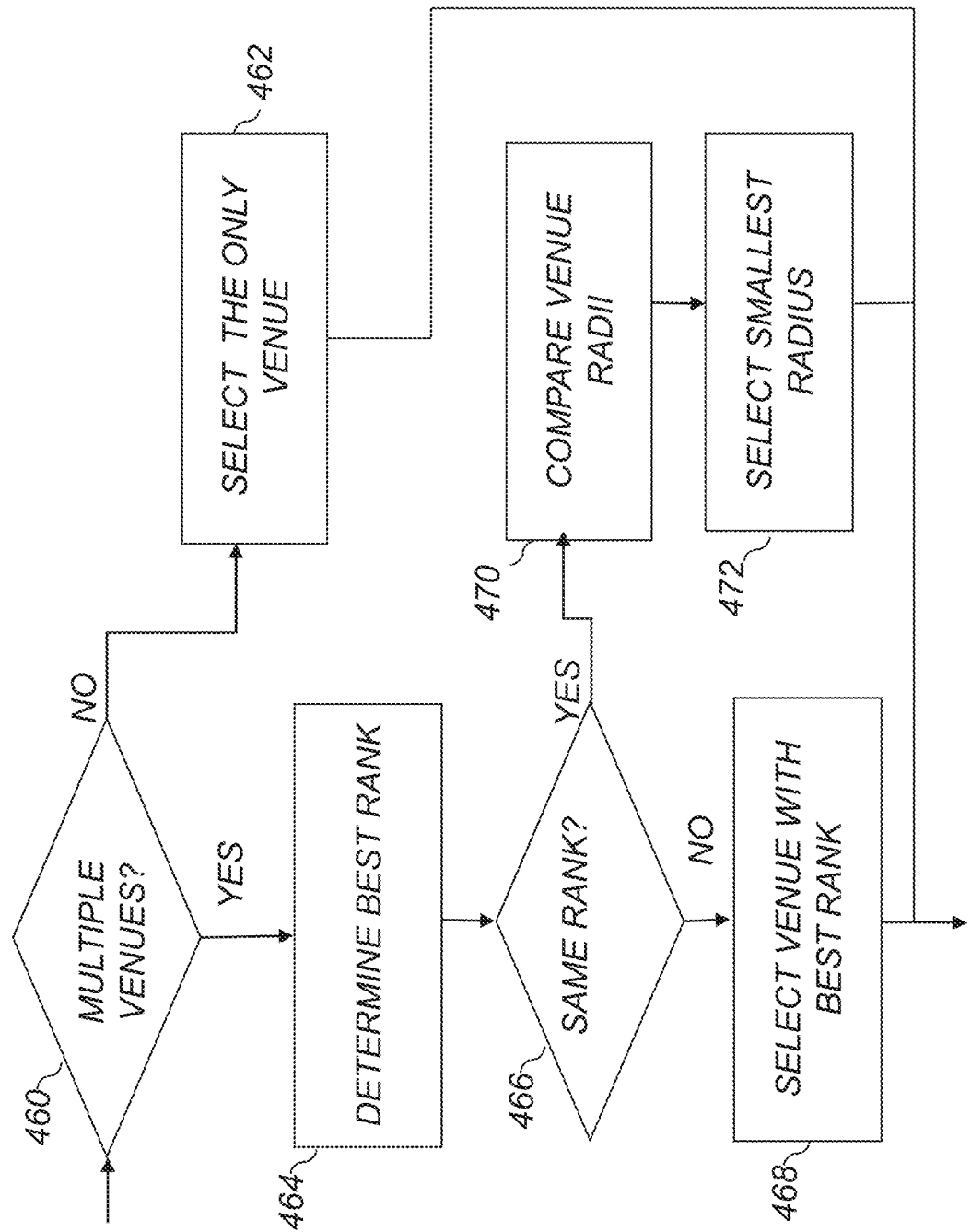
FIG. 5 illustrates a method implementing step 430 in FIG. 4 pertaining to determining a highest priority venue, according to some embodiments of the present invention.

If the user's current location is inside the geographic boundary of at least one of the plurality of venues (yes to test 420), the process proceeds to determine highest priority venue step 430. FIG. 5 is a flow diagram depicting an implementation of step 430 in FIG. 4, pertaining to determining a highest priority venue, according to some embodiments of the present invention. In multiple venues test 460, according to some embodiments, a determination is made as to whether the current location of the mobile device, such as smart phone 300, is inside the geographic boundary of two or more venues (yes to test 460) or is inside the geographic boundary of only a single venue (no to test 460), based at least on an analysis of the venue location data. If the current location is within only one venue boundary (no to test 460), the process proceeds to select the only venue step 462, according to some embodiments. In select the only venue step 462, since there is only one venue to choose from, the single venue is selected as the highest priority venue.

If it is determined that the current location is within the geographic boundaries of two or more venue boundaries (yes to test 460), the process proceeds to determine best rank step 464. In determine best rank step 464, the rankings (e.g., venue priority data) of the multiple venues are analyzed (e.g. compared), to determine which venue has the best (e.g. lowest, in some embodiments) rank and is the highest priority venue. In some embodiments, the rank can be the rank value, such as rank=4 for the Irondequoit venue 602 described earlier in relation to FIG. 8. If the mobile device was located within the geographic boundaries of both the Irondequoit venue 602 and the Zoo venue 604, the Zoo venue 604 would be determined to have the best rank, since it has a rank of 2, while the Irondequoit venue 602 has a rank of 4. Therefore, the Zoo venue 604 would be determined to be the highest priority venue, based at least on an analysis of the venue priority data for the venues having geographic boundaries inside which the mobile device is currently located.

In some cases, the mobile device may be inside the geographic boundaries of multiple venues which share the same best rank (e.g. two venues which have a rank of 2). In same rank test 466, a determination is made as to whether two or more venues share the same rank (yes to test 466) or if the mobile device is inside the geographic boundary of only one venue which has the best rank (no to test 466). If the current location of the mobile device is within only one venue boundary with the best rank (no to test 466), the process proceeds to select venue with best rank step 468. In select venue with best rank step 468, the venue with the best rank is selected as the highest priority venue. For example, if the mobile device was located within the geographic boundaries of both the Irondequoit venue 602 and the Zoo venue 604, the Zoo venue 604 would be selected as the highest priority venue, since it has a rank of 2, while the Irondequoit venue 602 has a rank of 4.

If the current location of the mobile device is within two or more venue boundaries having the same best rank (yes to test 466), the process proceeds to compare venue radii step 470. In compare venue radii step 470, the radii of the venues which share the best ranking are analyzed (e.g. compared), to determine which venue has the smaller radius and therefore has the smaller size geographic boundary. For example, if in the example depicted in FIG. 8, the Irondequoit venue 602 had been given the same rank as the Zoo venue 604, the Irondequoit venue radius 613 (e.g. 5900) would be compared with the Zoo venue radius 615 (e.g. 190). In select smallest radius step 472, the venue with the smallest radius is selected. For example, the Zoo venue 604 would be selected, instead of the Irondequoit venue 602, since the value of the Zoo venue radius 615 (which has a value of 190) is smaller than the value of the Irondequoit venue radius 613 (which has a value of 5900), and therefore the geographic boundary of the Zoo venue 604 has a size which is smaller than the geographic boundary of the Irondequoit venue 602. It will be understood that in some embodiments, the geographic boundary of one or more venues can be defined using shapes other than circles. For example, the geographic boundary can be defined using another geometric shape, such as an ellipse or an irregular polygon, as described earlier in reference to FIG. 6. In such embodiments, the size of the geometric boundary can be determined, for example, by calculating the precise boundary length or area of the shape, or by estimating the approximate boundary length or the approximate area of the shape.

It will be understood that in some embodiments, the venues are not ranked, so that only the venue radii, or some other measure(s) of geographic boundary size, are used to determine which venue is selected as the highest priority venue, when the mobile device is within the geographic boundaries of multiple venues.

It will be understood that in some embodiments, a determination is made as to whether the user of the mobile device has been authorized to utilize content from a restricted venue, such as the Zoo venue 604. In this situation, the zoo venue 604 would only be selected as the highest priority venue if the user was authorized to utilize the content, according to some embodiments. For example, users of mobile devices could be authorized to utilize the content for the zoo venue 604 if they paid an extra fee, or were a member of a zoo club. In some embodiments, information indicating which individuals are authorized to utilize content for restricted venues is stored in customer database 288 in FIG. 2.

It will be understood that in some embodiments, a determination is made as to whether the current date and time falls within the active time period for the venue. For example, as described earlier in relation to FIG. 6, the venues associated with festivals and special events would only be selected as the highest priority venue during the defined time period associated with these venues. Thus, for example, the Soap Box Derby venue would only be selected as the highest priority venue during the weekend the event is held (e.g. Aug. 23-24, 2014).

It will be understood that in some embodiments, a determination is made as to whether the current weather conditions are appropriate for the activities associated with one or more of the plurality of venues (e.g. adequate snow for a cross country skiing related venue, appropriate light wind conditions for a balloon rally related venue) and the venue would only be selected as the highest priority venue if the weather conditions were suitable for the activity.

It will be understood that in some embodiments, the highest priority venue can be selected by determining the venue center location which is closest to the current location of the mobile device. It will be understood that in some embodiments, the highest priority venue can be selected by determining the venue which includes an attraction which is located closest to the current location of the mobile device, as will be described later with reference to FIG. 24.

In some embodiments, user preferences are used to help determine the highest priority venue. The user preferences can be stored as described in U.S. patent application Ser. No. 14/219,901, filed Mar. 19, 2014, which published as U.S. Patent Application Publication No. 2014/0287779 on Sep. 25, 2014, and which is hereby incorporated herein by reference. The user preferences can indicate, for example, the level of user interest in historical venues, nature venues such as parks and zoos, urban venues, or artistic venues. These user preferences can be used to help select the highest priority venue, as will be described later with reference to FIG. 25.

Returning to FIG. 4, in transfer venue content step 435, the venue content for the highest priority venue is transferred (e.g., provided) to the mobile device, such as smart phone 300. In some embodiments, the venue content includes at least some of the content described earlier with reference to FIGS. 9A-14B.

FIG. 15A depicts an example of a mobile device user interface screen 810A for introducing a first venue, which is the Irondequoit venue 602, according to some embodiments of the present invention. In some embodiments, the user interface screen 810A is displayed on the color display 332 of the smart phone 300 in FIG. 3. The user interface screen 810A is displayed when the Irondequoit venue 602 is determined to be the highest priority venue in determine highest priority venue step 430 in FIG. 4. The user interface screen 810A includes Irondequoit venue image 812A, which is the Ken-square image 622A described earlier in relation to FIG. 9A. Ken-square image 622A was stored by the individual authorized to manage the Irondequoit venue content in step 410 in FIG. 4 and is provided to the smart phone 300 in transfer venue content step 435, when the Irondequoit venue 602 is determined to be the highest priority venue in step 430. The user interface screen 810A also includes text 814A ("Ken's insider tours") which was also stored by the individual authorized to manage the Irondequoit venue content and is provided to the smart phone 300 in transfer venue content step 435. The user interface screen 810A further includes Tour Blend graphics 802 and Follow Me button 804 which are used to introduce all venues, and are not managed by the individual authorized to manage the Irondequoit venue content.

FIG. 15B depicts an example of a mobile device user interface screen 810B for introducing a second venue, which is the Zoo venue 604, according to some embodiments of the present invention. In some embodiments, the user interface screen 810B is displayed on the color display 332 of the smart phone 300 in FIG. 3. The user interface screen 810B is displayed when the Zoo venue 604 is determined to be the highest priority venue in determine highest priority venue step 430 in FIG. 4. The user interface screen 810B includes Zoo venue image 812B, which is the Tiger image 622B described earlier in relation to FIG. 9B. Tiger image 622B was stored by the individual authorized to manage the Zoo venue content in step 410 in FIG. 4 and is provided to the smart phone 300 in transfer venue content step 435, when the zoo venue 604 is determined to be the highest priority venue in step 430. The user interface screen 810B also includes text 814B ("Welcome to my zoo!") which was also stored by the individual authorized to manage the Zoo venue content and is provided to the smart phone 300 in transfer venue content step 435. The user interface screen 810B further includes Tour Blend graphics 802 and Follow Me button 804 which are used to introduce all venues, and are not managed by the individual authorized to manage the Zoo venue content.

Returning to FIG. 4, in provide venue attractions step 440, a set of attractions for the highest priority venue is provided, in order to permit the user to select one or more attractions of interest. It will be understood that these attractions are associated with the highest priority venue, and are typically located within the geographic boundary of the venue. In some embodiments, the attractions are grouped for display according to tours or themes, as will be described later in reference to FIG. 21A, FIG. 21B, FIG. 22A and FIG. 22B.

FIG. 16A depicts a mobile device user interface screen 820A for presenting a plurality of different attractions located within the first venue, which is the Irondequoit venue 602, according to some embodiments of the present invention. In some embodiments, the user interface screen 820A is displayed on the color display 332 of the smart phone 300 in FIG. 3. In some embodiments, the user interface screen 820A is only displayed if the Irondequoit venue 602 is determined to be the highest priority venue in determine highest priority venue step 430 in FIG. 5, unless the user of the mobile device later selects the Irondequoit venue 602 as an alternate venue in select alternate venue step 450, or using a venue link from one of the attractions associated with the highest priority venue, as will be described later in reference to FIG. 18B.

The user interface screen 820A in FIG. 16A includes three attraction images for attractions included in the Irondequoit venue 602. The attraction image 824A is for the "Wall/Therapy 104 North" attraction 646A in FIG. 10A, and the attraction image 826A is for the "El Camino 104 bridge" attraction 647A in FIG. 10A. The attraction image 828A is for the "Seabreeze amusement park" attraction (not shown in FIG. 10A) which is also located within the geographic boundary of the Irondequoit venue 602. Attraction images 824A, 826A and 828A were stored by the individual authorized to manage the Irondequoit venue content in step 410 in FIG. 4 and provided to the smart phone 300 in transfer venue content step 435, if the Irondequoit venue 602 was determined to be the highest priority venue in step 430. In some embodiments, the attraction images 824A, 826A and 828A are ordered according to the distance from the current location of the mobile device (with the closest attraction to the left), and additional attraction images can be viewed by swiping the group of attraction images from right to left. In some embodiments, the distance between the current location of the mobile device and the location of the attractions associated with the attraction image is displayed as text, for example, above each of the attraction images 824A, 826A and 828A. The user interface screen 820A also includes attraction text 822A ("Wall/Therapy 104 North—These color murals . . . ") which further describes the Wall/Therapy 104 North attraction when the attraction image 824A is selected (e.g. tapped) by the user of the mobile device.

The user interface screen 820A further includes a back arrow icon 830, a settings icon 832, a map icon 840, an insiders icon 844, a themes icon 846, a myBlend icon 848, an info icon 834, an audio icon 836, and a photo icon 838, which are used to control the presentation of attractions for all venues, and are not managed by the individual authorized to manage the Irondequoit venue content.

FIG. 16B depicts a mobile device user interface screen 820B for presenting a plurality of different attractions located within the second venue, which is the Zoo venue 604, according to some embodiments of the present invention. In some embodiments, the user interface screen 820B is displayed on the color display 332 of the smart phone 300 in FIG. 3. The user interface screen 820B is displayed if the Zoo venue 604 is determined to be the highest priority venue in determine highest priority venue step 430 in FIG. 5. The user interface screen 820B includes three attraction images for attractions included in the Zoo venue 604. The attraction image 826B is for the "Amur Tigers" attraction 644B described earlier in relation to FIG. 10B. The attraction image 824B is for a "Sea Lion attraction and the attraction image 828B is for a "Bornean Orangutan" attraction, both of which are also located within the geographic boundary of the Zoo venue 604. Attraction images 824B, 826B and 828B were stored by the individual authorized to manage the Zoo venue content in step 410 in FIG. 4 and provided to the smart phone 300 in transfer venue content step 435, if the Zoo venue 604 was determined to be the highest priority venue in step 430. The user interface screen 820B also includes text 822B ("Amur Tigers—We have two Amur Tigers, Anastasia and Katya . . . ") which further describes the Amur Tigers attraction when the attraction image 826B is selected (e.g. tapped) by the user of the mobile device.

The user interface screen 820B further includes a back arrow icon 830, a settings icon 832, a map icon 840, an insiders icon 844, a themes icon 846, a myBlend icon 848, an info icon 834 and a photo icon 838, which are used to control the presentation of attractions for all venues, and are not managed by the individual authorized to manage the Zoo venue content. The audio icon 836 shown in FIG. 16A is not included in the user interface screen 820B, since the Amur Tiger attraction content does not include an audio recording.

Figure 17:
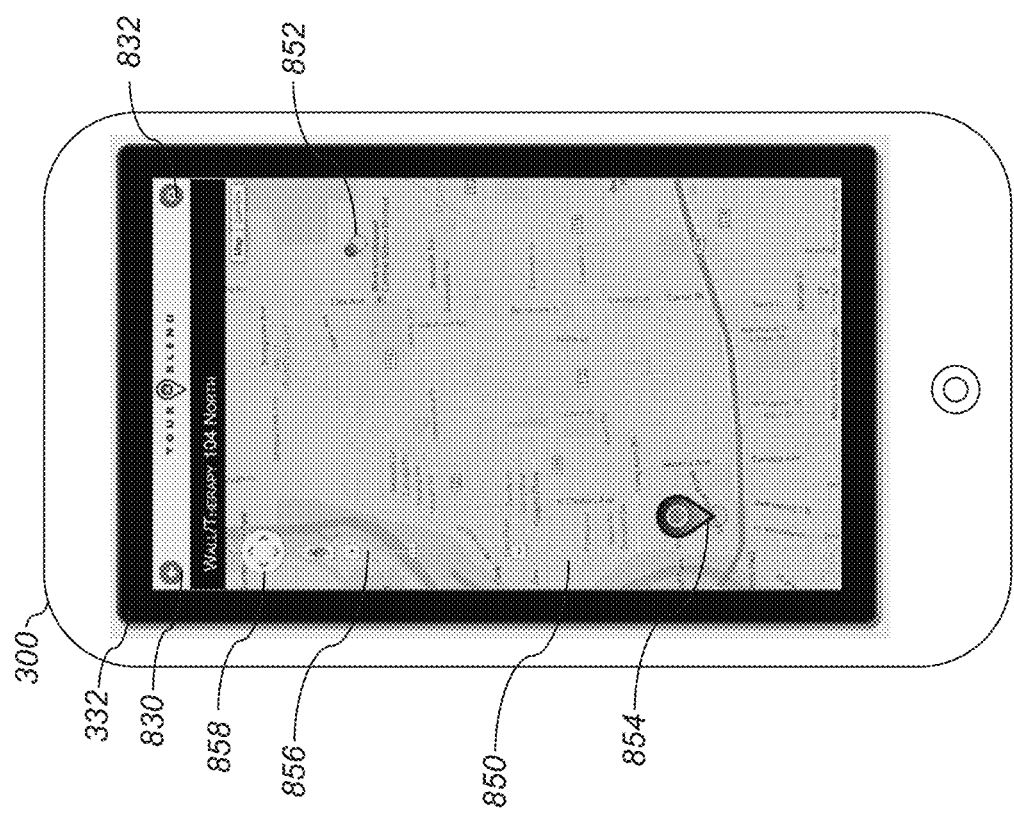
FIG. 17 depicts a mobile device user interface screen for showing the location of one of the plurality of different attractions located within the first venue, according to some embodiments of the present invention.

FIG. 17 depicts a mobile device user interface screen 850 for showing the location of one of the plurality of attractions within the first venue, which is the Irondequoit venue 602, according to some embodiments of the present invention. In some embodiments, the user interface screen 850 is displayed on the color display 332 of the smart phone 300 in FIG. 3. The user interface screen 850 is displayed when the user of the mobile device selects the map icon 840 after selecting the "Wall/Therapy 104N" attraction image 824A shown earlier in FIG. 16A. The user interface screen 850 depicts the present location 852 of the mobile device and the attraction location 854. It will be understood that in some embodiments, the user interface screen 850 can provide turn-by-turn directions to guide the user to the attraction location 852. The user interface screen 850 includes zoom icon 856 and pan icon 858 to permit the map to be enlarged and re-centered. The user interface screen 850 further includes a back arrow icon 830 and a settings icon 832.

Returning to FIG. 4, in present attraction content step 445, at least some of the content associated with a specific attraction located within the geographic boundary of the highest priority venue is presented. In some embodiments, audio or video content is automatically presented when it is determined that the mobile device has entered the inside of the geographic boundary of one of the attractions associated with the tour or theme selected by the user of the mobile device. In some embodiments, the presentation is triggered by analyzing the attraction location data for one or more GPS geofences associated with the attraction, such as the attraction geofence associated with Attraction Circle 714 depicted in FIG. 11.

Figure 18A:
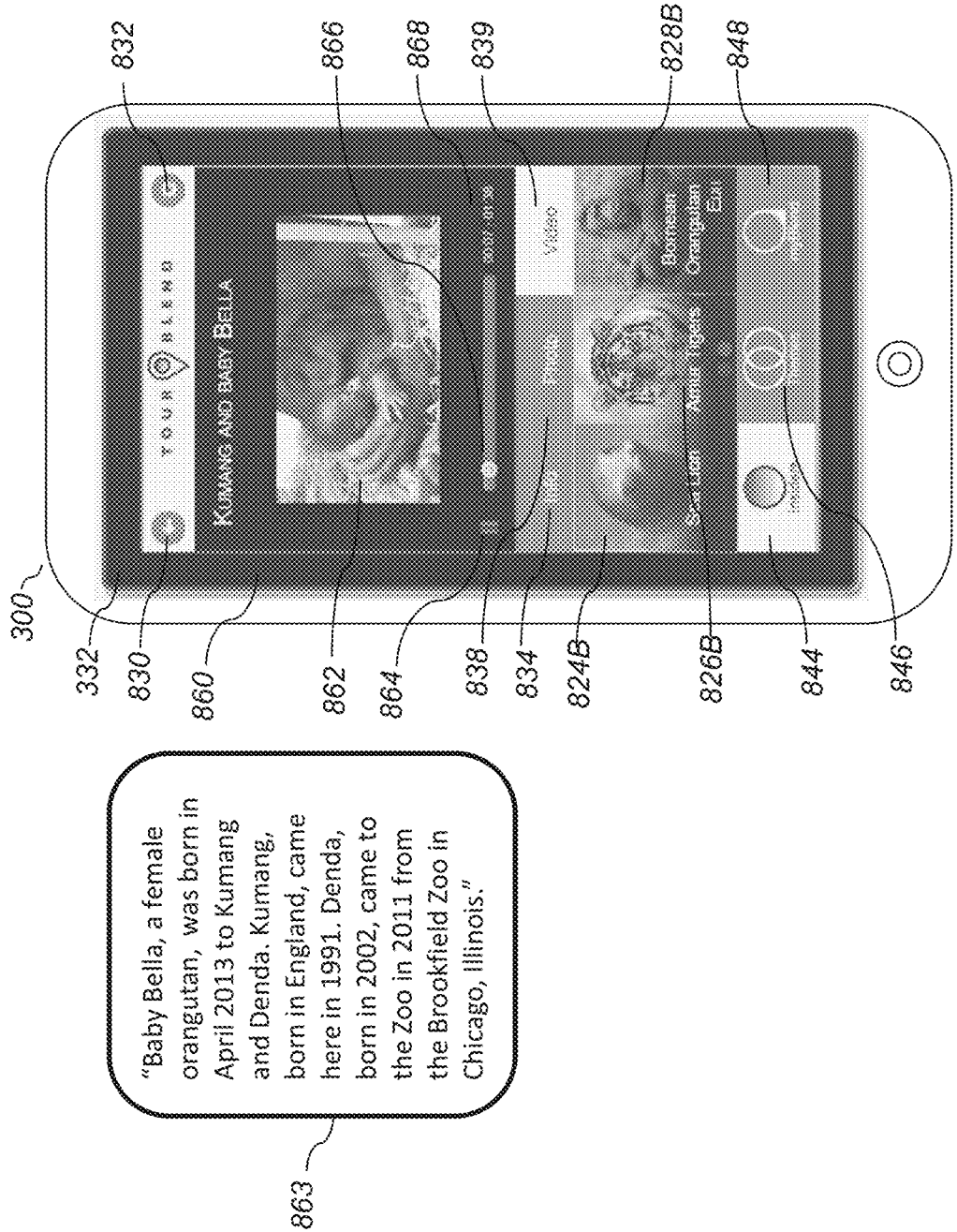
FIG. 18A depicts a mobile device user interface screen for presenting digital content for one of the attractions when the mobile device is located within the geographic boundary of the attraction, according to some embodiments of the present invention.

FIG. 18A depicts a mobile device user interface screen 860 for presenting digital content for an attraction, when the mobile device enters the geographic boundary of the attraction, according to some embodiments of the present invention. In some embodiments, the user interface screen 860 is displayed on the color display 332 of the smart phone 300 in FIG. 3, and the audio 863 is played using the speaker 344. The user interface screen 860 is displayed when the Zoo venue 604 is determined to be the highest priority venue in determine highest priority venue step 430 in FIG. 5, and the mobile device enters the geographic boundary of the Bornean Orangutan attraction. In some embodiments, when the mobile device enters inside the geographic boundary of the Bornean Orangutan attraction, the user interface screen 820B shown in FIG. 16B automatically switches to the user interface screen 860 shown in FIG. 18A, and a video 862 entitled "Kumang and Baby Bella", which includes audio 863 is automatically activated so that the zoo visitor using the mobile device can learn more about Bornean Orangutans when they enter the location of the Orangutan exhibit. The user interface screen 860 also includes a pause icon 864 to permit the user of the mobile device to pause the playback of the video 862, a timeline 866 which permits the user of the mobile device to skip forward or backward, and a time display 868 which displays the current time and total length of the video 862.

The user interface screen 860 also includes attraction image 824B for the "Sea Lion" attraction, attraction image 826B for the "Amur Tigers" attraction and attraction image 828B for the "Bornean Orangutan" attraction, similar to user interface screen 820B in FIG. 16B. The user interface screen 860 further includes a back arrow icon 830, a settings icon 832, an insiders icon 844, a themes icon 846, a myBlend icon 848, an info icon 834, a photo icon 838 and a video icon 839, which are used to control the presentation of the attraction content.

It will be understood that in some embodiments, the presentation of a video or audio clip is initiated when the user's mobile device, such as smart phone 300, enters a geofence associated with the attraction, and continues even if the mobile device leaves the geofence, until the presentation is completed (e.g. until a complete audio clip or video clip has been played). In some other embodiments, the presentation is terminated when the mobile device leaves the geofence.

It will be understood that in some embodiments, the attraction content can provide two or more different audio or video clips, depending on whether the user has previously been presented with content at another attraction location in the same venue, or depending on the travel direction of the mobile device as it enters the geo-fence for the attraction, as described in U.S. patent application Ser. No. 14/219,901, filed Mar. 19, 2014, which published as U.S. Patent Application Publication No. 2014/0287779 on Sep. 25, 2014, and which is hereby incorporated herein by reference.

Figure 18B:
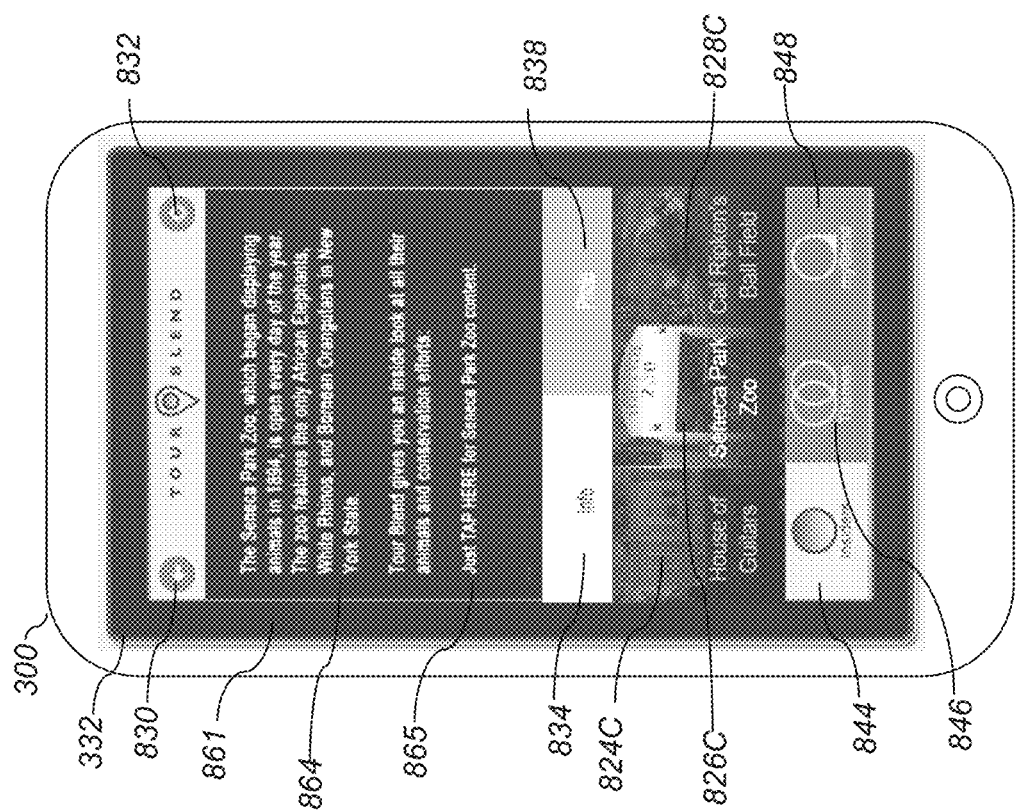
FIG. 18B depicts a mobile device user interface screen for providing digital content for an attraction which permits alternate venue content to be selectively loaded.

FIG. 18B depicts a mobile device user interface screen 861 for providing digital content for an attraction which permits alternate venue content to be selectively loaded by including venue link data as part of the attraction content. The venue link data identifies alternative venue content in a different one of the plurality of venues. For example, the attraction content for one of the attractions in the Irondequoit venue 602 (e.g. a Seneca Park Zoo attraction) can include venue link data for the Zoo venue 604. This permits a user of the mobile device to first learn about the attraction using venue content for the first venue (e.g. the Irondequoit venue 602) at a general level, and then use the venue link to obtain detailed content for the attraction (e.g. the Seneca Park Zoo) from another venue (e.g. the Zoo venue 604) which is associated with the attraction.

In some embodiments, the user interface screen 861 is displayed on the color display 332 of the smart phone 300 in FIG. 3. The user interface screen 861 is displayed when the Irondequoit venue 602 is determined to be the highest priority venue in determine highest priority venue step 430 in FIG. 5, and the mobile device enters the geographic boundary of the Seneca Park Zoo attraction. In some embodiments, when the mobile device enters the geographic boundary of the Seneca Park Zoo attraction, the user interface screen 820A shown in FIG. 16A automatically switches to the user interface screen 861 shown in FIG. 18B, and information 864 is automatically displayed so that the visitor using the mobile device can learn more about the Seneca Park Zoo attraction, which is one of the attractions in the Irondequoit venue. The user interface screen 861 also includes a "TAP HERE for Seneca Park Zoo Content" link 865, to permit the user of the mobile device to immediately access the digital content for the Zoo venue 604. When the user performs a user action by, for example, selecting (e.g. tapping) the "TAP HERE for Seneca Park Zoo Content" link 865, the content for the zoo venue is transferred or provided responsive to this user action, as described earlier in relation to step 435, in order to transfer at least some of the digital content for the attractions in the Zoo venue 604 to the mobile device, as described earlier in relation to step 440, and the user interface screen for the zoo venue, shown in FIG. 15B, is displayed in place of user interface screen 861. This permits a visitor to begin a tour of the zoo venue 604.

The user interface screen 861 in FIG. 18B also includes attraction image 824C for the "House of Guitars" attraction, attraction image 826C for the "Seneca Park Zoo" attraction and attraction image 828C for the "Cal Ripken's Ball Field" attraction. The user interface screen 861 further includes a back arrow icon 830, a settings icon 832, an insiders icon 844, a themes icon 846, a myBlend icon 848, an info icon 834 and a photo icon 838, which are used to control the presentation of the attraction content.

In some embodiments, user (e.g., visitor) preferences are stored and analyzed to determine how to present at least some of the digital content to a user of the mobile device, such as smart phone 300. FIG. 19 depicts a mobile device user interface screen 880 for enabling the user of the mobile device to select user preferences, according to some embodiments of the present invention. In some embodiments, user interface screen 880 (as with each of the other user interface screens of at least FIGS. 15A, 15B, 16A, 16B, 17, 18A, 18B, 19, 20, 21A, 21B, 22A, and 22B according to various embodiments) is displayed on the color display 332 of the smart phone 300 in FIG. 3. The user interface screen 880 is displayed when the user of the mobile device selects the settings icon 832 shown earlier, for example, at least in FIG. 18A. The user interface screen 880 includes an auto play audio control 882 and an auto play video control 884 which enable the user to select a user preference regarding whether or not the audio or video content for attractions, such as video 862 described earlier in relation to FIG. 18A, is automatically played, for example, when the user's mobile device enters the geographic boundary of attractions which include audio or video content. In some embodiments, data indicating the user selections or preferences for the auto play audio control 882 and the auto play video control 884 are stored as part of a visitor (e.g., user) profile in a processor-accessible memory device system that is communicatively connected to a data processing device system, for example, the processor-accessible memory device system 130 in FIG. 1 or the Content Database 290 in FIG. 2.

The user interface screen 880 also includes a proactive insiders control 886, which enables the user to select whether they want to be presented with all the attraction content for the venue, or only the content for the tour or theme they have selected, according to some embodiments. The user interface screen 880 also includes an "about TourBlend" icon 888, which enables the user of the mobile device to learn more about the TourBlend App, and a Tutorial icon 890, which permits the user to view Tutorial material. The user interface screen 880 further includes a scroll bar 841.

Returning to FIG. 4, in select alternate venue step 450, the user of the mobile device is permitted to select a different venue for content transfer to their mobile device, rather than the highest priority venue which was determined in determine highest priority venue step 430.

Figures 19, 20:
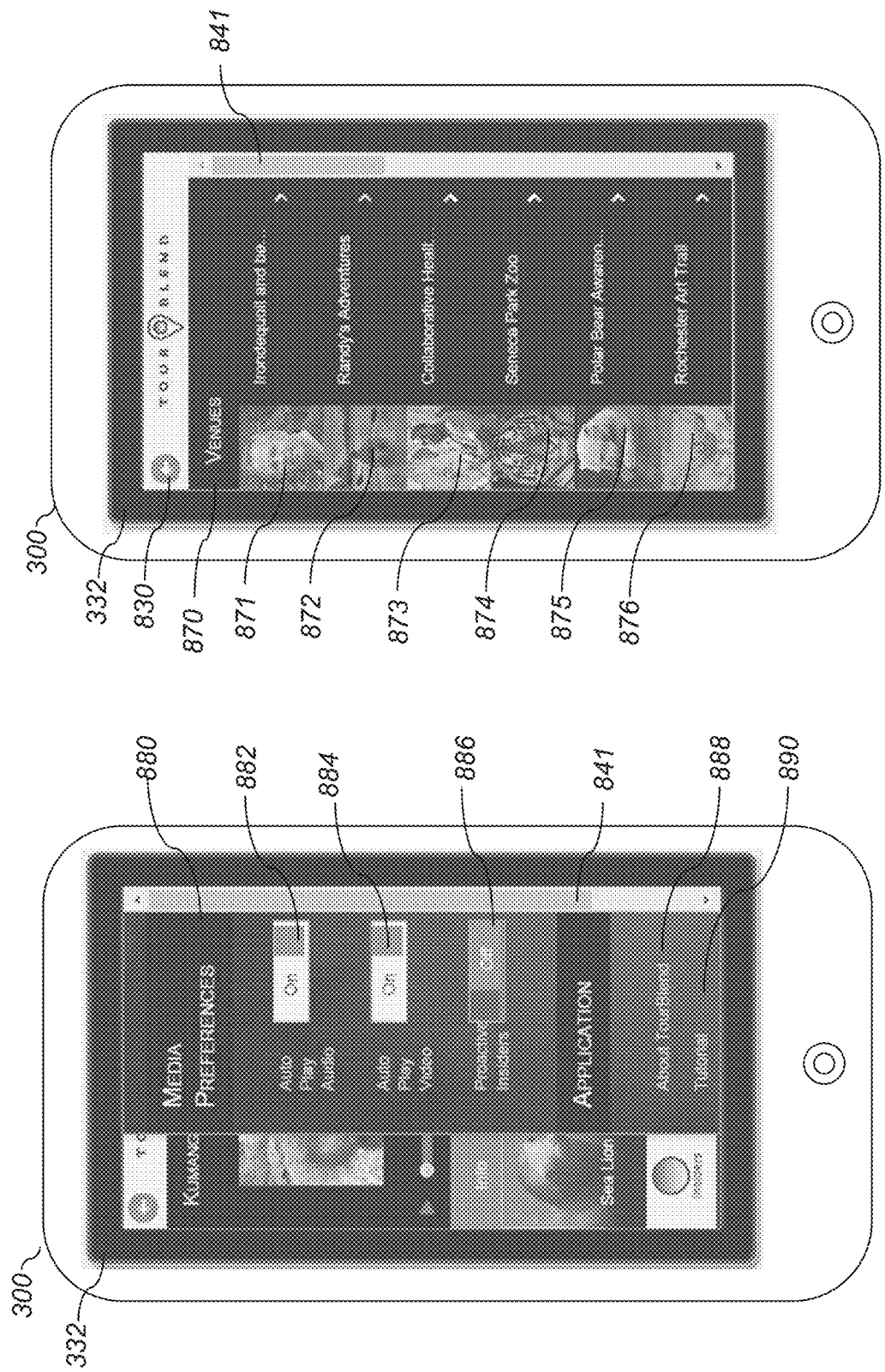
FIG. 19 depicts a mobile device user interface screen for enabling the user of the mobile device to select user preferences, according to some embodiments of the present invention.
FIG. 20 depicts a mobile device user interface screen for enabling the user of the mobile device to select venue content from venues other than the highest priority venue, according to some embodiments of the present invention.

FIG. 20 depicts a mobile device user interface screen 870 for enabling the user of the mobile device to selectively transfer venue content from venues other than the highest priority venue, according to some embodiments of the present invention. In some embodiments, user interface screen 870 is displayed on the color display 332 of the smart phone 300 in FIG. 3. The user interface screen 870 is displayed when the user of the mobile device selects the insiders icon 844 shown earlier, for example, in FIG. 18A. The user interface screen 870 displays a list of venues, including an "Irondequoit" venue listing 871, a "Randy's Adventures" venue listing 872, a "Collaborative Health" venue listing 873, a "Seneca Park Zoo" venue listing 874, a "Polar Bear Awareness" venue listing 875 and a "Rochester Art Trail" venue listing 876. The user of the mobile device can select (e.g. tap) one of the venue listings 871, 872, 873, 874, 875 or 876, in order to initiate the transfer of content for the selected venue, as described earlier in relation to transfer venue content step 435. In some embodiments, the order of the venue listings is arranged according to the distance between the current location of the mobile device and the center or closest edge of the venue, so that the nearest venues are at the top of the list. The user interface screen 870 also includes a back arrow icon 830 and a scroll bar 841.

In some embodiments, attractions can be arranged into tours, as described earlier in reference to FIG. 13A and FIG. 13B. FIG. 21A depicts a mobile device user interface screen 900A for enabling the user of the mobile device to select one of a plurality of tours of attractions within the first venue, which is the Irondequoit venue 602, according to some embodiments of the present invention. In some embodiments, the user interface screen 900A is displayed on the color display 332 of the smart phone 300 in FIG. 3. The user interface screen 900A lists the tours of attractions for the Irondequoit venue 602, as described earlier in relation to FIG. 13A. The user interface screen 900A provides a list of five tours, including a "Highlights" listing 901A, a "What's near me?" listing 902A, an "El Camino—River Trail" listing 903A, a "Lakeside Trail" listing 904A, and a "Find it in Irondequoit" listing 905A. The user of the mobile device can select (e.g. tap) one of the listings to display the list of attractions included in the tour. The user interface screen 900A further includes a back arrow icon 830, a settings icon 832, an insiders icon 844, a themes icon 846, and a myBlend icon 848.

FIG. 21B depicts a mobile device user interface screen 900B for enabling the user of the mobile device to select one of a plurality of tours of attractions within the second venue, which is the Zoo venue 604, according to some embodiments of the present invention. In some embodiments, the user interface screen 900A is displayed on the color display 332 of the smart phone 300 in FIG. 3. The user interface screen 900B lists the tours of attractions for the Zoo venue 604, as described earlier in relation to FIG. 13B. The user interface screen 900B provides a list of five tours, including a "Mammals" listing 901B, a "Birds" listing 902B, an "All animals" listing 903B, a "Species Survival Plan" listing 904B, and an "Events & Classes" listing 905B. The user of the mobile device can select (e.g. tap) one of the listings to display the list of attractions included in the tour. The user interface screen 900B further includes a back arrow icon 830, a settings icon 832, an insiders icon 844, a themes icon 846, and a myBlend icon 848.

Figures 22A, 22B:
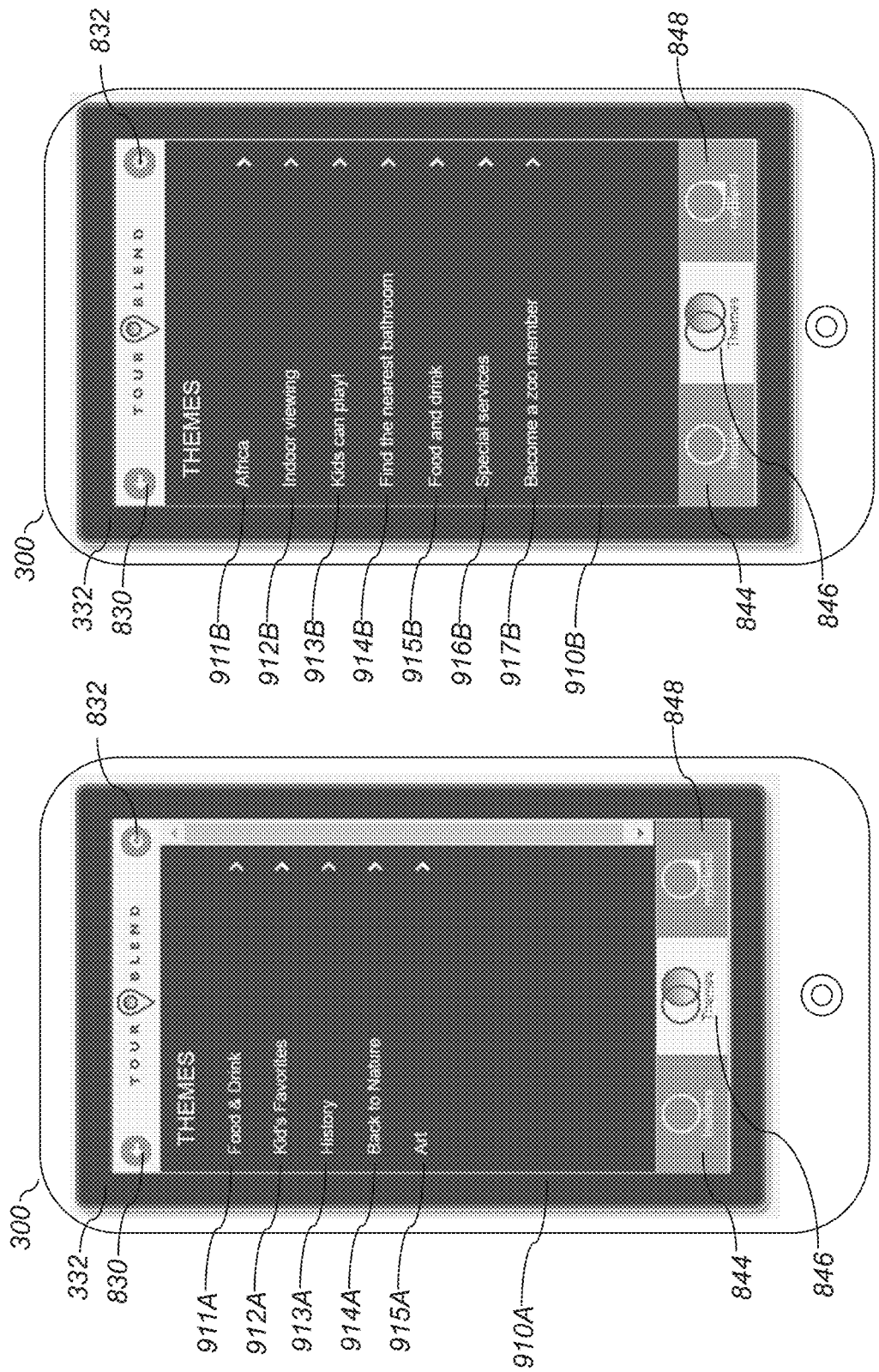
FIG. 22A depicts a mobile device user interface screen for enabling the user of the mobile device to select one of a plurality of attraction themes for the first venue, according to some embodiments of the present invention.
FIG. 22B depicts a mobile device user interface screen for enabling the user of the mobile device to select one of a plurality of attraction themes for the second venue, according to some embodiments of the present invention.

In some embodiments, attractions can be arranged into themes, as described earlier in reference to FIG. 14A and FIG. 14B. FIG. 22A depicts a mobile device user interface screen 910A for enabling the user of the mobile device to select one of a plurality of attraction themes for the first venue, which is the Irondequoit venue 602, according to some embodiments of the present invention. In some embodiments, the user interface screen 910A is displayed on the color display 332 of the smart phone 300 in FIG. 3. The user interface screen 910A lists the attraction themes for the Irondequoit venue 602, as described earlier in relation to FIG. 14A. The user interface screen 910A provides a list of five themes, including a "Food & Drink" listing 911A, a "Kid's Favorites" listing 912A, a "History" listing 913A, a "Back to Nature" listing 914A, and an "Art" listing 915A. The user of the mobile device can select (e.g. tap) one of the listings to display a group of attractions related to the selected theme. The user interface screen 910A further includes a back arrow icon 830, a settings icon 832, an insiders icon 844, a themes icon 846, and a myBlend icon 848.

FIG. 22B depicts a mobile device user interface screen 910B for enabling the user of the mobile device to select one of a plurality of attraction themes for the second venue, which is the Zoo venue 604, according to some embodiments of the present invention. In some embodiments, the user interface screen 910B is displayed on the color display 332 of the smart phone 300 in FIG. 3. The user interface screen 910B lists the attraction themes for the Zoo venue 604, as described earlier in relation to FIG. 14B. The user interface screen 910B provides a list of seven themes, including an "Africa" listing 911B, an "Indoor viewing" listing 912B, a "Kid's can play!" listing 913B, a "Find the nearest bathroom" listing 914B, a "Food and Drink" listing 915B, a "Special services" listing 916B, and a "Become a zoo member" listing 917B. The user of the mobile device can select (e.g. tap) one of the listings to display a group of attractions related to the selected theme. The user interface screen 910B further includes a back arrow icon 830, a settings icon 832, an insiders icon 844, a themes icon 846, and a myBlend icon 848.

Figure 23:
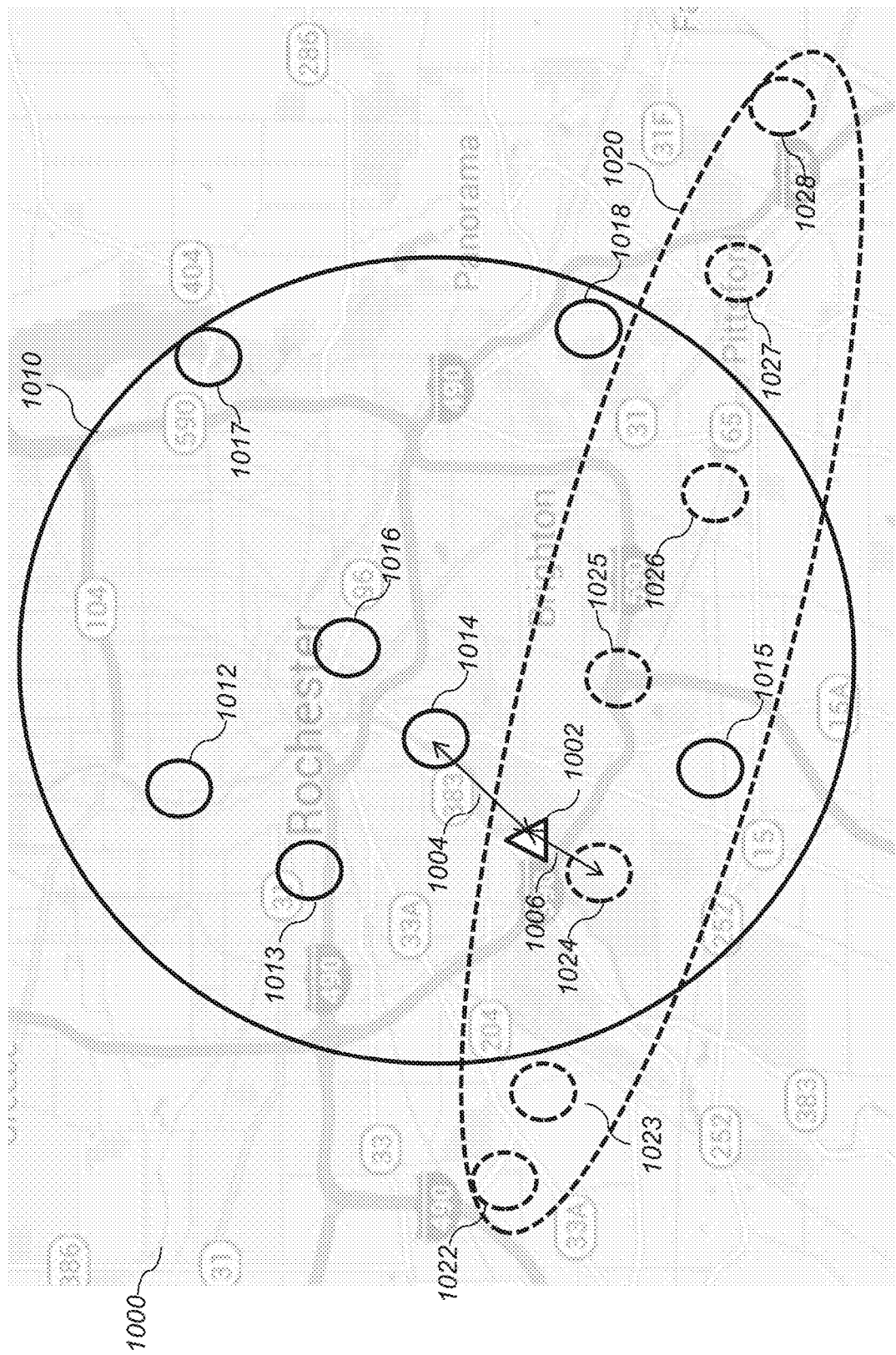
FIG. 23 is an example of a map depicting the geographic locations of a plurality of different attractions for a plurality of venues, according to some embodiments of the present invention.

FIG. 23 is an example of a map 1000 depicting the geographic locations of a plurality of different attractions for a plurality of venues, according to some embodiments of the present invention. The venues depicted in FIG. 23 include a circle for a Rochester venue 1010, and an ellipse for an Erie Canal venue 1020. The Rochester venue 1010 includes a plurality of attraction locations throughout the City of Rochester, including attraction locations 1012, 1013, 1014, 1015, 1016, 1017 and 1018 which are depicted in FIG. 23. The Erie Canal venue 1020 includes a plurality of attraction locations along the current and former path of the Erie Canal, which passes through the City of Rochester, including attraction locations 1022, 1023, 1024, 1025, 1026, 1027 and 1028 which are depicted in FIG. 23. Attraction location data defining (a) the geographic locations of at least some of the plurality of different attractions associated with at least some venues, (b) geographic boundaries of at least some of the plurality of different attractions associated with at least some venues, or both (a) and (b) may be stored in the processor-accessible memory device system 130 or content database 290.

User location triangle 1002 in FIG. 23 gives an example of one possible location of a user's mobile device. Arrow 1004 depicts the distance between user location triangle 1002 and attraction location 1014, which is the closest attraction location in the Rochester venue 1010. Arrow 1006 depicts the distance between user location triangle 1002 and attraction location 1024, which is the closest attraction location in the Erie Canal venue 1020. Since arrow 1006 is shorter that arrow 1004, the closest attraction to user location triangle 1002 is attraction 1024 in the Erie Canal Venue 1020.

Figure 24:
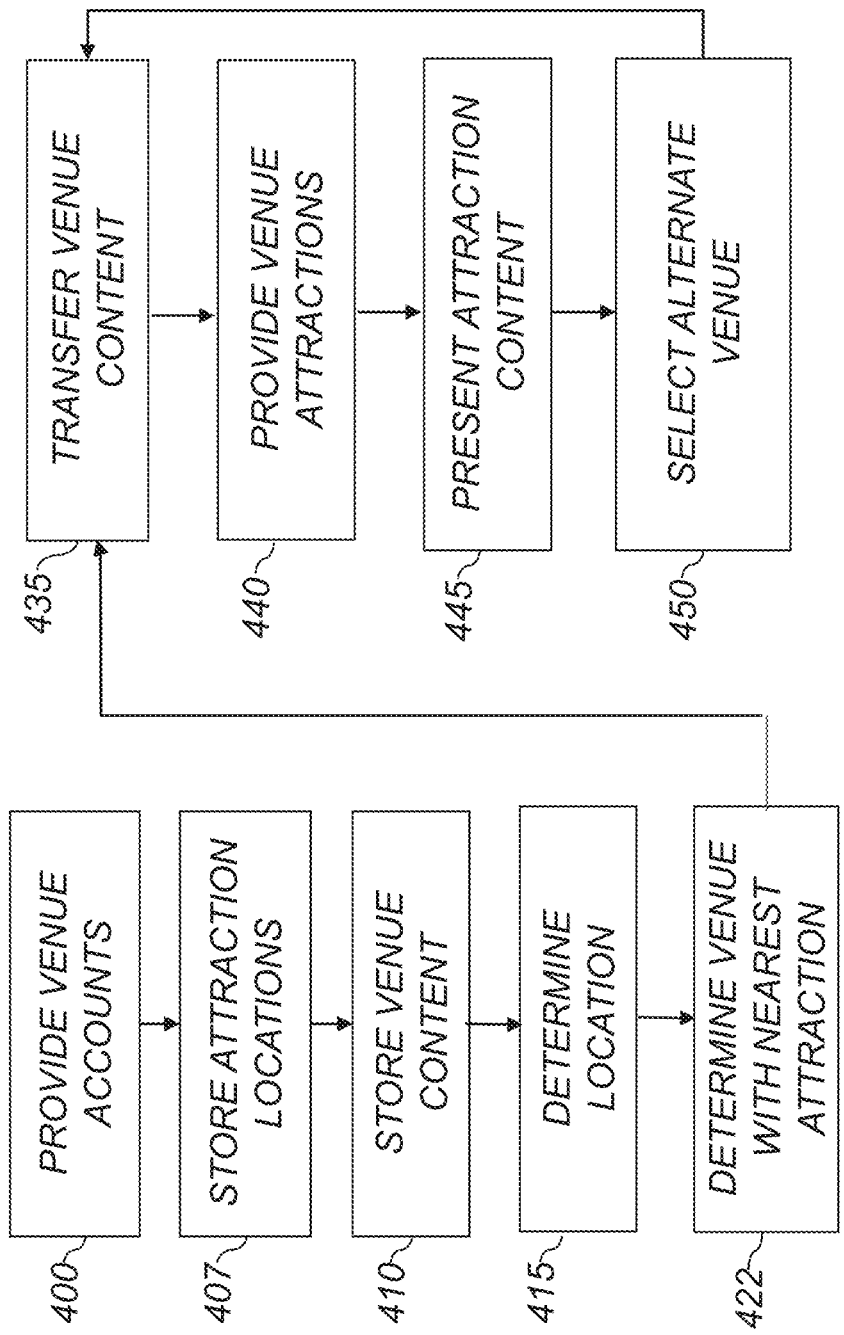
FIG. 24 illustrates a method for providing digital content for multiple venues based at least on an analysis of attraction locations, according to some embodiments of the present invention.

FIG. 24 is a flow diagram depicting steps for providing digital content for multiple venues based at least on an analysis of the above-discussed attraction location data, according to some embodiments of the present invention. It will be understood that as described earlier in relation to FIG. 4, in some embodiments, the steps are performed by the service provider 280 (e.g., web server 282, computer system 286, or both, thereof) in FIG. 2. In other embodiments, some or all of the steps are performed by the smart phone 300 in FIG. 3.

In provide venue accounts step 400 of FIG. 24, accounts are established for a plurality of different individuals or organizations associated with a plurality of different venues, as described earlier in relation to step 400 of FIG. 4. These accounts enable different individuals or organizations to manage the venue content data for each of the plurality of different venues.

In store attraction locations step 407 of FIG. 24, attraction location data defining the geographic locations, geographic boundaries, or both for at least some of a plurality of attractions in some of a plurality of different venues are stored in a processor-accessible memory device system that is communicatively connected to a data processing device system, for example, the processor-accessible memory device system 130 in FIG. 1 or the Content Database 290 in FIG. 2. The geographic locations can include, for example, the attraction locations 1012, 1013, 1014, 1015, 1016, 1017 and 1018 for Rochester venue 1010, and the attraction locations 1022, 1023, 1024, 1025, 1026, 1027 and 1028 for Erie Canal venue 1020, as described earlier in relation to FIG. 23. Although FIG. 23 shows attraction locations surrounded by uniform geographic boundary sizes and shapes, different attractions may have different boundary sizes, shapes, or both sizes and shapes, according to some embodiments. In some embodiments, the attraction locations can be entered by different individuals or organizations authorized to manage the venue content data for different venues, as described earlier in relation to FIG. 8.

In store venue content step 410 of FIG. 24, venue content data for each of a plurality of venues is stored in a processor-accessible memory device system that is communicatively connected to a data processing device system, for example, the processor-accessible memory device system 130 in FIG. 1 or the Content Database 290 in FIG. 2, as described earlier in relation to step 410 of FIG. 4. For example, attraction content for each of the attractions corresponding to attraction locations 1012, 1013, 1014, 1015, 1016, 1017 and 1018 for Rochester venue 1010 and for each of the attractions corresponding to attraction locations 1022, 1023, 1024, 1025, 1026, 1027 and 1028 for Erie Canal venue 1020 can be stored as described earlier in relation to FIG. 10A, FIG. 10B and FIG. 12. It will be understood that these attractions can be organized into tours and themes, as described earlier in relation to FIG. 13A, FIG. 13B, FIG. 14A and FIG. 14B.

In determine location step 415 of FIG. 24, the current location of the mobile device for a particular visitor is determined, as described earlier in relation to step 415 of FIG. 4. For example, the current location could correspond to the user location triangle 1002 depicted in FIG. 23.

In determine venue with closest attraction step 422 of FIG. 24, the venue which includes the nearest attraction, relative to the current location of the mobile device, is determined by analyzing the respective attraction location data for at least the closest attractions associated with the closest venues. As shown in the example depicted in FIG. 23, the distance between the current location, such as user location triangle 1002 in FIG. 23 and nearby attraction locations can be analyzed by determining, for example, the distance between user location triangle 1002 and attraction location 1014. which corresponds to the length of Arrow 1004, and the distance between user location triangle 1002 and attraction location 1024, which corresponds to the length of Arrow 1004. Since the distance represented by arrow 1006 is shorter the distance represented by arrow 1004, the closest attraction to user location triangle 1002 is attraction 1024 in the Erie Canal Venue. Therefore, the Erie Canal venue is determined to be the venue with the nearest attraction, and is the highest priority venue in this example.

Returning to FIG. 24, in transfer venue content step 435, the venue content for the venue with the nearest attraction is transferred or provided, as was described earlier in relation to step 435 of FIG. 4. In provide venue attractions step 440, a set of attractions for the venue with the nearest attraction is provided, in order to permit the user to select one or more attractions of interest, as was described earlier in relation to step 440 of FIG. 4. In present attraction content step 445, at least some of the content associated with specific attractions associated with the venue associated with the nearest attraction is presented, as was described earlier in relation to step 445 of FIG. 4. In select alternate venue step 450, the visitor using the mobile device is permitted to select a different venue for content transfer to their mobile device, rather than the venue with the nearest attraction, as described earlier in relation to step 450 of FIG. 4.

Figure 25:
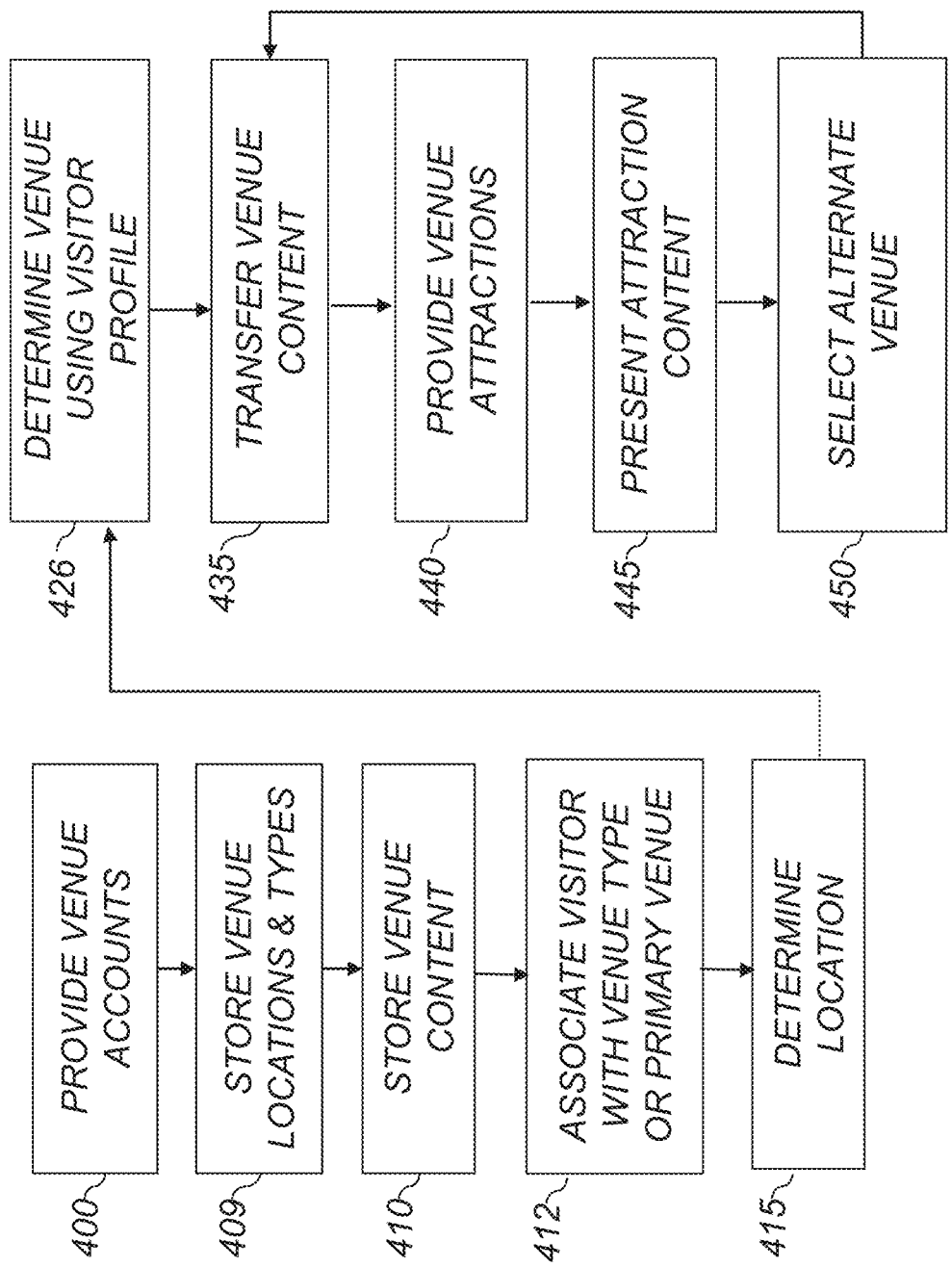
FIG. 25 illustrates a method for providing digital content for multiple venues at different geographic locations, including associating users with different venue types or primary venues, according to some embodiments of the present invention.

FIG. 25 is a flow diagram depicting steps for providing digital content for multiple venues at different geographic locations, which includes associating users with different venue types or primary venues, according to some embodiments of the present invention. It will be understood that as described earlier in relation to FIG. 4, in some embodiments, the steps are performed by the service provider 280 (e.g., web server 282, computer system 286, or both, thereof) in FIG. 2. In other embodiments, some or all of the steps are performed by the smart phone 300 in FIG. 3.

In provide venue accounts step 400 of FIG. 25, accounts are established for a plurality of different individuals or organizations associated with a plurality of different venues, as described earlier in relation to step 400 of FIG. 4. These accounts enable different individuals or organizations to manage the venue content data for each of the plurality of different venues.

In store venue locations and types step 409, data defining the locations of a plurality of venues and the type of at least some of the venues is stored in a processor-accessible memory device system that is communicatively connected to a data processing device system, for example, the processor-accessible memory device system 130 in FIG. 1 or the Content Database 290 in FIG. 2.

FIG. 26A depicts a table of venue affiliate names and venue types, for enabling the content of different venues to be associated with one or more venue types, according to some embodiments of the present invention. In some embodiments, the venue type can include some of the venues types and codes listed in FIG. 26A, such as "Tourism Region" (TR) for the Irondequoit, Rochester, and Finger Lakes Venues, "Nature" (NA) for the Seneca Park Zoo, Helmer Nature Center, and Erie Canal venues, "Campus" (CS) for the St. John Fisher and RIT campus venues, and History (HI) for the Erie Canal venue. It will be understood that some of the venues can have multiple venue types, for example, the Erie Canal venue which is both a History type venue and a Nature type venue. The venue locations and types can be stored by authorized users as described earlier in relation to FIG. 8. For example, the venue Type can be entered as part of the Rank/Restrict/Type values 603, 605 and 607.

In associate visitor with venue type or primary step 412 of FIG. 25, data associating particular visitors (i.e., particular owners of mobile devices) with a preferred type of venue, or a particular primary venue, are stored in a processor-accessible memory device system that is communicatively connected to a data processing device system, for example, the processor-accessible memory device system 130 in FIG. 1 or the Content Database 290 in FIG. 2.

FIG. 26B depicts a table of visitor profiles, including visitor names, visitor identifiers (ID), venue type codes, and primary venues, for enabling a specific venue or a specific venue type to be given a high priority for specific visitors, according to some embodiments of the present invention. For example, if the visitor downloaded the app used to display venue content from a particular website, such as the Erie Canal Society of New York State website, the Erie Canal can be the primary venue for this particular visitor. In this example, the Erie Canal venue content can be given priority for this visitor, regardless of where the visitor's mobile device is located, either when the app is used for the first time, or alternately, each time the app is used.

In addition, the venue type code in FIG. 26B can be used to permit the user to select only certain types of venue content to be loaded. For example, a perspective college student may be interested only in venue content related to campus tours of colleges and universities.

Each row of FIG. 26B provides visitor profile data for a particular visitor, such as "Tom", who has a visitor ID with a value "101", a venue type code "NA" (Nature) and a primary venue which is the "Erie Canal" venue. A second particular visitor, named "Pamela", has a visitor ID with a value "102", and a venue type code "TR" (Tourism Region), but does not have a primary venue. A third particular visitor, named "Paula", has a visitor ID with a value "103", does not have either a venue type code or a primary venue. A fourth particular visitor, named "Susan", has a visitor ID with a value "104", and two venue type codes "NA" (Nature) and "TR" (Tourism Region), but no primary venue. A fifth particular visitor, named "Andrea", has a visitor ID with a value "105", a venue type code "TR" (Tourism Region) and a primary venue which is the "Rochester" venue. A sixth particular visitor, named "Matt", has a visitor ID with a value "106", a venue type code "CS" (Campus) and a primary venue which is the "RIT" venue.

In determine location step 415 of FIG. 25, the current location of the mobile device associated with a particular visitor is determined, as described earlier in relation to step 415 of FIG. 4. For example, the current location could correspond to the user location triangle 1002 depicted in FIG. 23.

In determine venue using visitor profile step 426 of FIG. 25, visitor profile data is used in determining the highest priority venue. In some embodiments, the visitor profile data includes either or both the venue type codes and primary venue described earlier in relation to FIG. 26B. If the visitor data includes a primary venue, that venue is used as the highest priority venue for the visitor, either the first time the visitor uses the app, or each time the user begins using the app. For example, the Erie Canal venue is the primary venue for visitor "Tom", as shown in FIG. 26B, and is determined to be the highest priority venue, for example, after Tom downloads the app from a web link provided by the Erie Canal Historical Society of New York State's website, and begins using the app for the first time, no matter where Tom's mobile device is currently located.

If the visitor data does not include a primary venue, but does include one or more venue type codes, then the highest priority venue is the venue with the closest attraction which matches one or more of the venue type codes for the visitor. For example, for the visitor "Pamela", the initial venue will be the TR (Tourism Region) venue having the closest attraction, even if another type of venue (e.g. an NA (Nature) venue) has a closer attraction. If the visitor data does not include a primary venue or a venue type code, then the highest priority venue is the venue with the closest attraction. For example, for the visitor "Paula", the initial venue will be the venue (of any type) associated with the attraction which is closest to the current location of Paula's mobile device.

Returning to FIG. 25, in transfer venue content step 435, the venue content for the highest priority venue is transferred, as was described earlier in relation to step 435 of FIG. 4. In provide venue attractions step 440, a set of attractions for the highest priority venue is provided, in order to permit the user to select one or more attractions of interest, as was described earlier in relation to step 440 of FIG. 4. In present attraction content step 445, at least some of the content associated with a specific attraction located within the highest priority venue is presented, as was described earlier in relation to step 445 of FIG. 4. In select alternate venue step 450, the visitor using the mobile device is permitted to select a different venue for content transfer to their mobile device, as described earlier in relation to step 450 of FIG. 4.

Figure 27A:
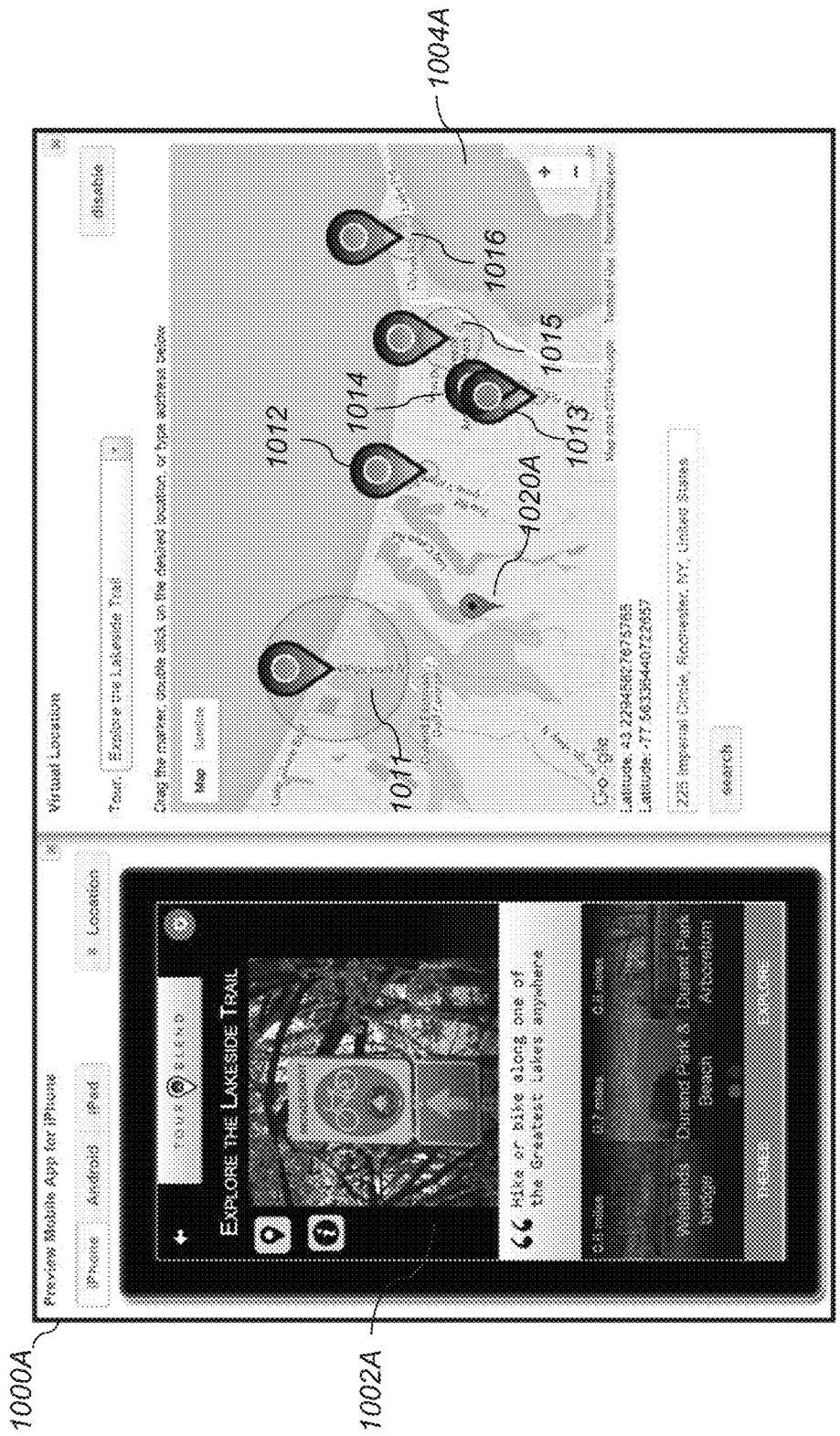
FIG. 27A depicts a computer user interface screen for enabling a computer or other data processing device system to present digital content for a plurality of attractions and a map of the attraction locations using a first virtual location.

FIG. 27A depicts a computer user interface screen 1000A for enabling a computer to present digital content for a plurality of attractions in mobile device simulation window 1002A and a map 1004A of the attraction location geofences 1010, 1011, 1012, 1013, 1014 and 1015 using a first virtual location 1020A. In this example, the mobile device simulation window 1002A depicts a mobile screen showing the "Lakeside Trail" tour within the Irondequoit venue, as described earlier in relation to tour 904A in FIG. 21A. The first virtual location 1020A is outside all of the attraction location geofences 1011, 1012, 1013, 1014, 1015 and 1016. The computer user can move the virtual location 1020A to other positions, using a pointing device such as a mouse or touchscreen.

Figure 27B:
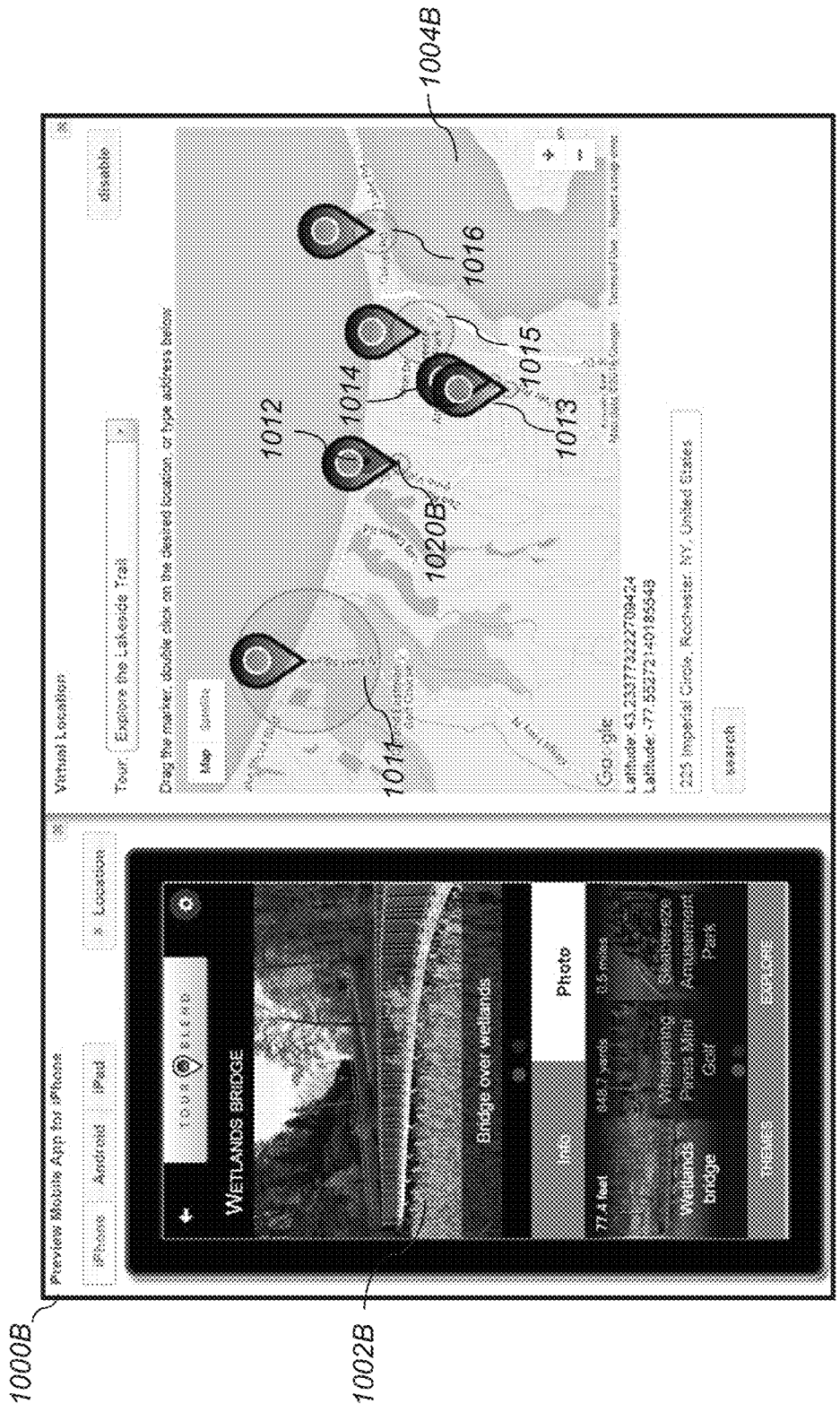
FIG. 27B depicts a computer user interface screen for enabling a computer or other data processing device system to present digital content for a plurality of attractions and a map of the attraction locations using a second virtual location.

FIG. 27B depicts a computer user interface screen 1000B for enabling a computer to present digital content for a plurality of attractions and a map 1004B of the attraction locations using a second virtual location 1020B. In this example, the computer user has changed the virtual location to be within the geofence for the attraction location geofence 1012, which is the "wetlands bridge" attraction. In response, the mobile device simulation window 1002B displays the content for the "wetlands bridge" attraction.

In some embodiments, some or all of the steps described in reference to FIG. 4, FIG. 24 or FIG. 25 are provided by the mobile device, such as smart phone 300. In some embodiments, the service provider 280 (e.g., web server 282, computer system 286, or both, thereof) provides a downloadable software application ("app") over the communication network 250 to the smart phone 300. The smart phone 300 is one example of a mobile device that includes a memory, such as image/data memory 330, which can serve as a memory device system for storing venue content data, output devices including both a color display 332 and a speaker 344 which can serve as an output device system for presenting digital content to a user, a GPS receiver 360 which can serve as a location determination unit for determining the current location of the mobile device, a digital processor 320 which can serve as a data processing system, and a firmware memory 328 which can serve as a program memory. The digital processor 320 is communicatively connected to the image/data memory 330, the color display 332, the speaker 344 via the audio codec 340, and the firmware memory 328.

In some embodiments, digital still images or digital video images captured by the user's smart phone 300 while the visitor is visiting attraction locations can be included in a photo product which is produced by a fulfillment provider, as described in U.S. patent application Ser. No. 14/219,901, filed Mar. 19, 2014, which published as U.S. Patent Application Publication No. 2014/0287779 on Sep. 25, 2014, and which is hereby incorporated herein by reference.

In the foregoing detailed description, the methods and apparatuses of the present invention have been described with reference to specific exemplary embodiments thereof. It will, however, be evident that various modifications and changes can be made thereto without departing from the broader scope of the present invention. The present specification and figures are accordingly to be regarded as illustrative rather than restrictive.

A computer program product can include one or more non-transitory storage mediums, for example; magnetic storage media such as magnetic disk (such as a floppy disk) or magnetic tape; optical storage media such as optical disk, optical tape, or machine readable bar code; solid-state electronic storage devices such as random access memory (RAM), flash EPROM memory, or read-only memory (ROM); or any other physical device or media employed to store a computer program having instructions for controlling one or more computers to practice any of the methods according to any embodiment of the present invention.

What is claimed is:

1. A method executed by a data processing device system, the method comprising:
    storing, in a processor-accessible memory device system communicatively connected to the data processing device system, respective venue content data for each respective venue of a plurality of venues, wherein each respective venue is associated with a respective set of attractions for at least one tour and wherein each respective venue content data includes digital content for the respective set of attractions and attraction location data specifying a respective location of each attraction of the respective set of attractions;
    storing, in the processor-accessible memory device system, primary venue data which associates each of a subset of a plurality of mobile devices with a particular one of the plurality of venues, wherein the subset includes some but not all of the plurality of mobile devices;
    using the stored primary venue data, determining if a first mobile device is associated with one of the plurality of venues, wherein the determining and the stored primary venue data are independent of a current location of the first mobile device;
    if it is determined that the first mobile device is associated with the one of the plurality of venues, automatically providing to the first mobile device at least some of the respective venue content data for at least one tour associated with the one of the plurality of venues; and
    if it is determined that the first mobile device is not associated with any of the plurality of venues, determining a current location of the first mobile device, and automatically providing to the first mobile device at least some of the respective venue content data for at least one tour associated with an automatically selected venue, wherein the automatically selected venue is responsive to the current location of the first mobile device.

2. The method of claim 1, further comprising
    providing, to the first mobile device, data which can be used to display a graphical user interface screen to permit a user of the first mobile device to select a different venue from the plurality of venues; and
    responsive to a user action, transferring at least some of the venue content for the selected different venue to the first mobile device.

3. The method of claim 2, wherein the graphical user interface screen provides a list of venues arranged according to the distances between the current location of the first mobile device and the attraction location data associated with each respective venue in the list of venues.

4. The method of claim 1, wherein each respective attraction location data further defines a respective geographic boundary for each of at least some of the respective set of attractions, and wherein the method further comprises:
    analyzing the respective attraction location data to determine whether or not the current location of the first mobile device is within the respective geographic boundary of one of the plurality of different attractions; and
    if it is determined that the current location of the first mobile device is within the geographic boundary of a particular one of the plurality of different attractions, automatically presenting, via the first mobile device, at least some of the digital content associated with the particular one of the plurality of different attractions.

5. The method of claim 4, wherein the digital content associated with the particular one of the plurality of different attractions includes audio content, and wherein the method further comprises:
    automatically playing the audio content when the current location of the first mobile device is within the geographic boundary of the particular one of the plurality of different attractions.

6. The method of claim 1, wherein the stored primary venue data associated with at least one mobile device of the plurality of mobile devices is determined by a website used to facilitate downloading of an application software to the at least one mobile device.

7. The method of claim 6, wherein the application software is an app which utilizes an operating system running on a digital processor in each of the plurality of mobile devices.

8. The method of claim 1, wherein the stored primary venue data associated with at least one mobile device of the plurality of mobile devices is determined by identifying information in a bar code or a QR code captured by the at least one mobile device.

9. The method of claim 1, further comprising:
    establishing separate accounts for the plurality of venues which permit different individuals to control the storage of the respective venue content data for each respective venue of the plurality of venues.

10. A system comprising:
    a network-accessible storage device system storing respective venue content data for each respective venue of a plurality of venues, each respective venue associated with a respective set of different attractions, each respective venue content data including digital content for the respective set of attractions associated with the respective venue and attraction location data specifying a respective location of each attraction of the respective set of attractions;
    a processor-accessible memory device system storing primary venue data which associates each of a subset of a plurality of mobile devices with a particular one of the plurality of venues; and
    a data processing device system which is configured to at least:
        determine, based at least on an analysis of at least some of the stored primary venue data, if the first mobile device is associated with one of the plurality of venues;
        if it is determined that the first mobile device is associated with the one of the plurality of venues, providing to the first mobile device at least some of the respective venue content data associated with the one of the plurality of venues; and
        if it is determined that the first mobile device is not associated with any of the plurality of venues, using a location determination unit configured to determine a current geographic location of a first mobile device of the plurality of mobile devices, automatically selecting one of the venues from the plurality of venues responsive to the current location of the first mobile device, and providing to the first mobile device at least some of the respective venue content data associated with the automatically selected venue.

11. The system of claim 10, wherein the data processing device system is further configured to at least:
provide, to the first mobile device, data which can be used to display a graphical user interface screen to permit a user of the first mobile device to select a different venue from the plurality of venues; and
transfer, responsive to the user selection, at least some of the venue content for the selected different venue to the first mobile device.

12. The system of claim 11, wherein the graphical user interface screen provides a list of venues arranged according to the distances between the current location of the first mobile device and the attraction location data associated with each respective venue in the list of venues.

13. The system of claim 10, wherein the location determination unit is a GPS receiver in the first mobile device.

14. The system of claim 10, wherein the stored primary venue data associated with at least one of the plurality of mobile devices is determined by a website used to facilitate downloading of an application software to the at least one mobile device.

15. The system of claim 10, wherein the stored primary venue data associated with at least one of the plurality of mobile devices is determined by using a sensor in the at least one of the plurality of mobile devices to capture a bar code or a QR code customized for at least one respective venue of the plurality of venues.

16. A method executed by a data processing device system, the method comprising:
providing an application software, configured as an app, utilizing an operating system running on a digital processor in each of a plurality of mobile devices;
storing, in a processor-accessible memory device system communicatively connected to the data processing device system, respective venue content data for each respective venue of a plurality of venues, wherein each respective venue is associated with a respective set of attractions for at least one tour and wherein each respective venue content data includes digital content for the respective set of attractions and attraction location data specifying a respective location of each attraction of the respective set of attractions;
facilitating downloading of the application software to a first set of mobile devices, wherein the downloading is facilitated by a first set of websites each associated with one of the respective venues;
facilitating the downloading of the application software to a second set of mobile devices, wherein the downloading is facilitated by at least a second website that is not associated with any respective venue;
storing, in the processor-accessible memory device system, primary venue data which associates each of the first set of mobile device with the respective venue that is associated with the website used to facilitate downloading of the application software to the mobile device;
in response to one of the mobile devices in the first set or second set of mobile devices accessing the application software, using the stored primary venue data to determine if the mobile device is associated with one of the plurality of venues, wherein the determining and the stored primary venue data are independent of a current location of the mobile device;
if the mobile device is associated with the one of the plurality of venues, automatically providing to the mobile device at least some of the respective venue content data for at least one tour associated with the one of the plurality of venues; and
if the mobile device is not associated with the one of the plurality of venues, determining a current location of the mobile device, and automatically providing to the mobile device at least some of the respective venue content data for at least one tour associated with an automatically selected venue, wherein the automatically selected venue is responsive to the current location of the mobile device.

17. The method of claim 16, further comprising:
providing a unique QR code for each website in the first set of websites to facilitate downloading of the application software to the first set of mobile devices.

18. The method of claim 16, further comprising
providing, to the mobile device, data which can be used to display a graphical user interface screen to permit a user of the mobile device to select a different venue from the plurality of venues; and
responsive to a user selecting a different venue, transferring to the mobile device at least some of the attraction digital content data for the selected different venue.

19. The method of claim 18, wherein the graphical user interface screen provides a list of venues arranged according a distance between the current location of the mobile device and the attraction location data associated with at least some of the plurality of venues.

20. The method of claim 16, further comprising:
establishing a separate account for each of the plurality of venues which permits different individuals to control the storage of attraction digital content data and attraction location data for each of the plurality of venues.

* * * * *